INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF

BY Herbert W. Arnold
ATTORNEY

INVENTOR
MICHAEL DANILOFF
BY Herbert W. Arnold
ATTORNEY

FIG. 10
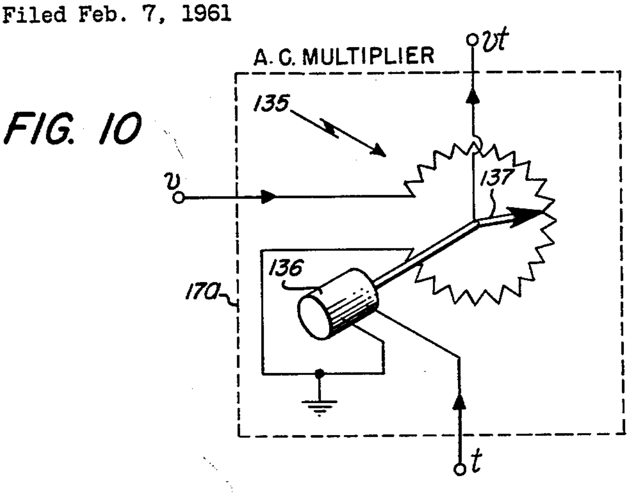
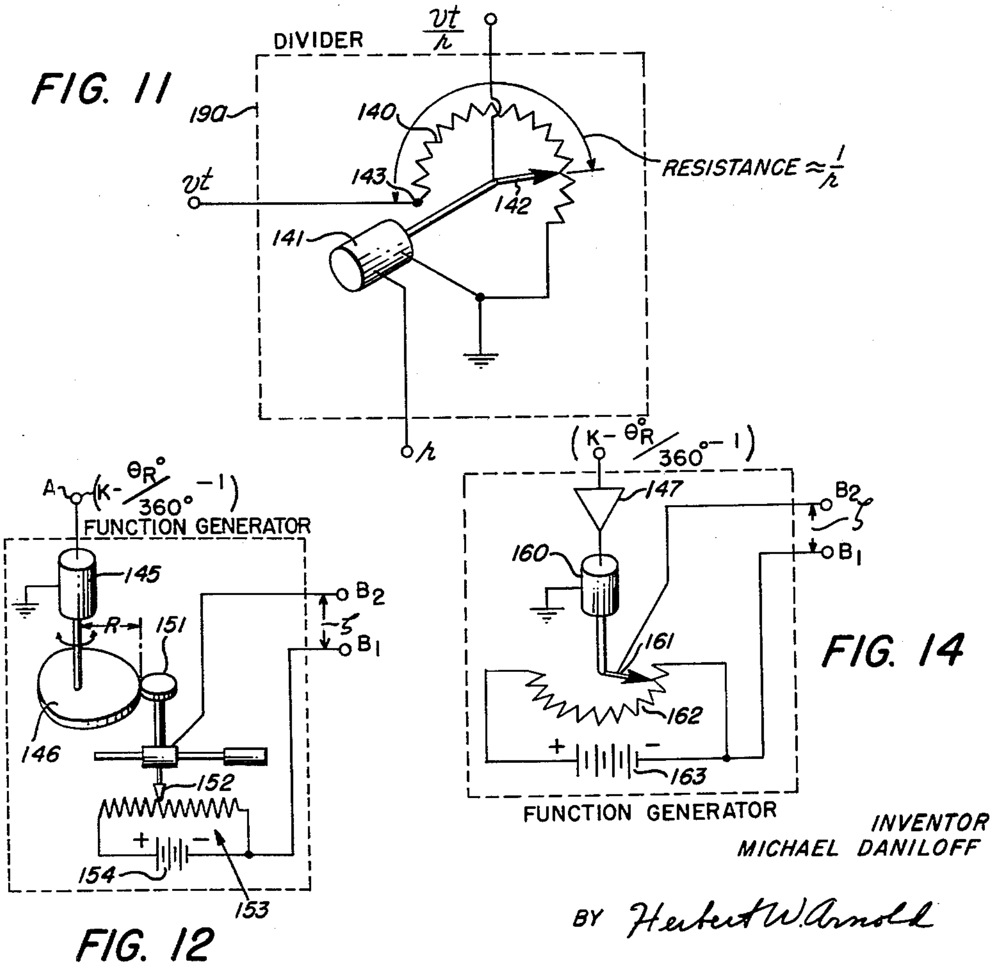
FIG. 11, FIG. 14
FIG. 12
INVENTOR
MICHAEL DANILOFF
BY Herbert W. Arnold
ATTORNEY

April 6, 1965 M. DANILOFF 3,177,348

PROGRAMMED FLIGHT COMPUTERS

Filed Feb. 7, 1961 28 Sheets-Sheet 7

INVENTOR
MICHAEL DANILOFF

BY Herbert W. Arnold

ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

April 6, 1965 M. DANILOFF 3,177,348

PROGRAMMED FLIGHT COMPUTERS

Filed Feb. 7, 1961 28 Sheets-Sheet 11

INVENTOR
MICHAEL DANILOFF

BY Herbert W. Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

PROGRAMMED FLIGHT COMPUTERS

Filed Feb. 7, 1961 28 Sheets-Sheet 14

INVENTOR
MICHAEL DANILOFF
BY Herbert W. Arnold
ATTORNEY

INVENTOR
MICHAEL DANILOFF
BY Herbert W. Arnold
ATTORNEY

April 6, 1965 M. DANILOFF 3,177,348

PROGRAMMED FLIGHT COMPUTERS

Filed Feb. 7, 1961 28 Sheets-Sheet 16

INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF
BY Herbert Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

INVENTOR
MICHAEL DANILOFF
BY Herbert W. Arnold
ATTORNEY

PROGRAMMED FLIGHT COMPUTERS

Filed Feb. 7, 1961 28 Sheets-Sheet 27

INVENTOR
MICHAEL DANILOFF
BY Herbert W. Arnold
ATTORNEY

INVENTOR
MICHAEL DANILOFF

BY Herbert W. Arnold
ATTORNEY

United States Patent Office 3,177,348

Patented Apr. 6, 1965

3,177,348

PROGRAMMED FLIGHT COMPUTERS

Michael Daniloff, Boston, Mass., assignor to Raytheon Company, Lexington, Mass., a corporation of Delaware Filed Feb. 7, 1961, Ser. No. 87,615
79 Claims. (Cl. 235—151)

This invention relates to guidance systems, and more particularly to systems for guiding a vehicle so as to arrive from any point in space to an assigned point of destination in a desired time and so that said vehicle is moving in a predetermined direction in both horizontal and vertical planes.

Guidance systems usually control a craft so as to follow a predetermined path in response to information from a radio beacon located near the point of destination and from information providing the direction of flight of a craft with respect to a compass, stable, vertical, or other direction-indicating devices. The beacon and direction information, generally in the form of electrical signals, are combined in a computer which determines the required rudder and bank angle or the operation of other control devices to direct the craft along a predetermined flight path so as to arrive at the given destination point in space. However, in such computers it is difficult, if not impossible, to determine the precise time of arrival at the destination point from any point along the course. This inability to make such a determination accurately is generally due to the unpredictable effects of variations in propulsion power, winds or other atmospheric disturbances which cause the craft to deviate from the preset path. In such instances, only uncertain estimates of direction and speed variations due to such disturbances can be entered as corrections into the computer in order to provide the necessary compensation. For example, sidewinds, headwinds, or the like, may affect the desired flight path in the horizontal plane, whereas vertical gusts or downdrafts, equally unpredictable, alter the flight of the craft in the vertical plane. Individual corrections of the flight computer for both vertical and horizontal deviation become virtually impossible. Moreover, when a fixed path method of navigation is used, the inertia of the craft frequently causes the heading of the craft to oscillate from one side of the present flight path to the other, both in the vertical and horizontal directions. This, in turn, decreases the accuracy of the navigating and landing systems. It is, therefore, an object of the invention to provide a guidance system which enables a craft to alight at a preselected instant of time from any point along the flight path and in a desired direction with respect to the horizontal and vertical planes and thereby to increase the accuracy of navigation by eliminating the principle of navigating along a fixed path.

The principle of operation of the present invention consists in the utilization of a recomputing procedure in which an optimum flight path is selected for every point along the course, thus eliminating navigation along a single fixed flight path with all the aforementioned sources of error. It should be understood that from any point in space there exists an optimum path which fulfills the aforementioned requirements for the programmed flight. Thus the vehicle or craft, as opposed to prior systems, does not follow a fixed or preset path. Rather, from every point in space occupied by the craft, the invention provides a path of travel from that point. This guidance principle is applied to both the vertical and horizontal directions. This principle is achieved by providing a computer for the horizontal flight path and a computer for the vertical flight path which are each provided with a function generator for establishing a particular relationship between a plurality of inputs. For the horizontal path computer these inputs are velocity of the craft, desired time to land, distance to point of destination, and the angle between the line of sight from the craft to the point of destination and a line representing the desired heading of the craft when landing. From these inputs in some embodiments of this invention the function generator determines at any instant the required bank angle or the angle of flight, that is, the angle between the required direction of flight and the previously mentioned line of sight. In other embodiments, the function generator determines the required curvature of the path of motion of the vehicle or craft. In like manner, the inputs for the vertical path computer are the distance between the craft and the point of destination, the angle of depression, which is the angle between the line of sight from the craft to the point of destination and a predetermined plane. From these inputs, the function generator provides the required direction of motion or the velocity of approach of the craft or vehicle to the aforementioned plane. The required angle for the horizontal projection of the path of motion is the angle between the direction of travel of the craft and the line of sight from the craft to the point of desired destination. The computer for the vertical projection of the path of motion provides, from the aforementioned inputs, the angle of descent, that is, the angle between the projection of the flight path on the vertical plane and the line of sight between the craft and the point of desired destination. In this manner, navigation along a fixed path, which is the pinciple of operation of existing computers, is eliminated.

In accordance with the navigation system of the invention, the ground speed of the craft is fed to a multiplier in the computer for the horizontal path. The time to arrive at the desired destination is obtained from a timer. The product of the two inputs is divided, in a dividing circuit, by the distance to the target, which can be obtained from a radar, loran, TACAN or other navigation systems, or other means of supplying the distance from the craft to the point of destination. From this result, a quantity representing unity is subtracted together with $\frac{1}{360}$ of the angle between the line of sight and the required ground track direction over the target expressed in degrees. In a first embodiment of the invention this quantity is fed to a function generator which uses the anode current of a multielement amplifying device or tube, or semiconductor circuit of similar characteristic, not shown, as an output signal which is proportional to the desired horizontal flight angle, the anode or plate voltage of the device being varied proportionally to the input quantity, while the grid or control element voltage is held constant. The invention in a further embodiment contemplates the use of a variety of function-generating devices for horizontal flight curves to be described in detail. The horizontal flight angle is combined with compass and radar indications to provide the require angle of course with reference to the cardinal points of the compass.

In like manner, the computer for the projection of the flight path on a vertical plane determines the required downward velocity by subtracting from the altitude of the craft, the desired altitude or height of the craft over the destination or target. If the craft is to land at the point of destination, the latter height input is made equal to zero. At the same time, the speed of the vehicle or craft with respect to the ground, as obtained from a Doppler radar, or other suitable speed indicating means, is multiplied by the landing time and the product thereof is fed to a function generator and combined in a dividing servo with a quanity representing the aforementioned difference. The function generator generates a quantity which determines the inclination of required descent curve. The output of the function generator and the output of the dividing servo are multiplied and combined in an adder with the desired vertical approach angle which is manually or otherwise introduced into the computer. The resulting quantity is the required angle of descent which, when multiplied by the velocity over the ground, provides the required downward velocity.

The invention also discloses a further embodiment of the vertical computer for craft intending to land at a predetermined point of destination as opposed to passing over the target at a specified altitude. In this manner, the required vertical and horizontal angles of motion are obtained and then fed to either an autopilot for control of the craft, or to display indicators for pilot flight information.

Further objects and advantages of the invention will become apparent from the following specifications taken in connection with the accompanying drawings, wherein:

FIG. 10 is a schematic diagram of a typical alternating current multiplier as used as the multiplier 17a in FIG. 6;

FIG. 11 is the schematic diagram of a typical alternating current divider as used as the divider 19a in FIG. 6;

FIG. 12 is a further embodiment of a direct current or alternating current function generator using a flat cam for use in connection with the function generators shown in FIG. 1 and FIG. 6, respectively;

FIG. 14 is a schematic diagram of an alternating current-direct current function generator using a non-linear potentiometer to generate the function shown in FIG. 13;

Figure 16:
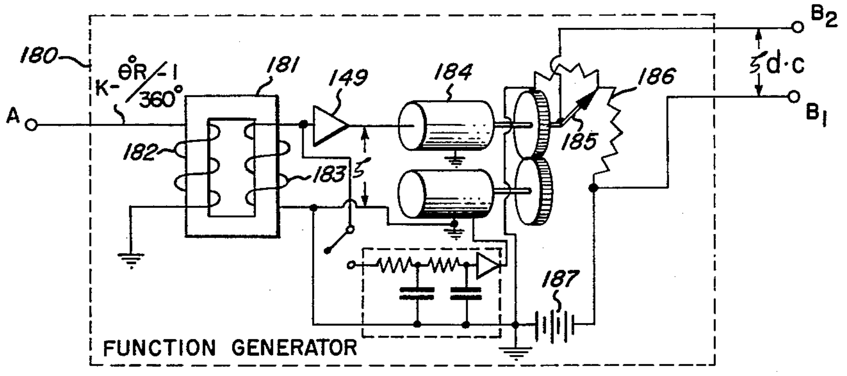
FIG. 16 is a schematic diagram of a function generator for generating a function approximating the function shown in FIG. 13.
Figure 16A:
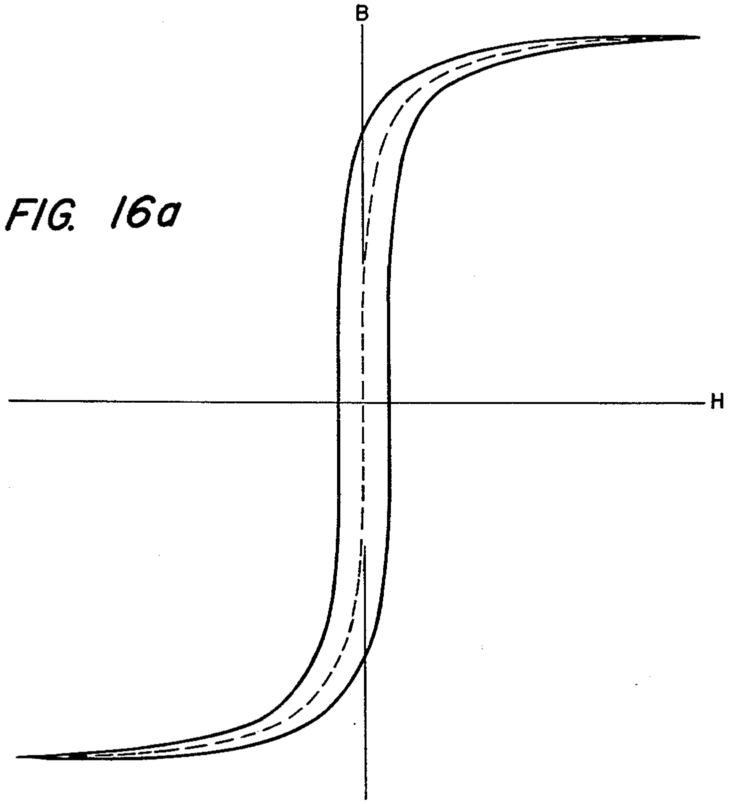
Figure 17:
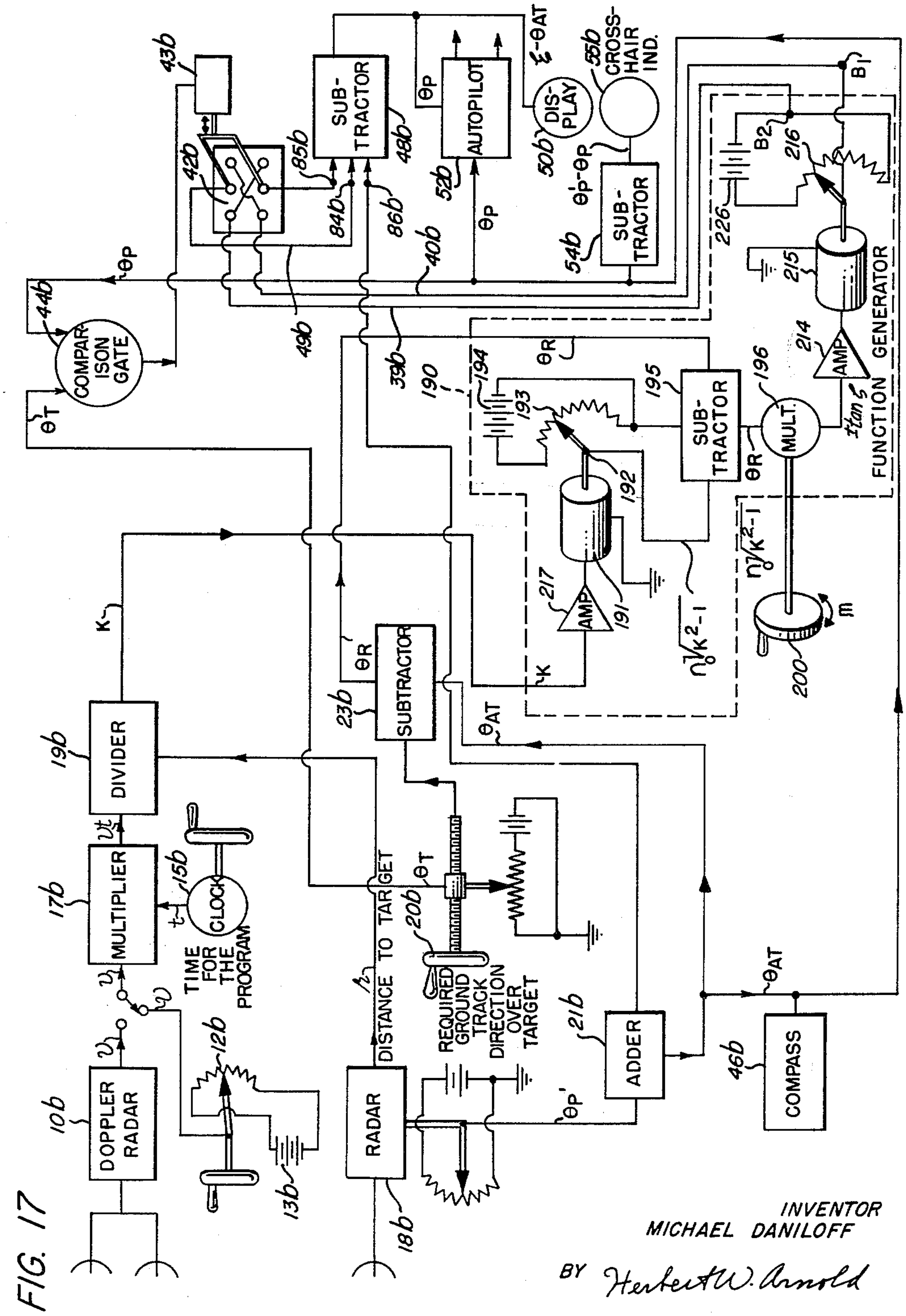
Figure 17A:
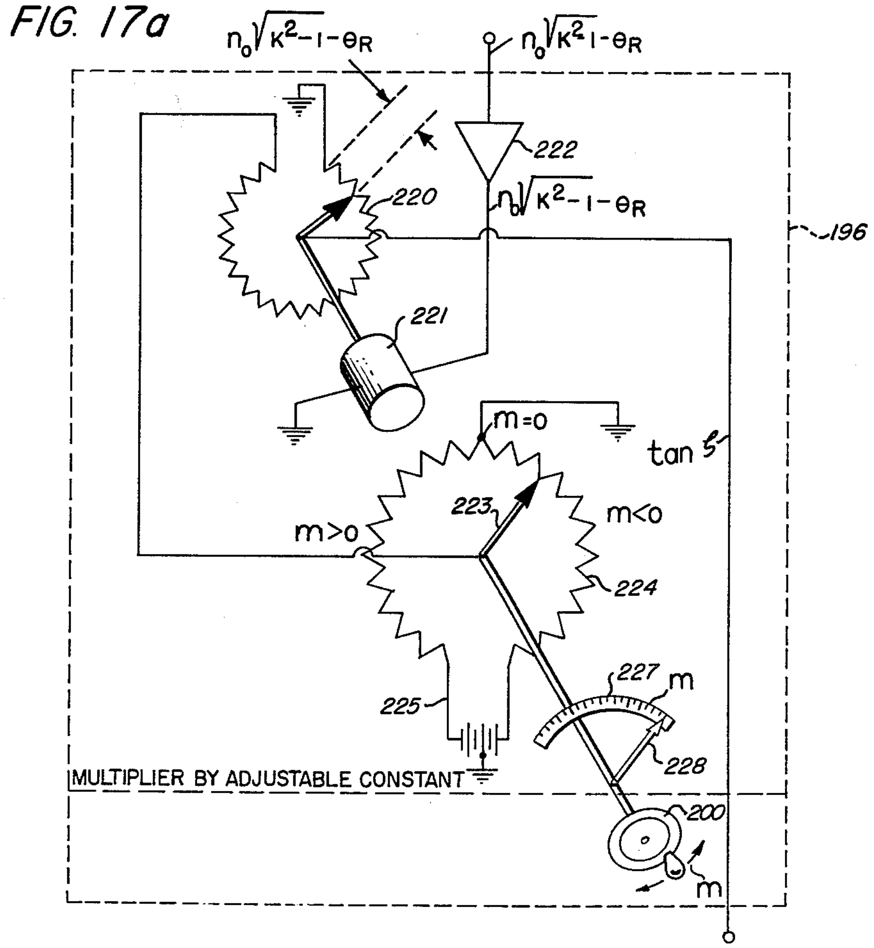
Figure 17B:
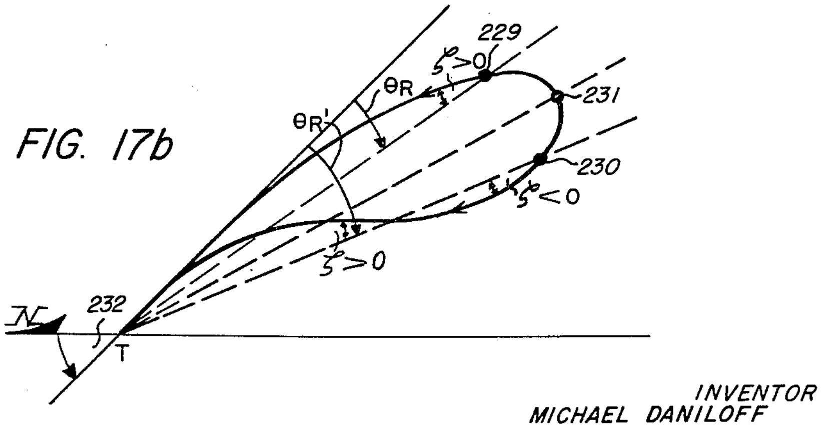
Figure 18:
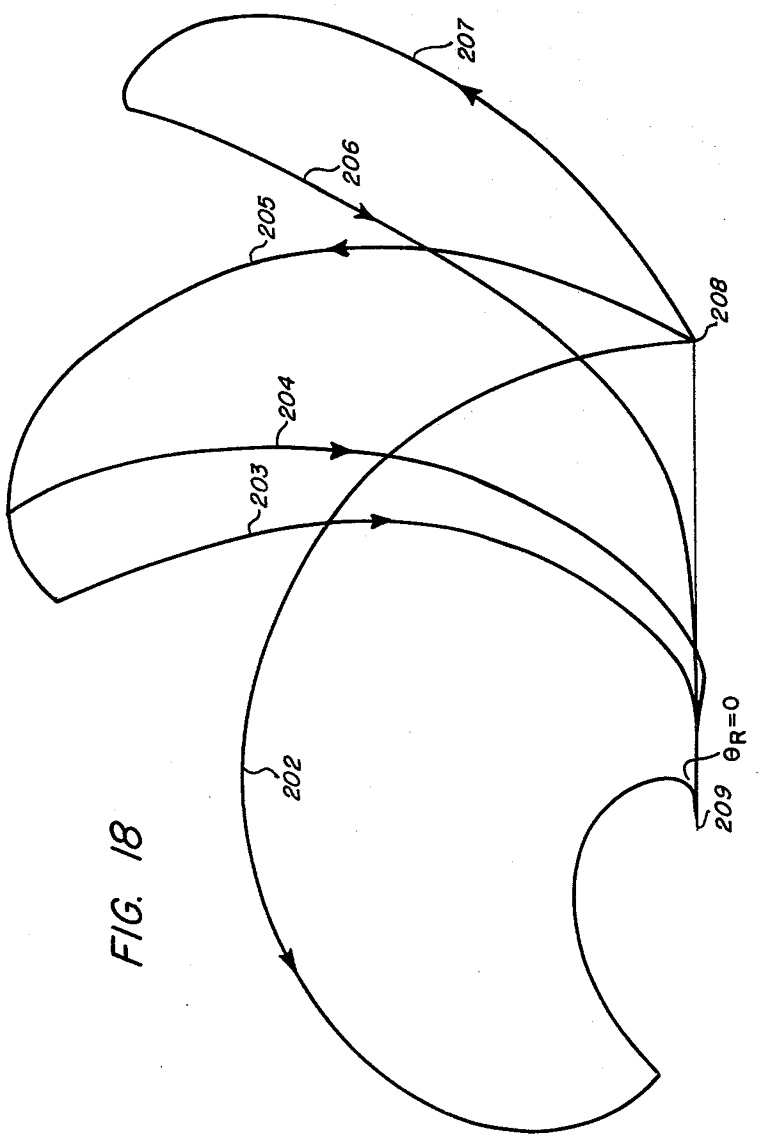
Figures 19, 20:
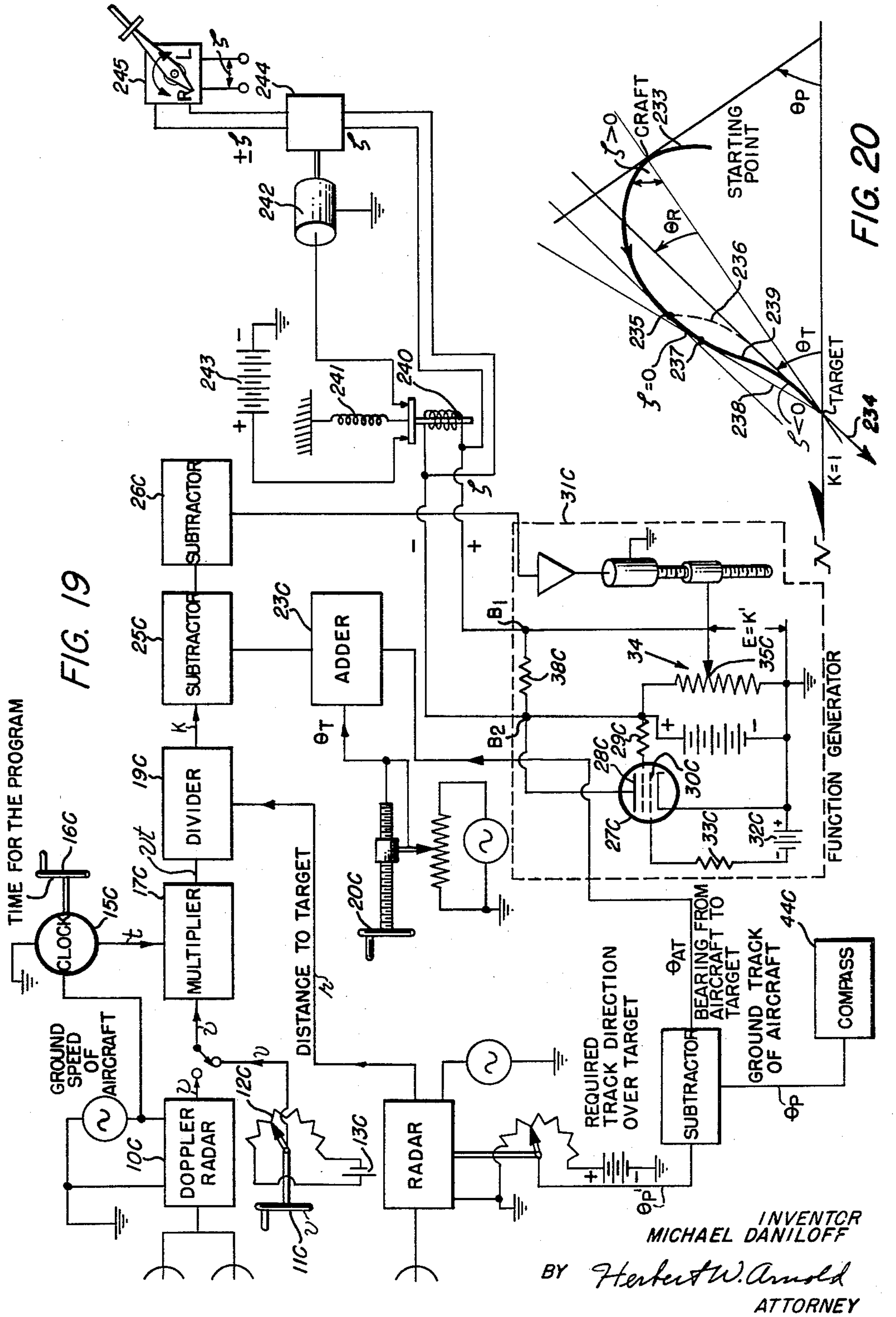
Figure 21:
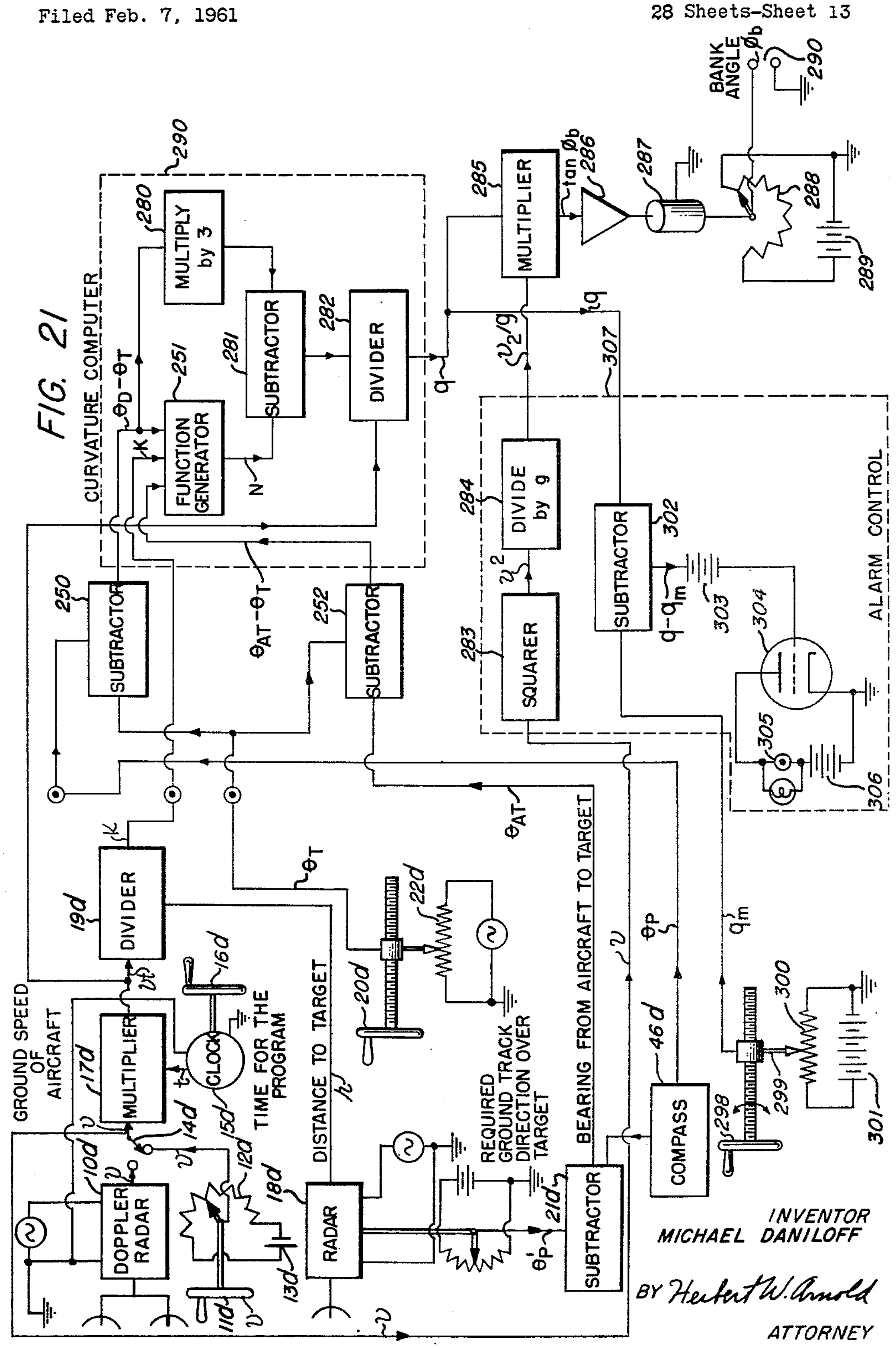
Figure 22:
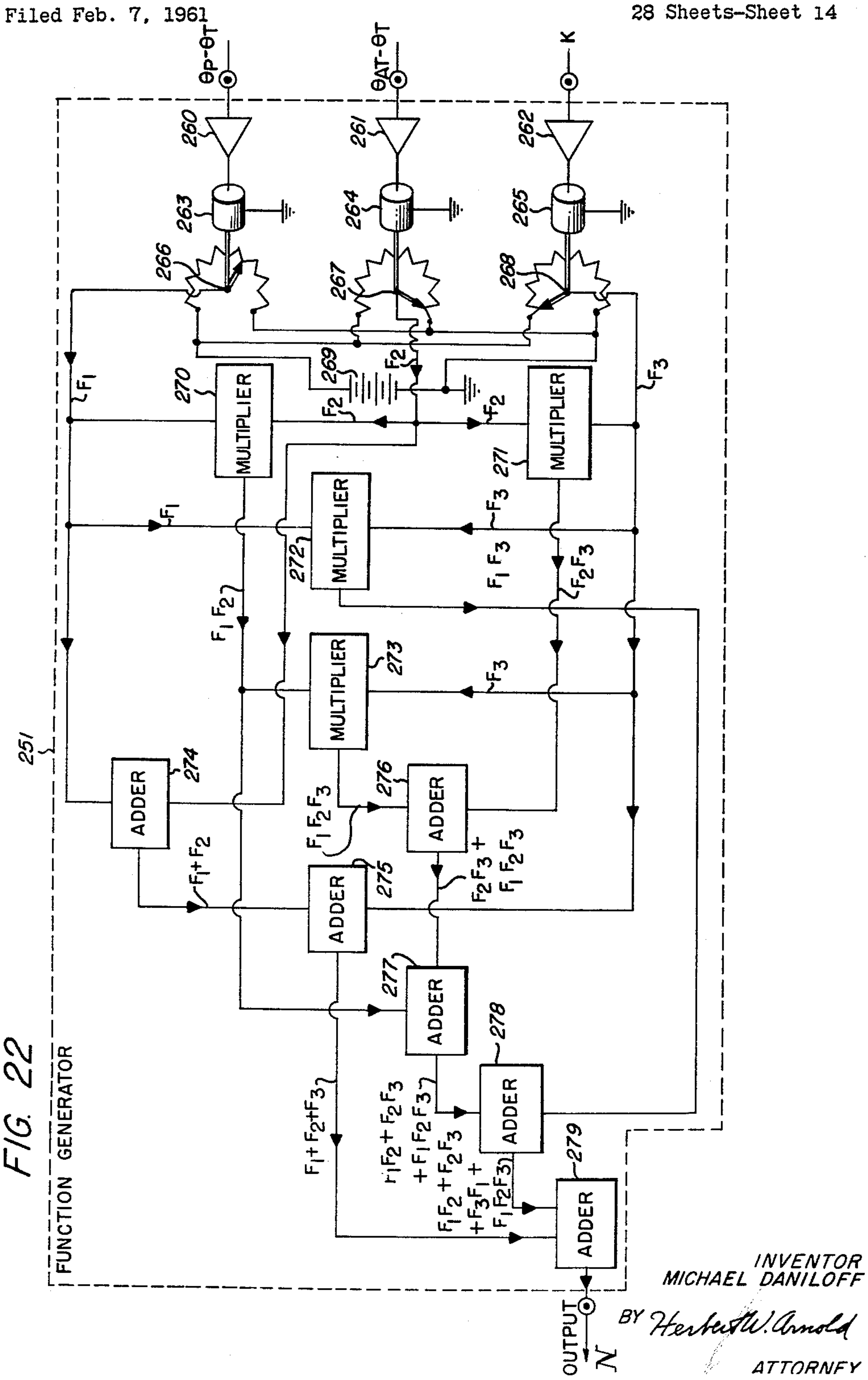
Figure 23:
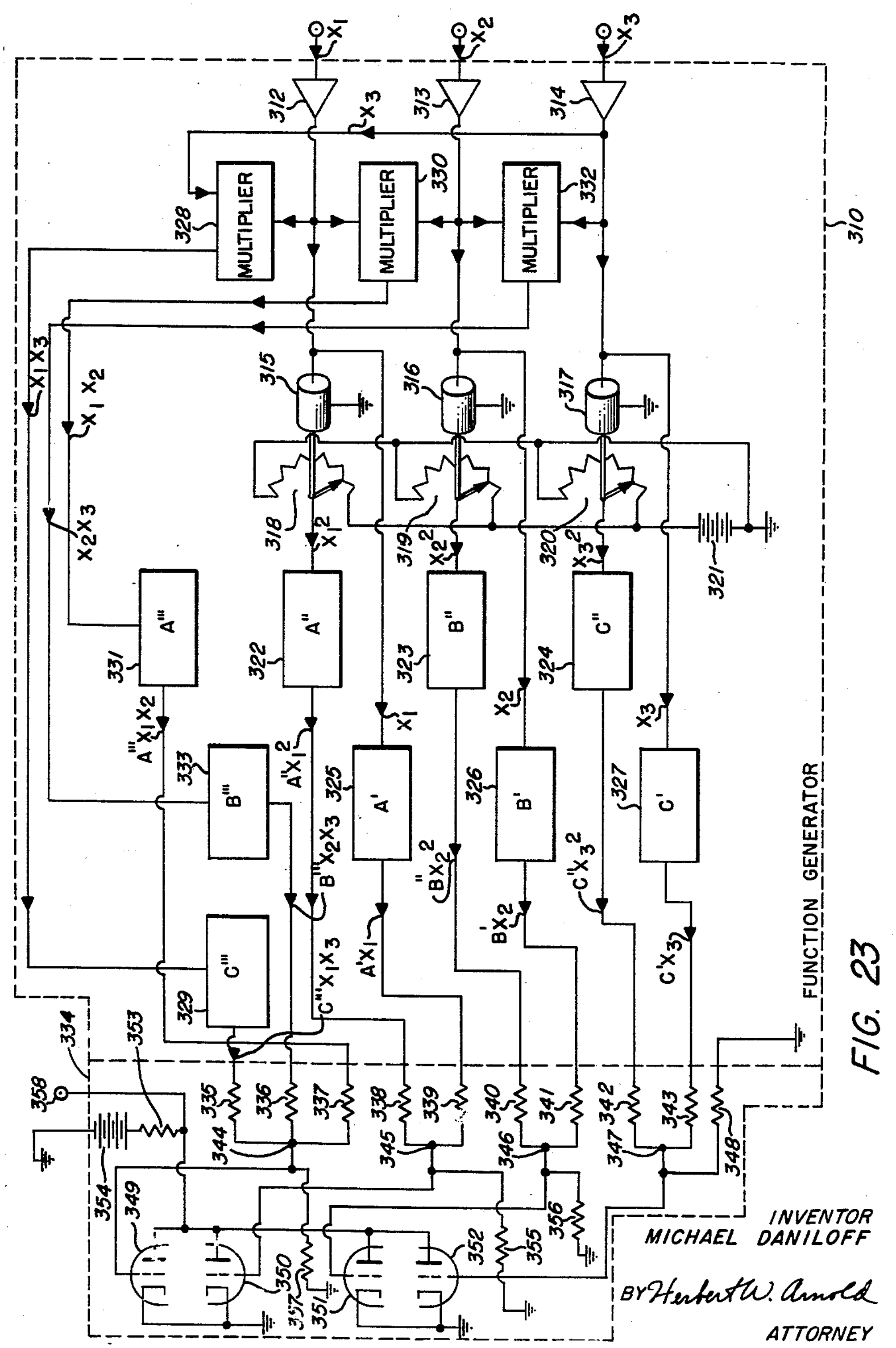
Figure 24:
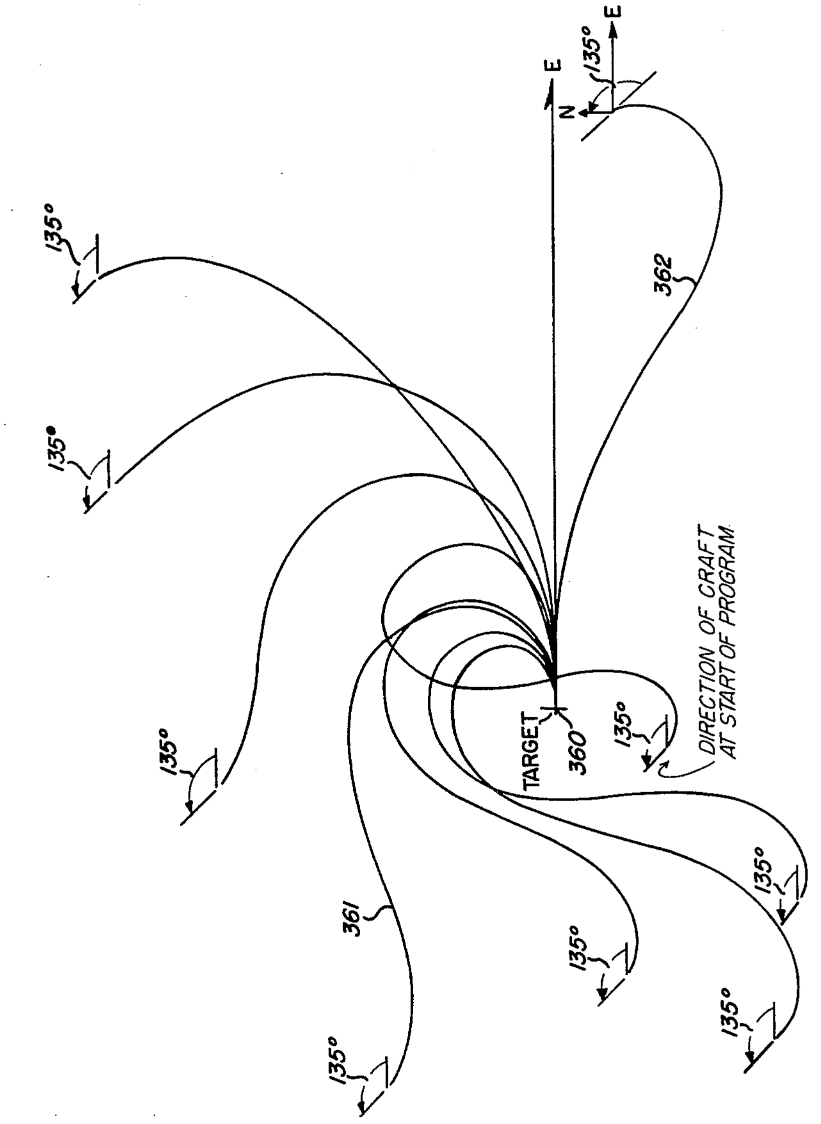
Figure 25:
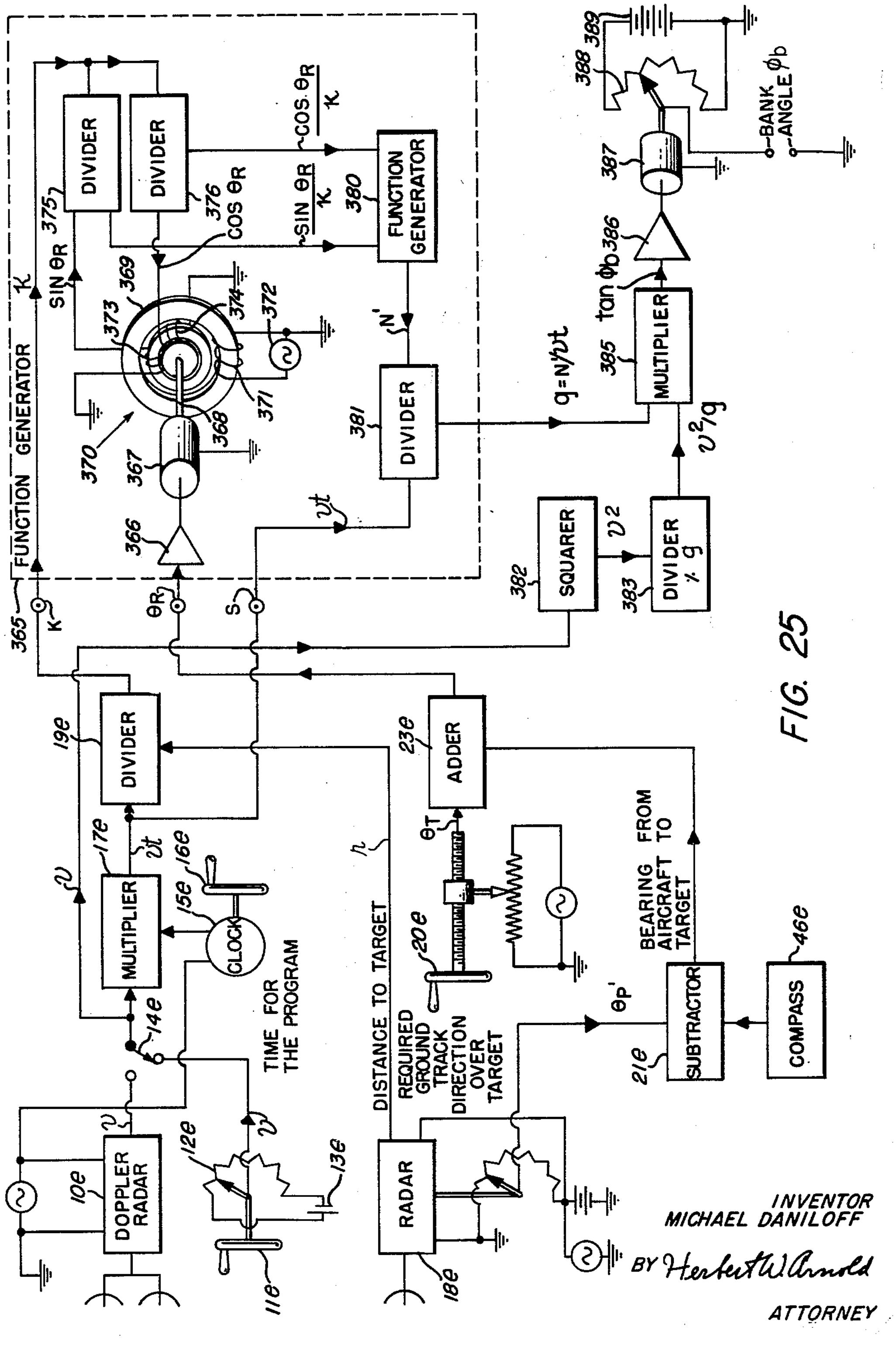
Figure 26:
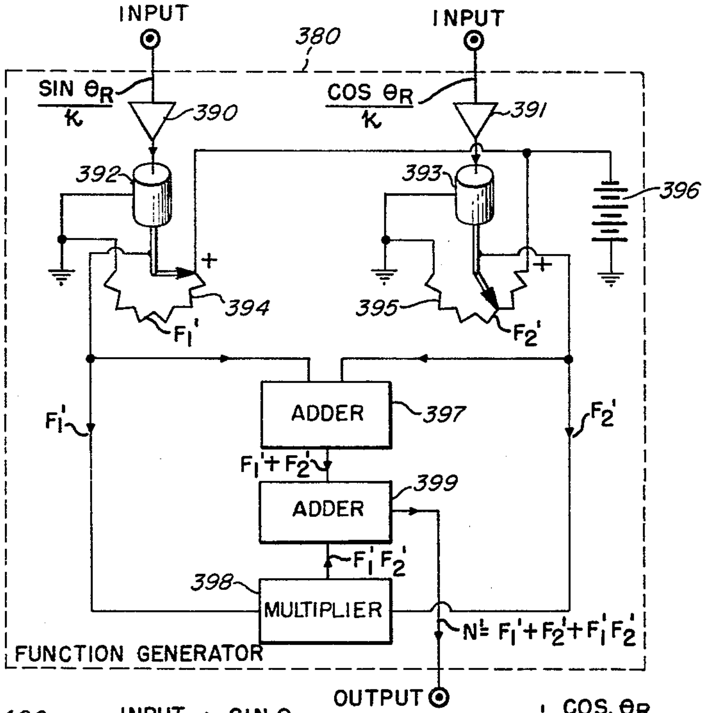
Figure 27:
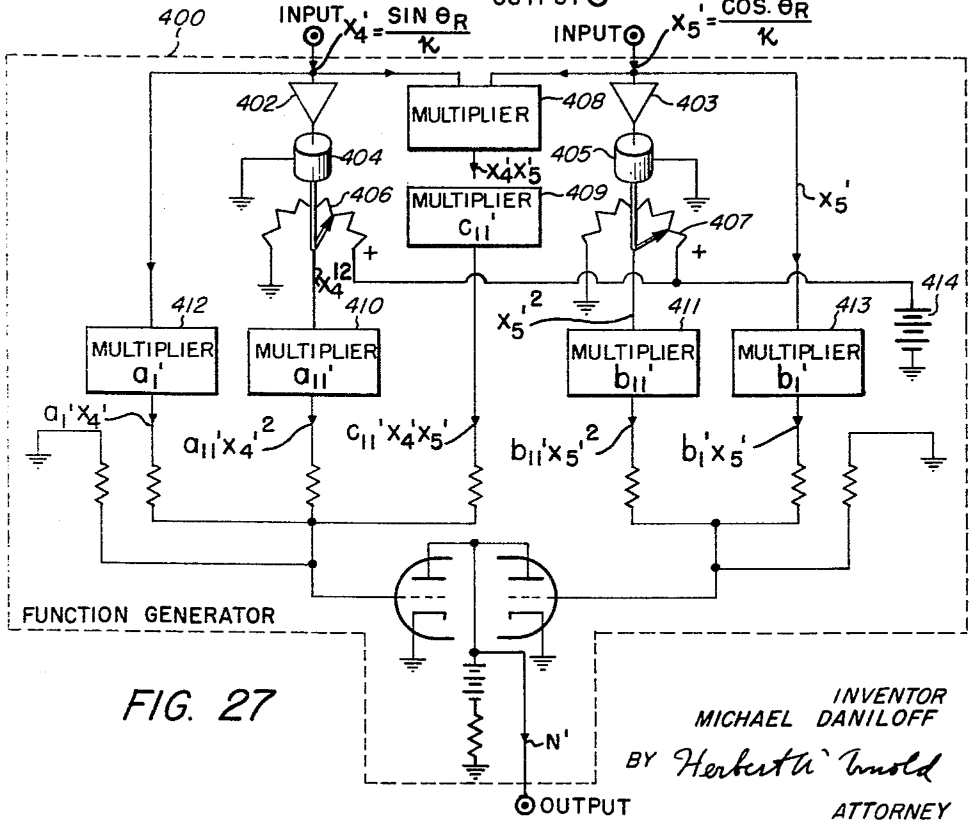
Figure 28:
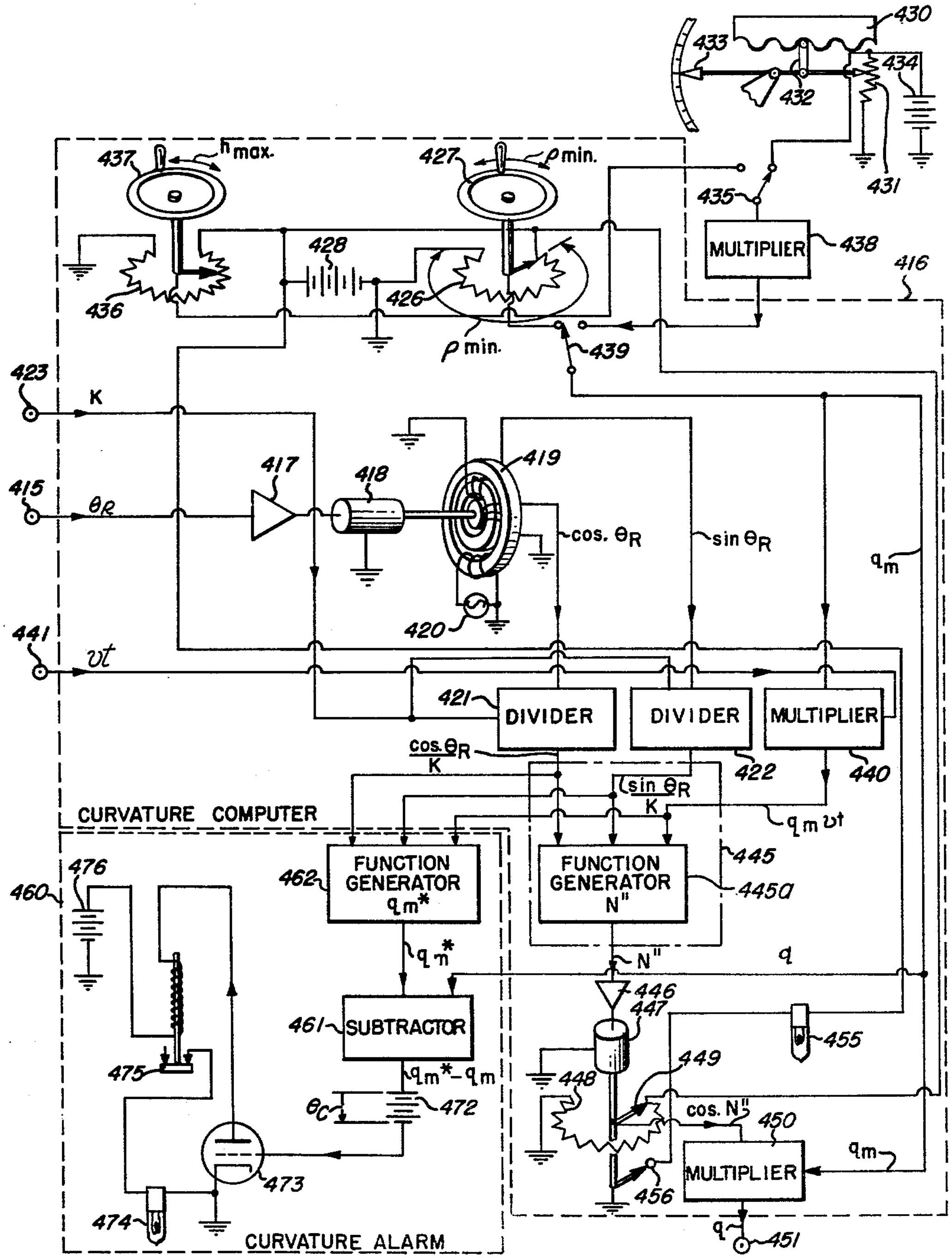
Figure 28A:
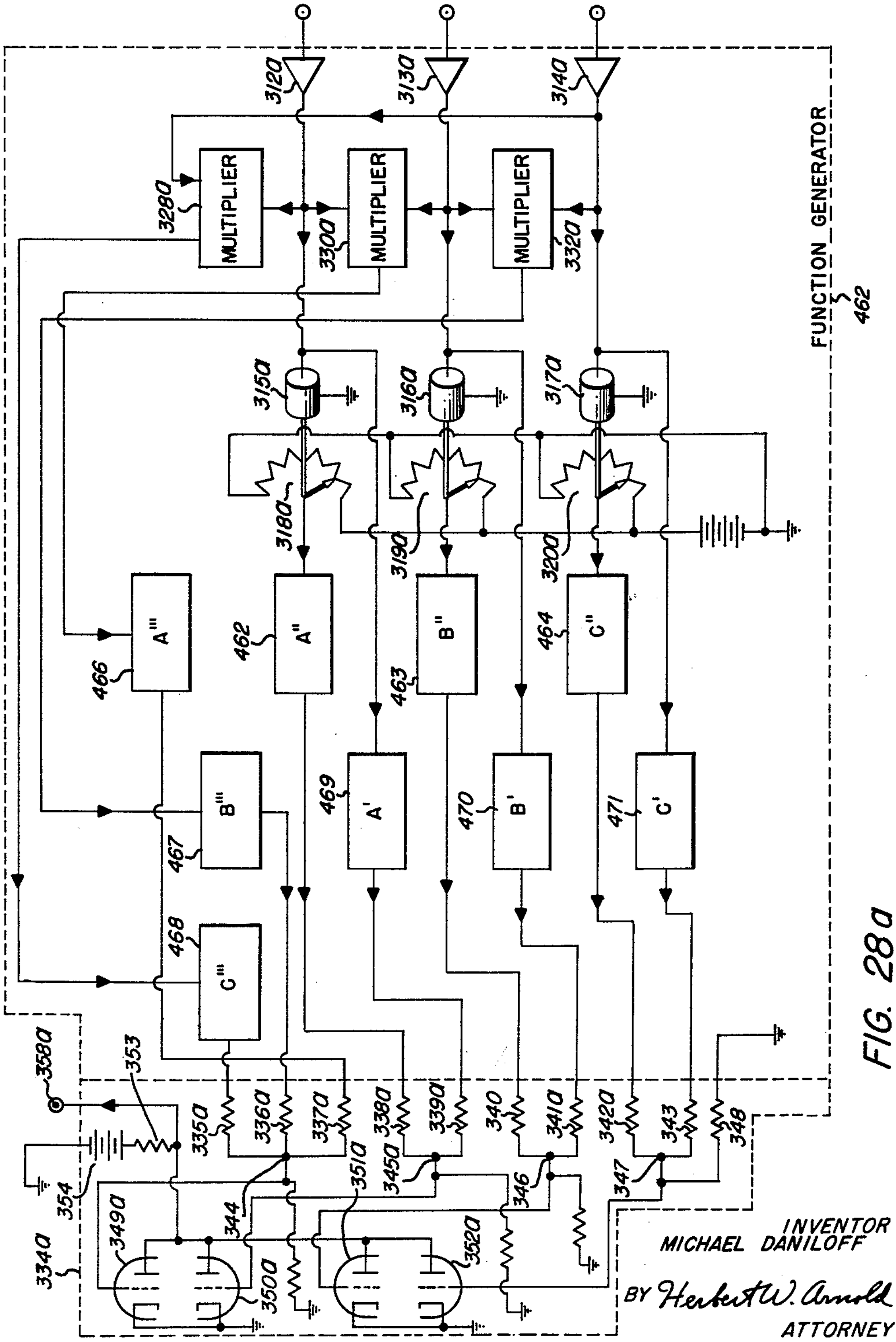
Figure 29:
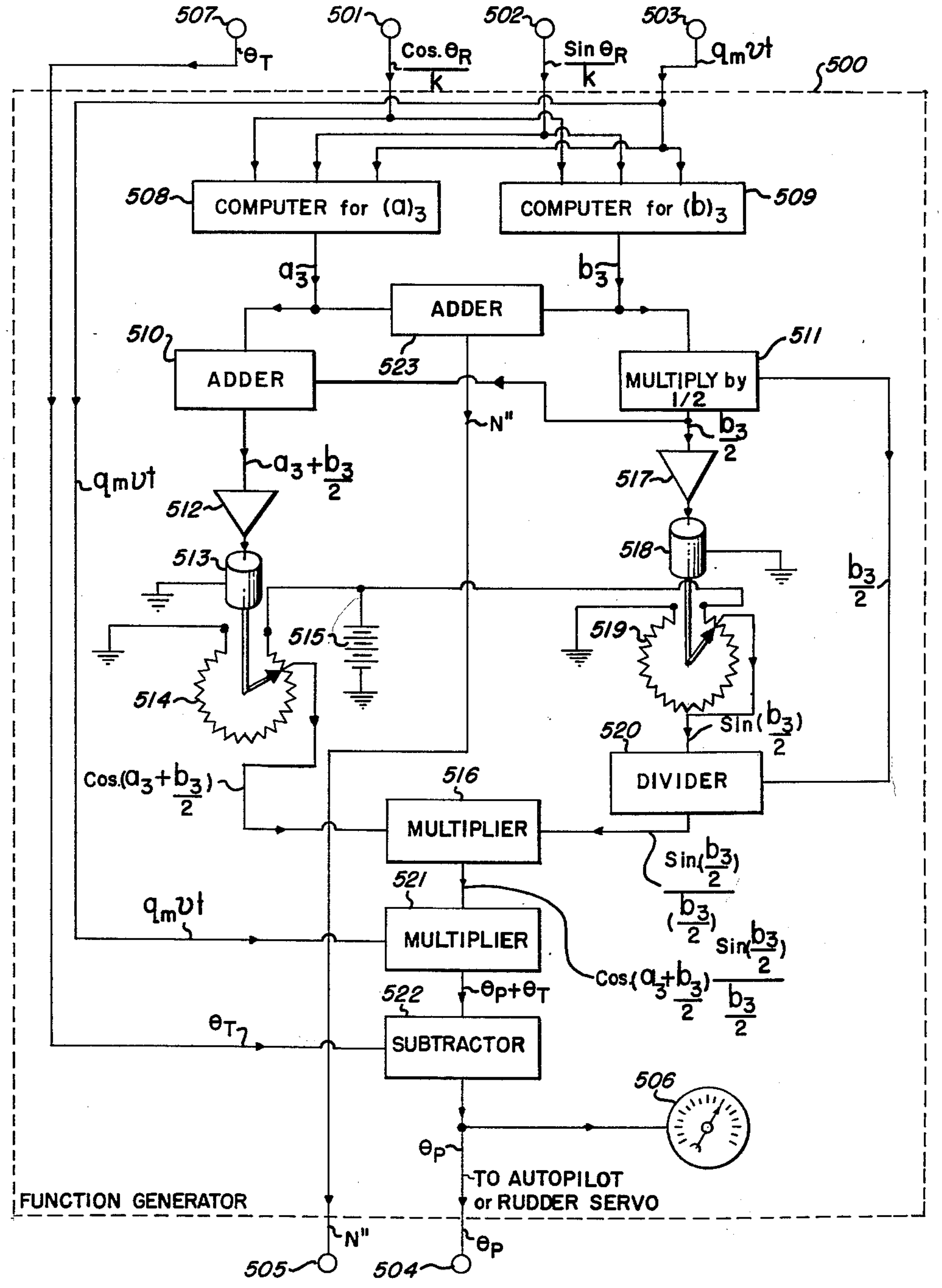
Figure 30:
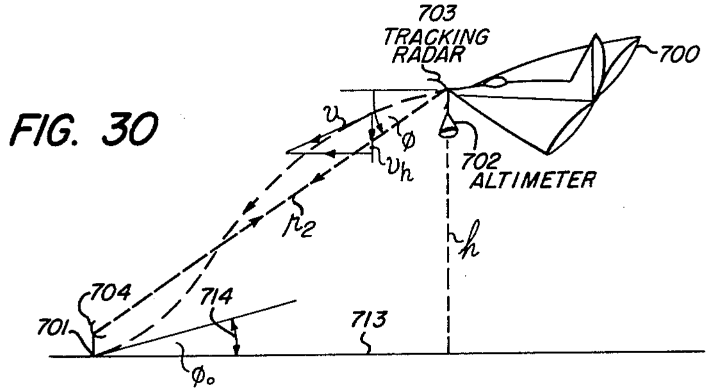

FIG. 16*a* is the magnetization curve of the core material used in the function generator of FIG. 16;

FIG. 17 is a schematic diagram of a navigation system for the projection of motion on a horizontal plane using a function generator which can be hand adjusted to provide a plurality of flight paths;

FIG. 17*a* is a schematic diagram of a direct current multiplier of a quantity by a factor which is capable of hand adjustment, as used in the function generator of FIG. 17;

FIG. 17*b* shows right- and left-handed travel paths obtainable by adjustment of the multiplier of FIG. 17*a*;

FIG. 18 shows four complete flight paths corresponding to different values of the multiplying factor *m*, of FIG. 17;

FIG. 19 is a schematic diagram of a navigation system for the projection of the motion on a horizontal plane which generates a flight path which avoids sudden changes in the direction of motion;

FIG. 20 shows a projection of the flight path on a horizontal plane without sudden changes in the direction of motion;

FIG. 21 is a schematic diagram of a navigation system in which a horizontal flight program can be commenced without an initial break in direction of motion of the craft;

FIG. 22 is a function generator of the bank angle computer, shown in FIG. 21, which determines the auxiliary variable N;

FIG. 23 is a schematic diagram of a function generator for determing by a Taylor expansion a function of three independent variables;

FIG. 24 shows the flight paths for a horizontal path computer which produces flight paths without initial transition periods;

FIG. 25 is a navigation system utilizing function generator which determines the curvature of the flight paths of a craft using the arcs of Cornu spirals as elements of the paths;

FIG. 26 is function generator used in connection with the function generator which determines an auxiliary quantity to obtain the curvature of the flight path;

FIG. 27 is a function generator using squaring potentiometers to obtain an auxiliary quantity used to determine the curvature of the flight path;

FIG. 28 is a schematic diagram of a horizontal program computer in which the maximum curvature of the flight path is preset into the computer;

FIG. 28*a* is a schematic diagram of a function generator for calculating the maximum expected curvature of the flight path generated by the system shown in FIG. 28;

FIG. 29 is a schematic diagram of a function generator which is used in determining the maximum expected curvature of a programmed flight as well as the required course angle of the craft;

FIG. 30 is a schematic diagram of the projection of the path of a vehicle on a vertical plane showing angles and distances to the horizontal plane when the radar or other information equipment is carired in the vehicle.

Figure 31:
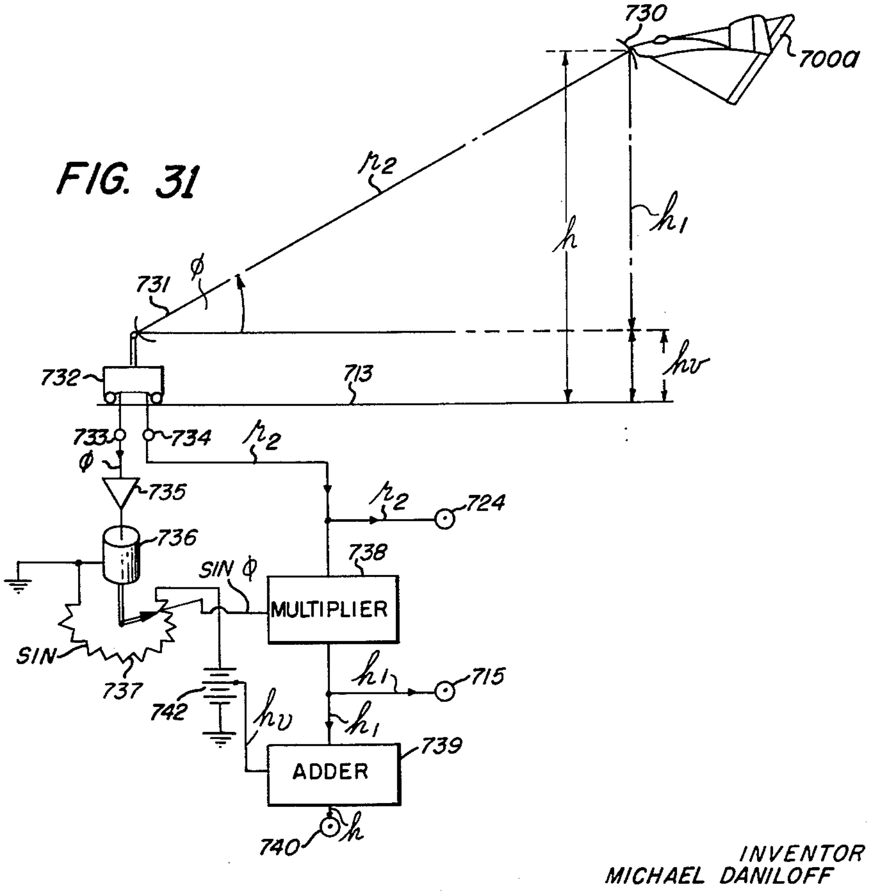
Figures 32, 33:
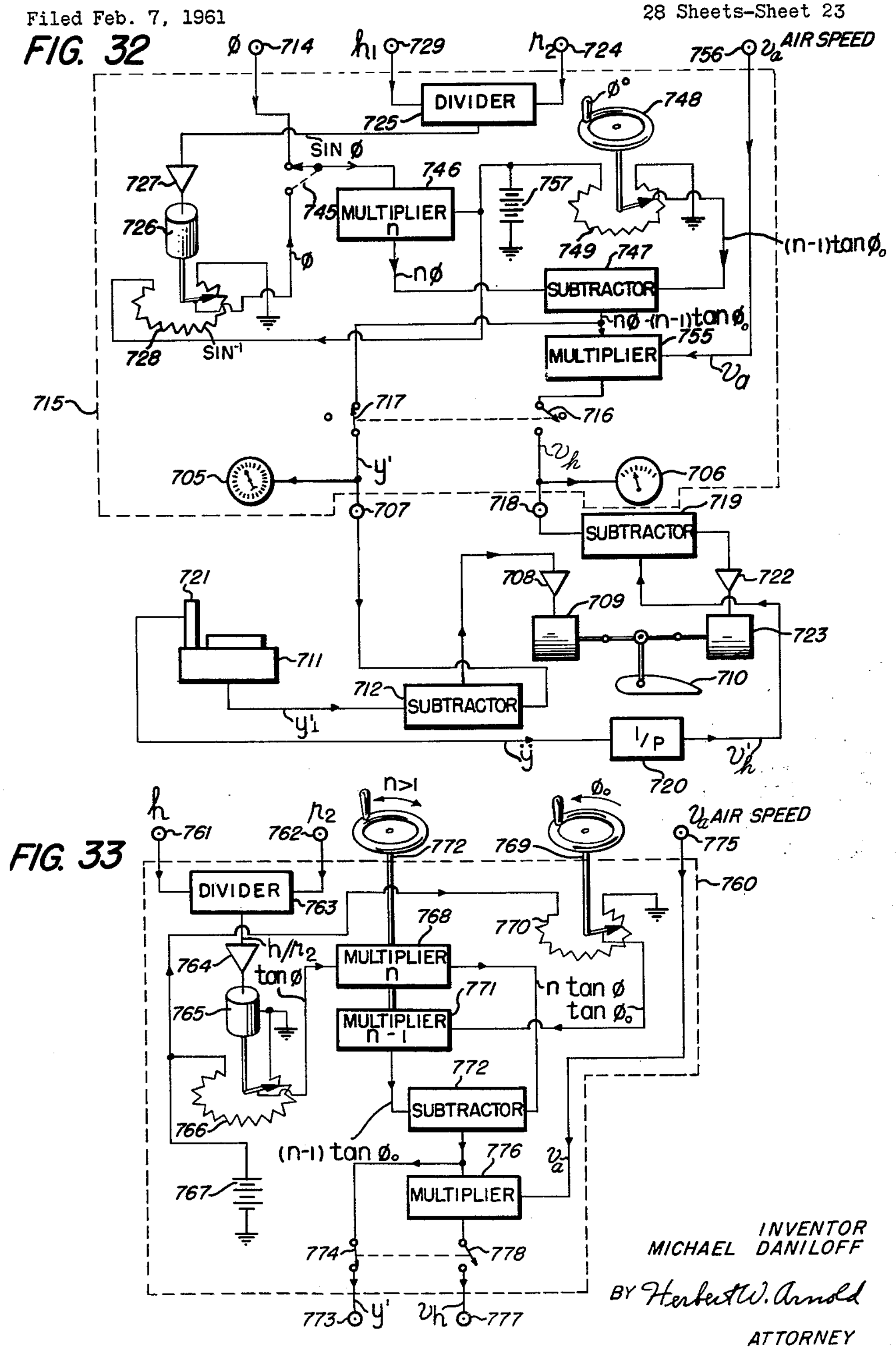

FIG. 31 is a schematic diagram of the projection of the flight path of a vehicle on a vertical plane showing angles and distances to the horizontal plane when the information radar or other source of information is located on the ground plane;

FIG. 32 is a schematic diagram of a vertical path computer generating a nonadjustable path in the vertical plane.

FIG. 33 is the schematic diagram of a vertical path computer having an adjustable type of path.

Figure 34:
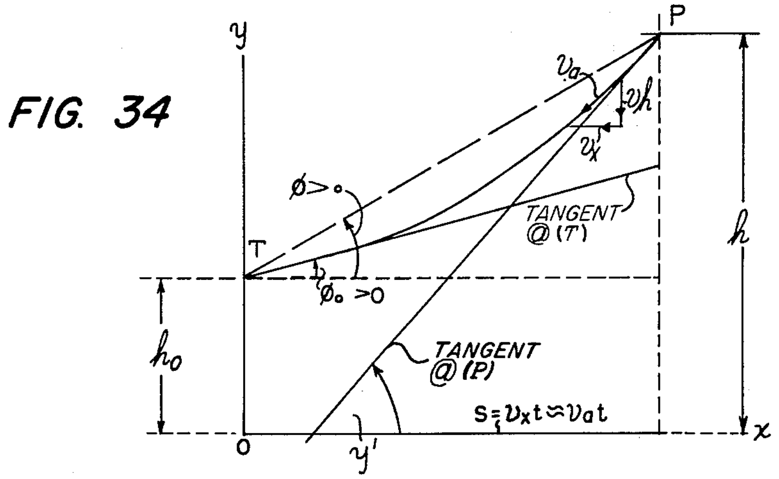

FIG. 34 is a diagram of the projection on the vertical plane of the path of motion of a vehicle used in developing the theory of the vertical path computer.

Figure 35:
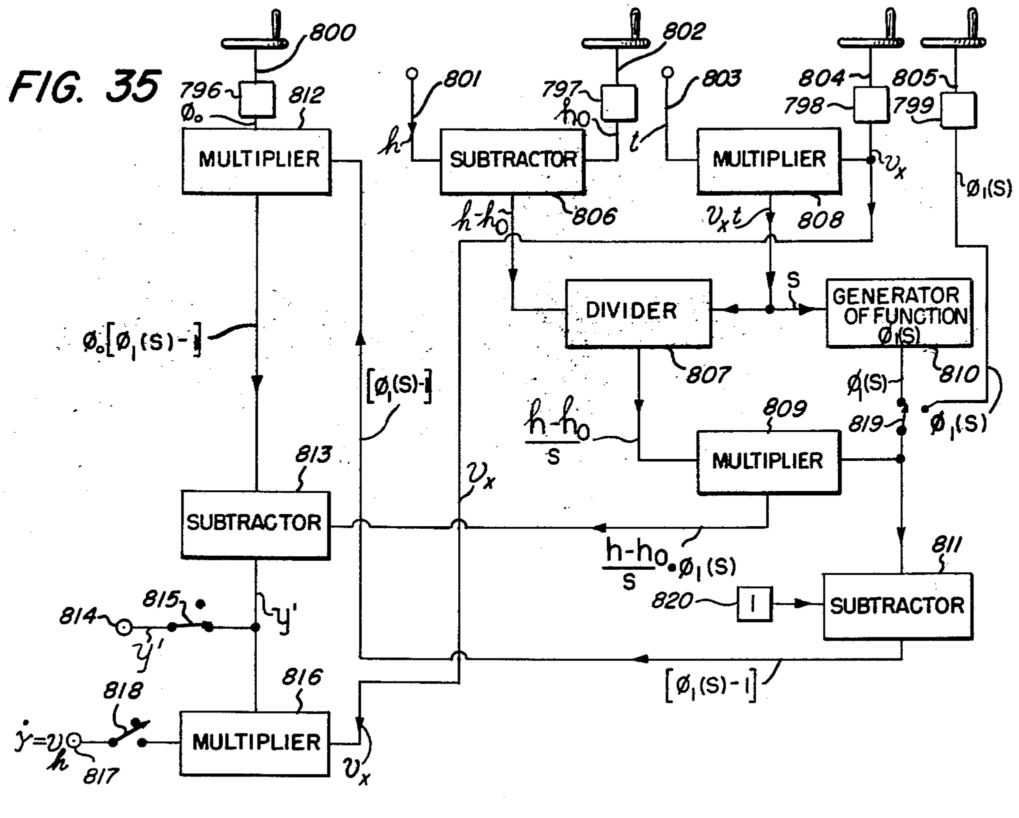

FIG. 35 is a schematic diagram of a vertical flight path computer which programs the flight of a craft to enable the craft to pass over a predetermined point in space at a predetermined altitude and attitude.

Figures 36, 36B:
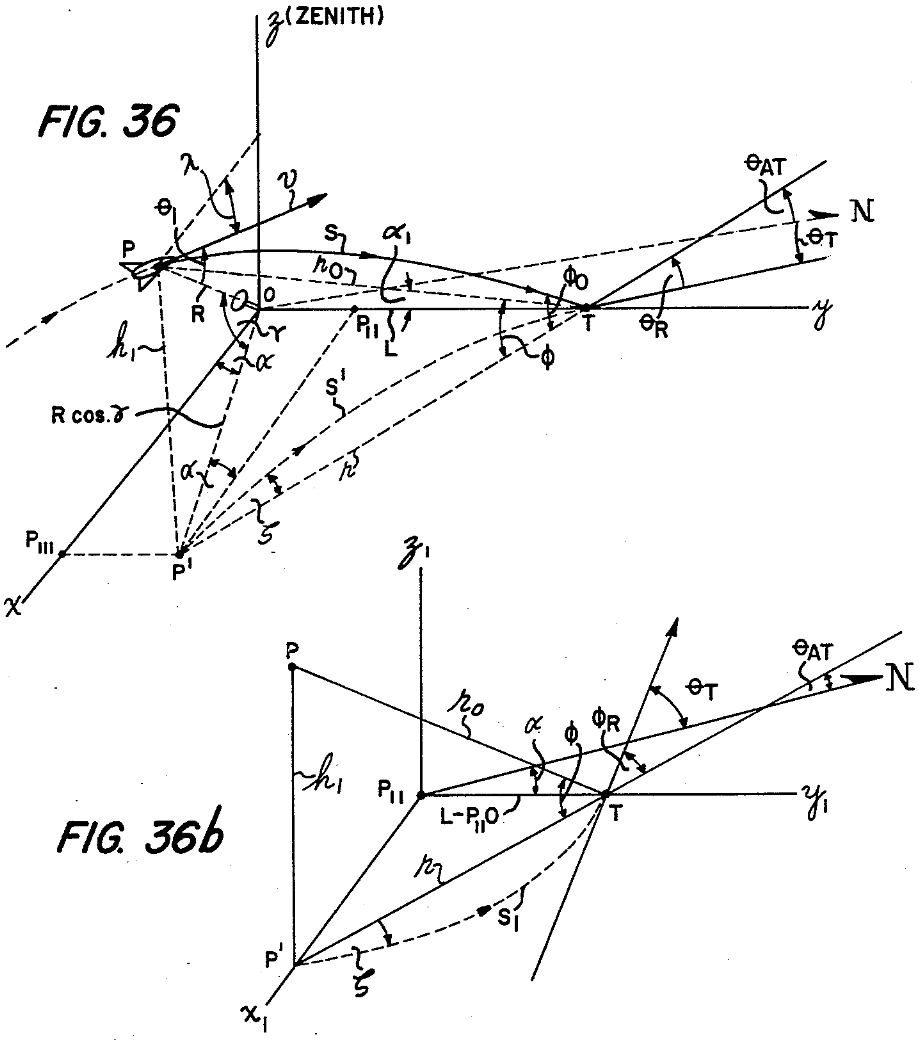
Figure 36A:
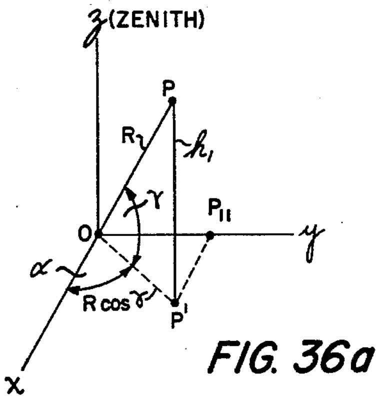
Figure 37:
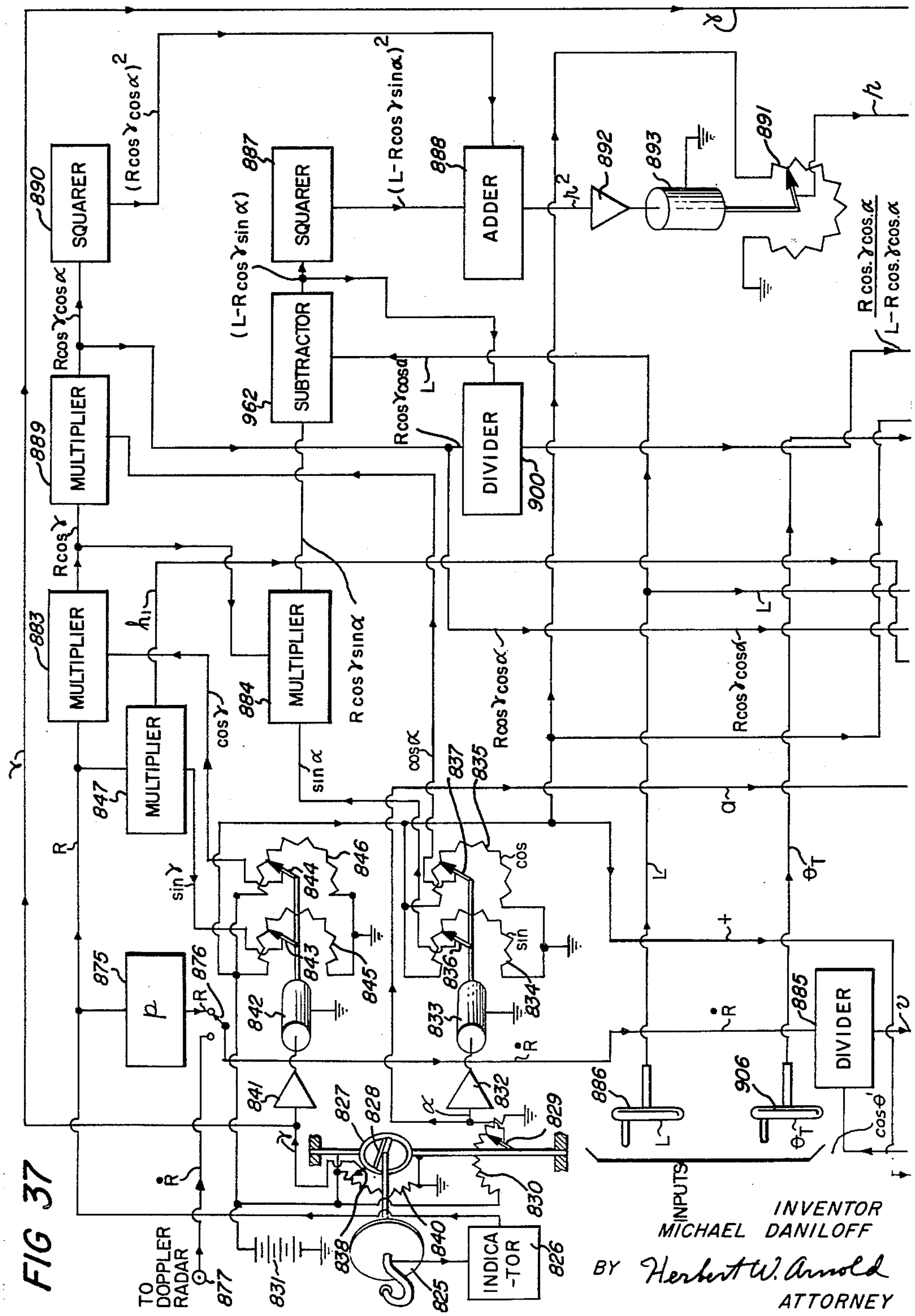
Figure 38:
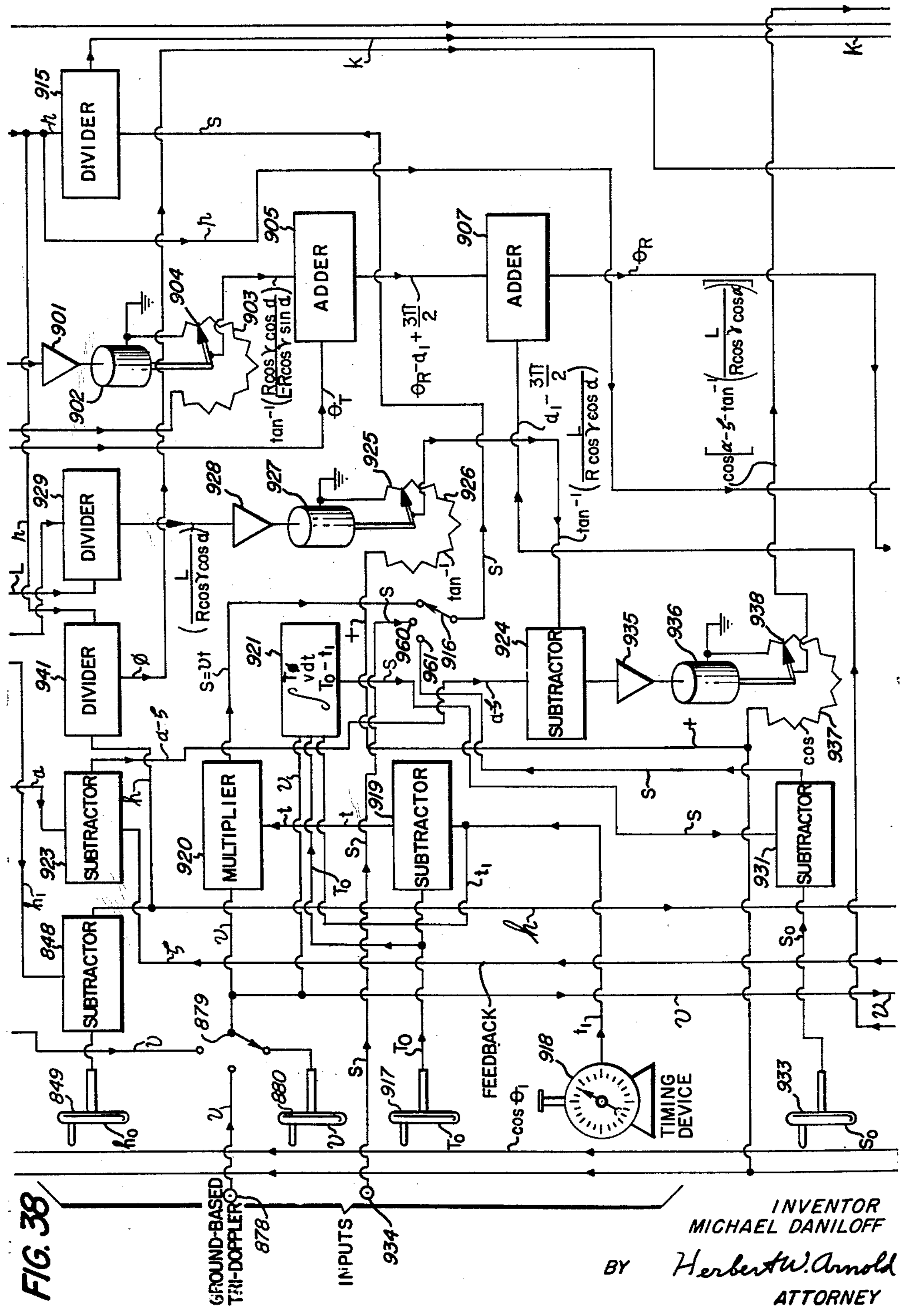
Figure 39:
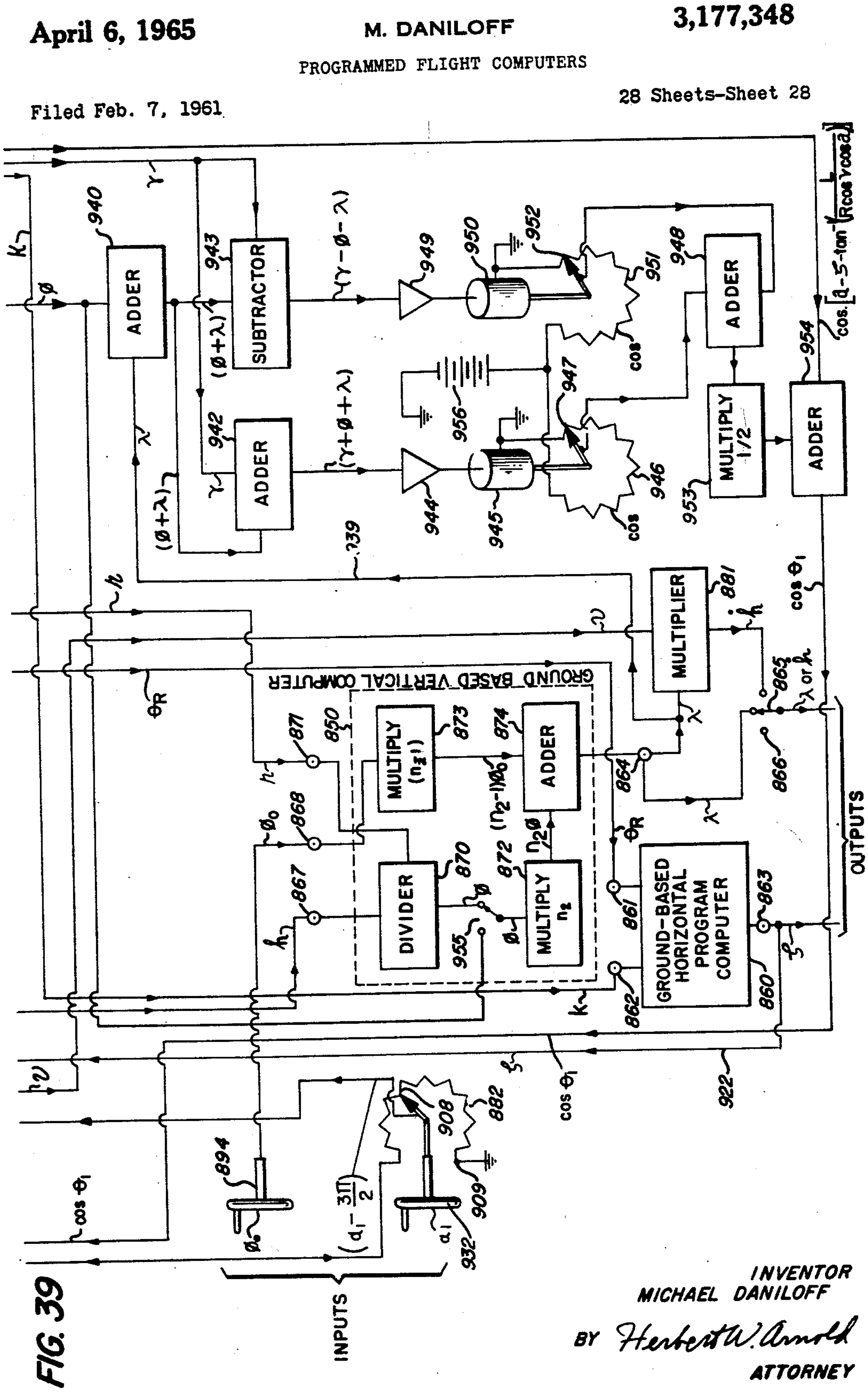

FIG. 36 is a diagrammatic representation of a path of motion of a vehicle which is ordered by vertical and horizontal path computing apparatus located on the ground plane;

FIG. 36*a* is a diagrammatic representation of information supplied by the ground-based radar of FIG. 36;

FIG. 36*b* is a diagrammatic representation of distances and angles for the path motion shown in FIG. 36 when the origin of the coordinate system is located at $P_{11}$ of FIG. 36; and FIGS. 37, 38 and 39 are schematic diagrams of the input information circuits which can be used in connection with the combined horizontal and vertical guidance systems shown in FIG. 36.

Figure 1:
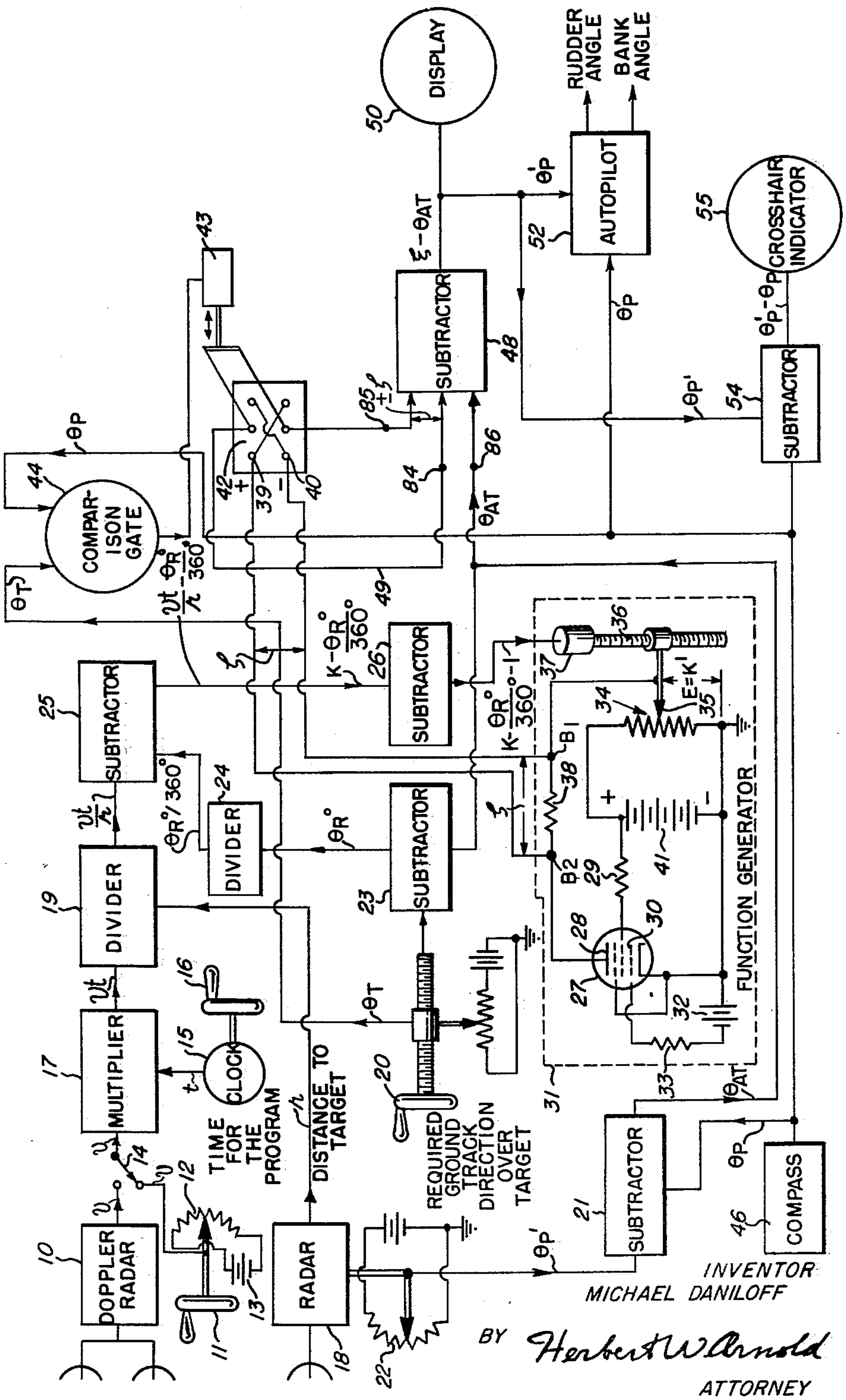
FIG. 1 is a block diagram of a navigation system using an electron discharge device as a computer for obtaining the horizontal flight angle.
Figure 2:
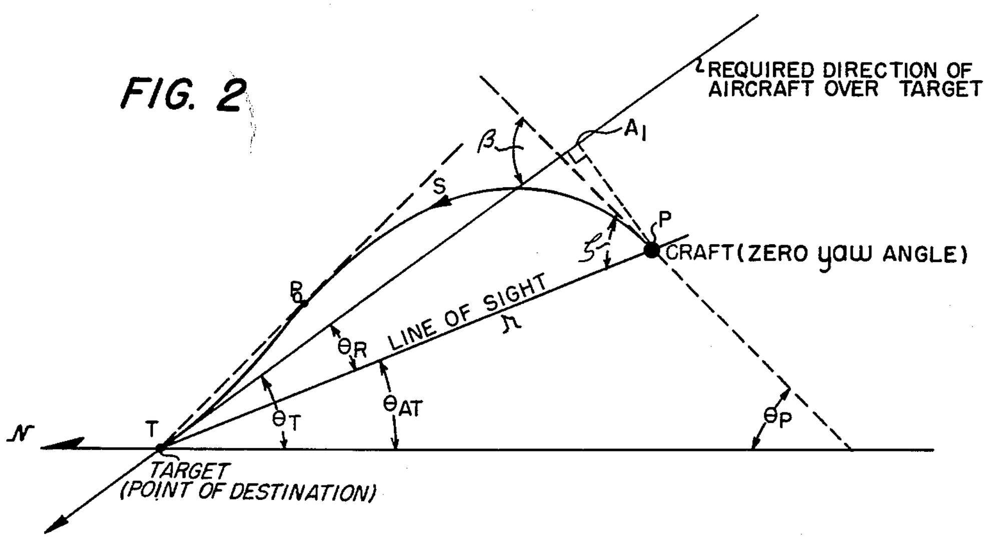
FIG. 2 is a schematic diagram showing the horizontal projection of the flight path.

Referring to FIGS. 1 and 2, the navigation system for the horizontal projection of the flight path, together with a diagram of this projection, is shown with symbols indicating the quantities used in the solution of a programmed flight. In particular, the velocity, $v$ is obtained from a velocity-measuring device, such as a Doppler radar 10, or from a hand-operated crank 11 in response to information supplied to an operator by any suitable means. This crank drives a linear potentiometer 12 supplied with a source of constant voltage 13. A voltage is, therefore, produced which is proportional to the velocity $v$. This voltage which represents velocity can be selected from switch 14 according to the input which provides the more accurate or convenient information from the Doppler radar or hand crank. This velocity is multiplied by time $t$, the desired duration of travel, which is manually set into clock 15 by crank 16 or by other well known means. Clock 15 produces a voltage proportional to the time remaining to arrive at the point of destination and this time is fed to a conventional multiplier 17. This multiplier is a well-known direct current analogue-type multiplier which multiplies together two constant voltages, which are proportional to the velocity $v$ and the time $t$, respectively. The generated output of the multiplier is, therefore, a constant voltage proportional to the output voltage $vt$. This product is shown in FIG. 2 as the arc $s$ of the flight path between the position of the craft, P, at any instant of time and the point of destination or target T.

Referring to FIG. 1, a device for supplying the bearing angle of the line of sight from aircraft to target, such as for example, a tracking radar 18, is directed toward the point of destination, being so directed by a directional signal from the point of destination. As shown in FIG. 2, the tracking radar 18 also provides a direct current voltage proportional to the range $r$, which is the distance between the position of the craft and the point of destination T. The output of the radar 18 is applied to a dividing circuit or divider 19 which divides the voltage proportional to the arc $s$ by the voltage proportional to the range $r$ and produces a constant voltage proportional to the ratio $$k=\frac{s}{y}$$

The required angle of ground track over the target in degrees, $\theta_T$, with reference to North, as shown in FIG. 2, is introduced by the handcrank 20. This crank moves a pointer along a linear resistance to which is connected a source of constant voltage. The output voltage at the pointer is then proportional to the angle $\theta_T$. At the same time, the tracking radar 18 drives a potentiometer arm mechanically linked to the antenna shaft of the radar 18. The shaft is stabilized in the vertical direction by well-known gyro stabilization means, not shown. Driven potentiometer 22 provides a D.C. signal, $\theta_{P'}$ proportional to the angle between the line of sight from the craft to the point of destination and the longitudinal axis of the craft. This signal is added with the proper sign in a well-known adder 21 to a signal proportional to the ground track angle of the craft $\theta_P$, as supplied by a compass 46. The output of the adder 21 is proportional to the bearing of the line of sight of the craft to the point of destination or target, $\theta_{AT}$, as shown in FIG. 2. The input $\theta_T$ and the input $\theta_{AT}$, expressed in degrees, and with the proper signs are applied to a conventional analogue constant voltage subtractor 23, the output of which is the angle between the required direction of the craft over the point of destination and the direction of the line of sight of the craft to the point of destination. This angle is represented by the letter $\theta_R$, as shown in FIG. 2. The value $\theta_R$, expressed in degrees, is applied to voltage divider 24, which provides an output voltage which is the $\frac{1}{360}$ part of the input voltage. This scale change is to reference the voltage $\theta_R$ with respect to 360 degrees. The theoretical justification of this procedure will be described in detail. The output of the divider $\theta_R/360$ is applied to a conventional subtractor 25 which has been adapted to subtract this input by reversing the polarity of the input voltage $\theta_R/360$ so as to cause this quantity to be subtracted, that is, algebraically added to the output K of the divider 19. The remainer $$K-\frac{\theta_R}{360}$$

is applied to a subtractor 26 which comprises a series-connected predetermined negative bias voltage representing unity.

The output of the subtractor, representing the quantity $$K-\frac{\theta_R}{360}-1$$

which for convenience is referred to as K′, is fed to a function generator 31 for producing the angle of flight $\zeta$, previously mentioned. It should be understood that the function generator shown in FIG. 1 is one of a plurality of embodiments of said generator and that other embodiments of the function generator will be explained in detail.

Referring to the function generator shown in FIG. 1, a pentode-type tube 27, such as 6AU6, is used, having a screen grid maintained at a potential of 150 volts, independently of the varying voltage on plate 28, by means of resistor 29, connected to a 150-volt source 41. The suppressor grid is tied to the cathode and the grid 30 of the tube is held at a constant negative bias of −10 volts by battery 32 and grid resistor 33. The plate or anode voltage is adjusted by a linear potentiometer 34, having a sliding arm 35. The position of the arm is determined by a linearly threaded shaft 36 which is driven by a well-known position servo 37 with the well known amplifier and feed back loop, not shown. The rotation of the shaft, therefore, is proportional to the quantity K′. The potentiometer 34 divides a voltage of 150 volts from the direct current source 41 proportionally to the input signal to linear position servo 37 so that the voltage $E=K'$ for the selected scale of voltages. It should be understood that position servo 37, as noted, comprises the well-known feedback loop having the usual amplifier and comparison element. The current flow through plate resistor 38 is proportional to the required horizontal flight angle $\zeta$. This angle closely approximates the plate characteristic curve for a pentode-type tube. The voltage drop through plate resistor 38 is, therefore, proportional to the horizontal angle of flight.

It should be understood that variations in the shape of a typical pentode curve, due to manufacturing differences or to differences in operating voltage within the usual operating limits, do not adversely affect the accuracy of the system. In fact, the curve can be approximated by various other devices, such as, for example, saturable reactors which permit the use of alternating current computing components, biased diodes, cams, harmonic analyzers, and similar devices so long as the shape of their output quantity, relating the angle of horizontal flight $\zeta$ with the generated input quantity fed to the function generator, is approximately a curve having a shape similar to that of a pentode plate characteristic. That is to say, the curve starts substantially vertically at the origin of coordinates for the quantities representing the ordinate and the abscissa, $$K-\frac{\theta_R}{360}-1$$

The curve then exhibits a "knee" or region of relatively high curvature at approximately one-fifth of the entire range of the abscissa, and then extends with a relatively slow rise for the remainder of the range. A curve of this character is shown in connection with a presentation of the theory for this computer to be given below.

Returning now to FIG. 1, the direct current output voltage, taken across plate resistor 38 of the pentode function generator, is fed to the positive and negative terminals 39 and 40, respectively, of a reversing switch 42. A servo 43 having the usual amplifier, not shown, operates the arm of the reversing switch in response to a signal obtained from a well-known comparison gate 44. One input to the comparison gate 44 is the angle $\theta_P$, which is the angle between the horizontal flight path of the craft with respect to, say North, as determined by compass 46, and the angle $\theta_T$ shown in FIG. 2. The other input to the comparison gate is the angle $\theta_T$, which is the required ground track direction over the target. When $\theta_P$ and $\theta_T$ are equal, the polarity of the voltage output $\zeta$ is reversed by a reversing switch 42. The output of switch 42 is fed by leads 84 and 85 to a direct current subtractor 48 which subtracts $\theta_{AT}$ from the required flight angle $\zeta$. The value $\theta_{AT}$ is connected to the subtractor 48 by way of lead 86.

The output across anode resistor 38 in the function generator 31 is reversed to prevent the craft from flying, under certain flight conditions, a spiral course around the point of destination. By definition, $\zeta$ is considered to be positive when the path of flight of the craft lies to the right of the line of sight extending from the craft to the target, as shown in FIG. 2. When the length *s*, of the required flight path is programmed relatively long in relation to the distance *r*, between the craft and target, the craft overshoots the desired direction of flight over the target, as introduced by handcrank 20. It then becomes necessary that the sign of the angle $\zeta$ be reversed at a point such as $P_0$, as shown in FIG. 2. Since the function generator always provides a positive value of $\zeta$, the latter value is mechanically reversed in polarity when the ground track angle $\theta_P$ becomes equal in magnitude to the angle $\theta_T$. If the sign of is not reversed under these conditions, the craft would travel in an ever-tightening spiral around the point of destination.

Referring again to FIG. 1, the output of the reversing switch 42 is applied to a subtractor 48 as the minuend, the subtrahend being the angle $\theta_{AT}$ applied to the subtractor by the lead 86. The subtractor 48 will be presently described. The differences between the angle $\zeta$ and $\theta_{AT}$ is the required ground track angle $\theta_{P'}$, at any one instant of time. This value is applied to a well-known visual display device 50, such as a course indicator for the guidance of the pilot in manual control or alternatively to an autopilot 52. The other input to the autopilot 52 is the actual ground track angle of the aircraft $\theta_P$. The autopilot operates in a well-known manner, so as to equate the values of its two inputs $\theta_{P'}$ and $\theta_P$ from compass 46 by ordering the appropriate rudder and bank angles to fly the craft so as to execute the program.

In addition, $\theta_{P'}$ and $\theta_P$ can be applied to a subtractor 54 which actuates a well-known cross-hair indicator 55, the pointer of which is maintained at zero by the pilot to fly the craft as required to complete the preset flight.

Figure 3:
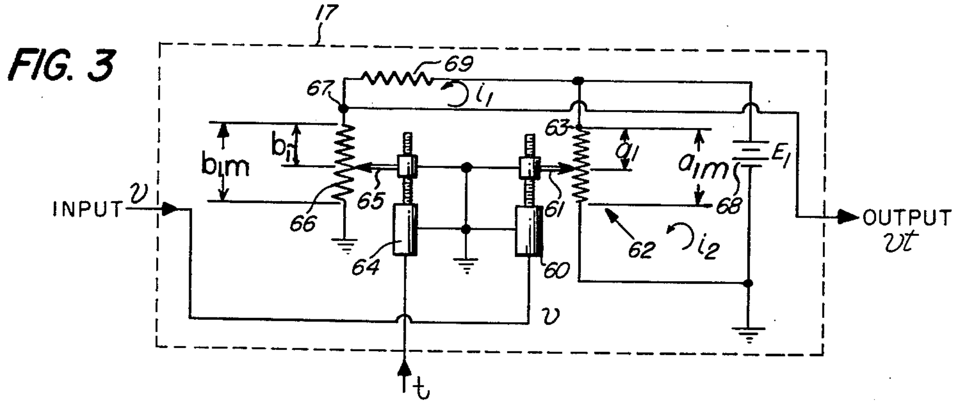
FIG. 3 shows a typical constant voltage signal multiplier.
Figure 4:
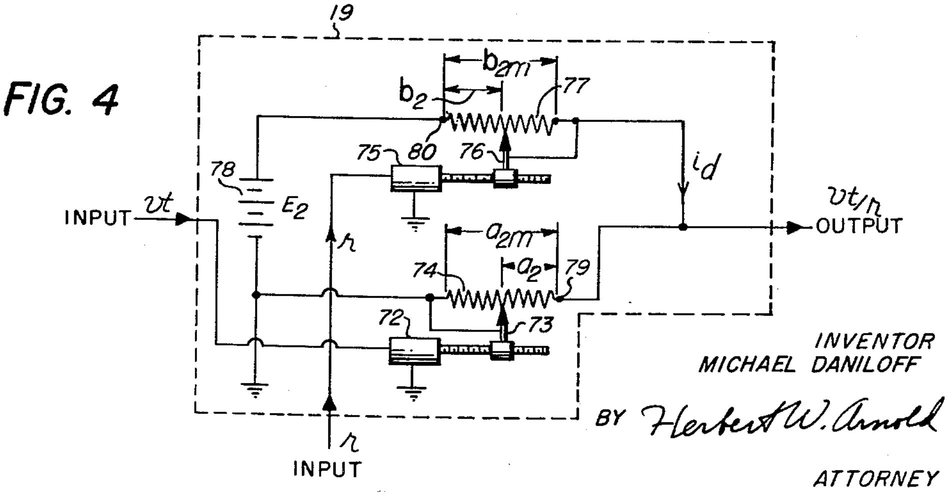
FIG. 4 shows a typical constant voltage signal divider.

Referring to FIGS. 3 and 4, by way of illustration and not by way of limitation, a typical voltage multiplier and divider is shown which can be used as the multiplier 17 and divider 19, respectively, of FIG. 1.

In particular, FIG. 3 shows a D.C. multiplier in which the factor *v* in the form of a positive D.C. signal is applied to a well-known D.C. servomotor 60, having a well-known amplifier and feedback loop, not shown, servomotor 60 sets a pointer 61 of the potentiometer 62 so that the resistance between the pointer and the positive terminal 63 of the potentiometer 62 is a value of resistance $a_1$ in ohms. This resistance is proportional to the input voltage *v*. The second factor or input is set up as a resistance $b_1$, in ohms, proportional to said second factor *t* by a servomotor 64, having an amplifier and feedback loop, not shown, servomotor 64 is actuated by the input *t* to move a pointer 65 on potentiometer 66, so that the resistance $b_1$, in ohms, between the positive terminal 67 and the pointer 65 is proportional to the input *t*, in volts. A source of direct current 68 is applied to the two potentiometers by way of a 6000-ohm resistor 69. The product, $s=vt$, is obtained as a positive voltage output.

The operation of the D.C. multiplier circuit as used in the multiplier 17 of FIG. 1 is as follows: Designate $i_1$ and $i_2$ the circulating currents in the meshes or loops of the circuit, shown in FIG. 3. $E_1$ is the electromotive force of the source 68, $a_1$ is the resistance set by arm 61. $a_1m$ is the total resistance of potentiometer 62, $b_1$ is the resistance set by pointer 65, $b_1m$ is the total resistance of potentiometer 66, and $R_0$ is the load resistance 69.

Then:

$$E_1-a_{1m}i_2+a_1i_1=0$$

$$-(R_0+b_1+a_1)i_1+a_1i_2=0$$

from which:

$$i_1=\frac{E_1a_1}{\Delta}$$

and:

$$c=i_1b_1=\frac{E_1}{\Delta}a_1b_1$$

where:

$$\Delta=a_{1m}(R_0=b_1+a_1)-a_1^2$$

calling:

$$\Delta_1=a_{1m}R_0=\text{const.}$$

and setting:

$$c=\frac{E_1}{\Delta_1}a_1b_1=\text{const.}\times a_1b_1$$

That is to say, the potential of the terminal 67, FIG. 3, is proportional to the value of the product $a_1b_1$.

Let *e* be the relative error of the multiplier, then:

$$e=\frac{\Delta-\Delta_1}{\Delta}=1-\frac{\Delta_1}{\Delta}=1-\frac{R_0a_{1m}}{a_{1m}(R_0+a_1+b_1)-a_1^2}$$

from which:

$$R_0=\frac{(1-e)[a_{1m}(a_1+b_1)-a_1^2]}{ea_{1m}}$$

As an example appropriate to the horizontal path program computer:

$$s=vt$$

in which:

200 m.p.h. *v* 600 m.p.h.

0 hours *t* 6 hours

Let the scales be chosen so that:

100 m.p.h.=1 ohm 1 hour=1 ohm

And the error tolerated:

$$e=0.1\%$$

Then:

$$R_0=\frac{999\times(6\times12-6^2)}{6}=6000\text{ ohms}$$

This value of the resistance, $R_0$, insures an accuracy of at least 0.1% for all values of the factors *v* and *t* which the design is intended to cover. Similar calculations can be carried out for other values of the factors. Since both factors are always positive, the product $s=vt$ is likewise positive, and sign sensors for the factors are not required.

Referring now to FIG. 4, there is shown a D.-C. divider 19 in which the numerator *vt* in the form of a positive voltage signal is applied to a well known D.-C. linear position servomotor, as previously described, which drives a pointer along a linear potentiometer 74. This pointer determines the resistance $a_2$ in ohms between the positive terminal 79 of the potentiometer 74 and the arm 73. The denominator *r* is a D.C. signal which is applied to a well known D.C. linear servomotor 75 which drives arm 76, along the linear potentiometer 77. This determines the resistance $b_2$ in ohms between the positive terminal of the potentiometer 77 and the arm 76. A source of voltage 78, the value of which is designated by $e_2$, is connected in series with the two potentiometers 74 and 77. The ratio $vt/r$ is taken from the positive terminal 79 of the potentiometers 74. The principle of operation of the divider follows. The D.C. voltage at terminal 79 is proportional to the quotient $vt/r$ because $i_d$, as shown in FIG. 4 is given by $$i_d=\frac{e_2}{a_2+b_2}\text{ amperes} \qquad (1)$$

in which, $i_d$ is the current in the potentiometer circuit, as shown, and $a_2$ is the resistance between terminal 79 and arm 73. Also, $b_2$ is the resistance between arm 76 and terminal 80. Further, let the total resistance of potentiometer 77 be $b_{2m}$ and the total resistance of potentiometer 74 be $a_{2m}$. Then, the voltage, above ground potential, of the terminal 79 is:

$$C=\frac{e_2a_2}{a_2+b_2} \qquad (2)$$

If $b_2>>a_2$, this is approximately, subject to the relative error $e$, proportional to the ratio $a_2/b_2$. The scale of the divider 19 is selected so that the relative error shall be $e$, as follows:

$$C^1=\frac{e_2a_2}{b_2} \qquad (3)$$

Then, the relative error $e$ is given by:

$$e=\frac{C^1-C}{C^1}=1-C/C_1 \qquad (4)$$

That is to say:

$$e=1-\frac{ea_2(a_2+b_2)}{ea_2/b_2}=1-\frac{b_2}{a_2+b_2} \qquad (5)$$

From which, solving for $b_2$:

$$b_2=\frac{1-e}{e}\cdot a_2 \qquad (6)$$

Now:

$$K=vt/r=a_2/b_2$$

In which:

$$0<vt<600\text{ miles, and}$$

$$0<r<600\textit{ miles}$$

Then selecting a scale factor such that:

$$\text{Zero ohms }<a_2<6\text{ ohms}$$

and a permissible relative error $e=.01\%$;

Then by equation:

$$b_{2m}=\frac{1-.0009}{1/10,000}\times 6.0=60,000\text{ ohms} \qquad (6)$$

Consequently, the required scale for the dividing circuit 19 is:

$$\text{Zero ohms}<b_2<60,000\text{ ohms}$$

In a particular flight, as is clear from FIG. 2, $s$ approaches zero at about the same rate as $r$ approaches zero. Consequently, the resistance $b_2$ is at all times approximately 10,000 times as large as the resistance $a_2$, and thus the error stays near to the designed value E. In addition, since both the dividend $vt$ and the divisor $r$ are always positive, the quotient $K=s/r$ is, likewise, positive. As a consequence, it is not necessary to provide sign sensors in the circuits which carry the signals $vt$ and $r$, and no reversing switch for the quotient K is necessary.

Figure 5:
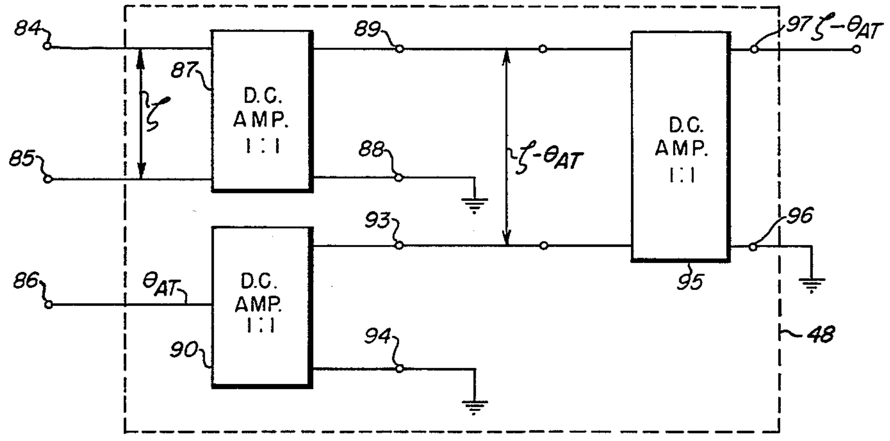
FIG. 5 is a direct current subtractor having three inputs and a single output.

Referring to FIG. 5, a D.C. subtractor such as the subtractor 48 of FIG. 1 is shown in detail for the purposes of illustration and not limitation. The flight angle $\zeta$ is applied to subtractor 48 as a D.C. voltage between terminals 84 and 85 of reversing switch 42 of FIG. 1. This voltage is applied to a well known D.C. isolation amplifier having a 1:1 amplification ratio. Let the potential of terminal 89 be $V_1$, and the potential of terminal 88 be $V_2$. Then $\zeta=V_1-V_2$. The input $\theta_{AT}$ is a positive D.C. signal, which is to be subtracted from the angle $\zeta$. This signal is applied from terminal 86 to a second D.C. isolation amplifier 90 with an amplification ratio of 1:1 and having output terminals 93 and 94. Let the potential at terminal 93 be $V_3$ and the potential at 94 be $V_4$. As is customary, these potentials are given with respect to ground. Then, $\theta_{AT}=V_3-V_4$, and $$\zeta-\theta_{AT}=(V_1-V_2)-(V_3-V_4)=V_1-V_2-V_3+V_4$$

Since the terminals 88 and 94 are grounded, $V_2=0$, and $V_4=0$, and $\zeta-\theta_{AT}$ is equal to $V_1-V_3$, that is, the potential difference between terminals 89 and 93. These potentials are applied to a third D.C. isolation amplifier 95, having an amplification ratio of 1:1 and a negative terminal 96 which is grounded. Therefore, the potential at terminal 97 represents the required difference $\zeta-\theta_{AT}$ which constitutes the output of the subtractor 48.

Figure 6:
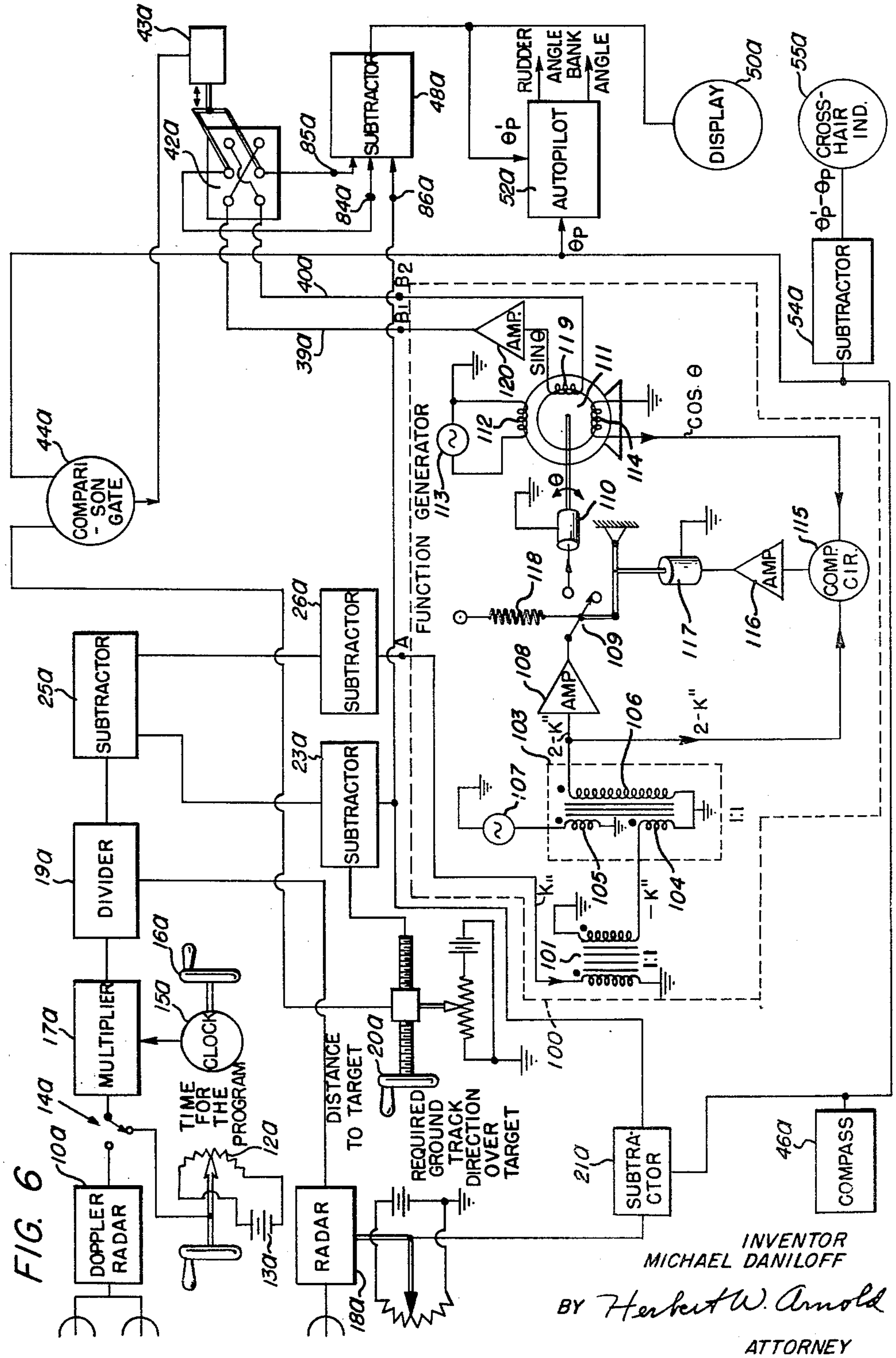
FIG. 6 is a block diagram of a navigation system for the projection of the path of motion on a horizontal plane using alternating current and employing a harmonic analyzer as a function generator.

Referring now to FIG. 6, there is shown a block diagram of a guidance system for the projection of the motion on the horizontal plane employing a harmonic analyzer 100 as the function generator. Similar elements of this A.C. system are indicated with the corresponding numbers of the direct-current system described in FIG. 1, with additions of the subscript "*a*." The purpose of the function generator 100 is to provide a voltage proportional to the required angle of flight $\zeta$, by means of a servo motor 110 and amplifier, not shown, rotating the armature of a harmonic analyzer through an angle such that its cosine equals the input voltage $$2-\frac{vt}{r}+\theta_{R/360}$$

This rotation is achieved by means of a well-known feed back loop. Referring in particular to the function generator 100, an input signal proportional to $$\frac{vt}{r}-\frac{\theta_R}{360°}$$

in which $\theta_R$ is measured in degrees, is applied to a terminal A of a polarity inverting transformer 101 having a 1:1 turn ratio. The inverted signal from the inverter transformer is applied to an adder 103 which, as shown herein, consists of a pair of input coils 104 and 105 and an output coil 106. Coil 105 is connected to a source of alternating current 107 supplying an A.C. voltage proportional to $\zeta$ on the scales of voltages used in the system. It should be understood that the adder 103 can be of the same construction as subtractors **23*a* and 48*a*. Subtractors 25*a* and 26*a*** are also constructed similarly to the latter subtractors except that the input coil is adapted to receive the subtrahend value, the polarity of which is reversed by winding the coil in the opposite direction from that of the other two coils of the subtractor.

Defining K″ as $$\frac{vt}{r}-\frac{\theta_R°}{360°}$$

the output of the adder coil 106 is seen to be proportional to $2-K''$. This quantity is fed to an A.C. amplifier 108. A position servo 110 is connected to the output of the amplifier 108 by way of a selector switch 109, the operation of which will be described below. A well-known A.C. position servo 110 rotates the armature of a well-known harmonic analyzer 111. The stationary field coil 112 is energized by a source of alternating current 113. A source identical with source 107 of 10 volts at 400 cycles can, for example, be used. Even though the A.-C. sources 107 and 113 are shown separately for the sake of clarity, they are preferably constituted as the single power supply for the craft carrying the system. Consequently, the sources 107 and 113 are in phase.

Referring again to harmonic analyzer 111, one of the coils of the armature 114 represents the quantity cosine $\theta$, where $\theta$ is the angle of rotation of the armature of the harmonic analyzer. The quantity cosine $\theta$ is fed to a standard comparison circuit 115 in which cosine $\theta$ is compared in value with the quantity $2-K''$ supplied by the coil 106. The output of the comparison circuit 115 is zero when cosine $\theta$ is not equal to $2-K''$, and differs from zero when these values are equal. When these two quantities are equal, the output of the comparison circuit 115 is applied to the amplifier 116. The output of this amplifier energises the solenoid 117 of the switch 109 to open the switch so that the rotation of the armature of the harmonic analyzer 111 is stopped. Normally, the switch 109 is held closed by a spring 118. In this manner, the angle of rotation of the armature 111 of the harmonic analyzer is such that cosine $\theta$ is maintained equal to $2-K''$.

When this condition is achieved, the desired angle of flight $\xi$ will be proportional to sine $\theta$ which value is extracted from the second coil 119 of the armature 111 in electrical quadrature with coil 114. The output of coil 119 is applied to an amplifier 120 having a gain of approximately 90, so that its output at terminals $B_1$ and $B_2$ represents the required angle of flight $\xi$ expressed in degrees.

Figure 7:
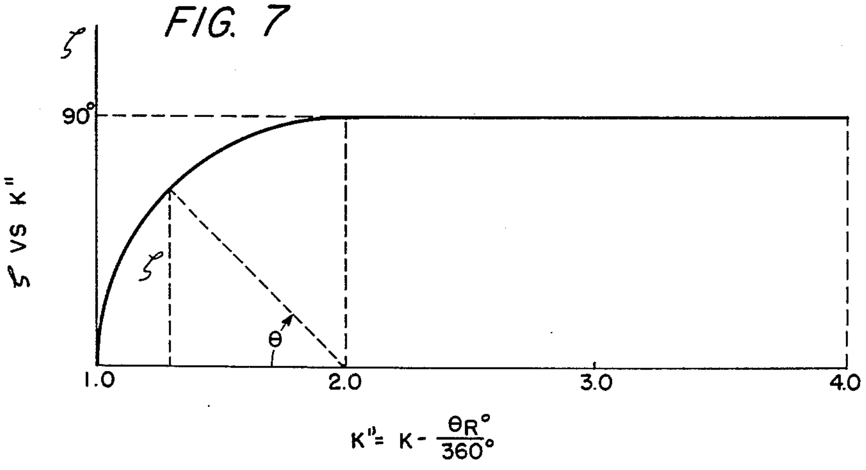
FIG. 7 is a graph of the function of the angle of flight plotted against the variable $K^1$ used in the function generator portion of the system shown in FIG. 6.

The following is an explanation of the theory of operation of the function generator 100 employing the harmonic analyzer 111. The required relation of the angle of flight, $\xi$, as a function of $$K''=\frac{vt}{r_1}-\frac{\theta_R}{360}$$

can be obtained if the graph of the function $\xi$ or $K^1$ is taken as a quarter of a circle tangent to the $\xi$-axis and having a radius of unity with the center of the circle is located on the $K''$ axis at the point 2.0. This relationship is shown in FIG. 7 where the maximum value of $\xi$ is 90° for values of $K''$ equal to 2.0 or greater. This procedure can be followed because, as shown by practical experience, an optimum flight path is obtained when the maximum value of $\xi$ lies between 80° and 170°.

It can be seen from FIG. 7 that:

$\xi=90°$ sine $\theta$, for values of $K''$ less than 2.0, where $\theta=\cos-1\ (2-K'')$.

Therefore, $$\xi=90°\sqrt{1-(2-K'')^2}$$

Thus, as seen from the latter equation, the harmonic analyzer, when employed in the above-described manner, provides an output voltage proportional to the required angle of flight.

It should be understood that each function generator provides a flight angle which, when fed to an auto-pilot or displayed for guidance purposes, results in a differently shaped projection of the flight path on a horizontal plane. For example, the above-described function generator utilizing the harmonic analyzer of FIG. 6 generates a flight angle which produces the flight paths shown in FIG. 8 in response to preset or selected values of $\theta_R$, that is the angle between the line of sight and the required direction of the vehicle at the point of destination. For example, when $\theta_R$ is preset to zero degrees and the ratio of $$\frac{vt}{r}=3$$

an actual calculated horizontal flight path represented by curve 120 is achieved. In like manner, curve 121 represents the flight path where $\theta_R$ is equal to 180° and the value $$\frac{vt}{r}=1.5$$

As noted, the value $$\frac{vt}{r}=K$$

which is the output of divider 19 in FIG. 1 or 19a in FIG. 6. Also, when $\theta_R=180°$ and $Vt/r$ is equal to 1.8, the resultant flight curve 121 is obtained. Flight curve 123 is produced when $\theta_R=90°$ and $vt/r$ is equal to 2.5, so that the length of flight path in the latter case is 2.5 times the initial horizontal range from the starting point of the program to the point of destination.

Figures 8, 9:
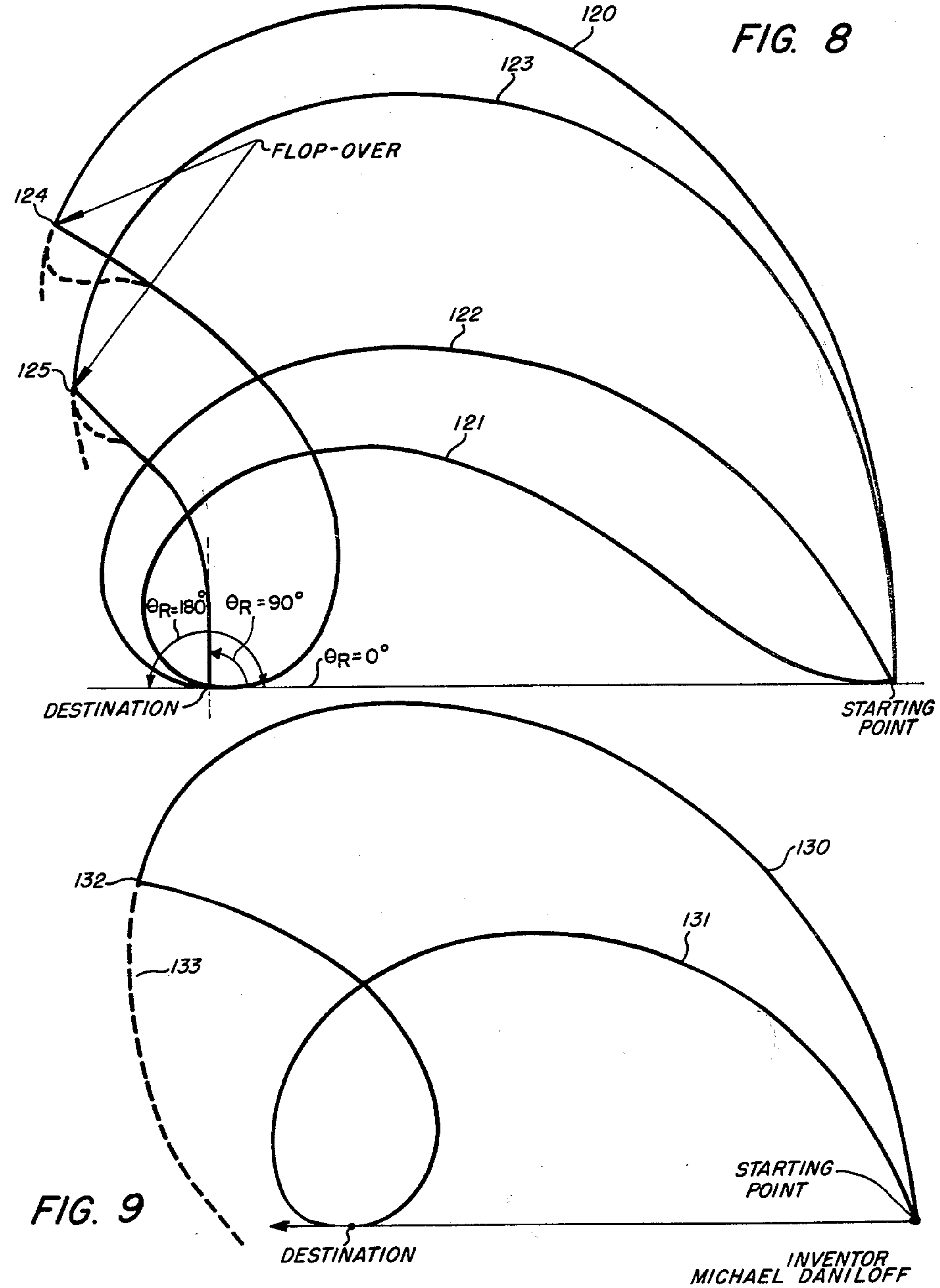
FIG. 8 is a graph representing the flight paths obtained from the system using the harmonic analyzer shown in FIG. 6.
FIG. 9 is a graph representing two flight paths obtainable from the function generator of FIG. 1.

Referring again to flight curves 120 and 123, the programmed computer orders a "flop-over" in the flight paths, that is, an instantaneous reversal of the sign of the angle of flight $\xi$. The flop-over in the flight paths occurs at the points 124 and 125, respectively. These flop-over points, or reversal of the sign of $\xi$, are necessary to prevent spiralling of the craft around the point of destination which would otherwise occur under the programmed conditions specified for curves 120 and 123. While such a flop-over results in an abrupt change of direction in the calculated path, under actual conditions of flight, a craft will adjust itself to the new heading as rapidly as it is capable and generate a path approximating the dotted curves shown at each flop-over point. There will be described, later, particular embodiments of this guidance system which avoid flop-over points in the flight path. As noted, when a flop-over is ordered, the reversal of $\xi$ is achieved by the reversing switches, 42 and 42a for the angle $\xi$, shown respectively in FIG. 1 and FIG. 6. In like manner, it is sometimes advantageous to employ a function generator of the other type to be later described, for the purpose of obtaining differently shaped flight curves which are desirable under particular operating conditions or where a simpler or lighter function generator is required. The actual flight paths shown in FIG. 8 are of illustration purposes and do not necessarily represent the optimum or preferred flight paths. For example, referring to FIG. 9, curve 130 is obtained when the pentode function generator described in FIG. 1 is used. This curve is obtained for a program set for $\theta_R=0$ degrees and K equal to 3. Curve 131 is obtained when $\theta_R=180°$ and $K=1.8$. While a flop-over occurs at point 132 on curve 130, no flop-over occurs on curve 131. This is because the angle $\theta_R$ is relatively large, in order to approach the target or point of destination from a direction opposite to that of the initial line of sight, and the value of K, as given, is relatively small. The dotted line portion of the curve 133 shows the initial portion of an undersized spiral around the point of destination which would be followed by the craft in the absence of flop-over.

Figure 13:
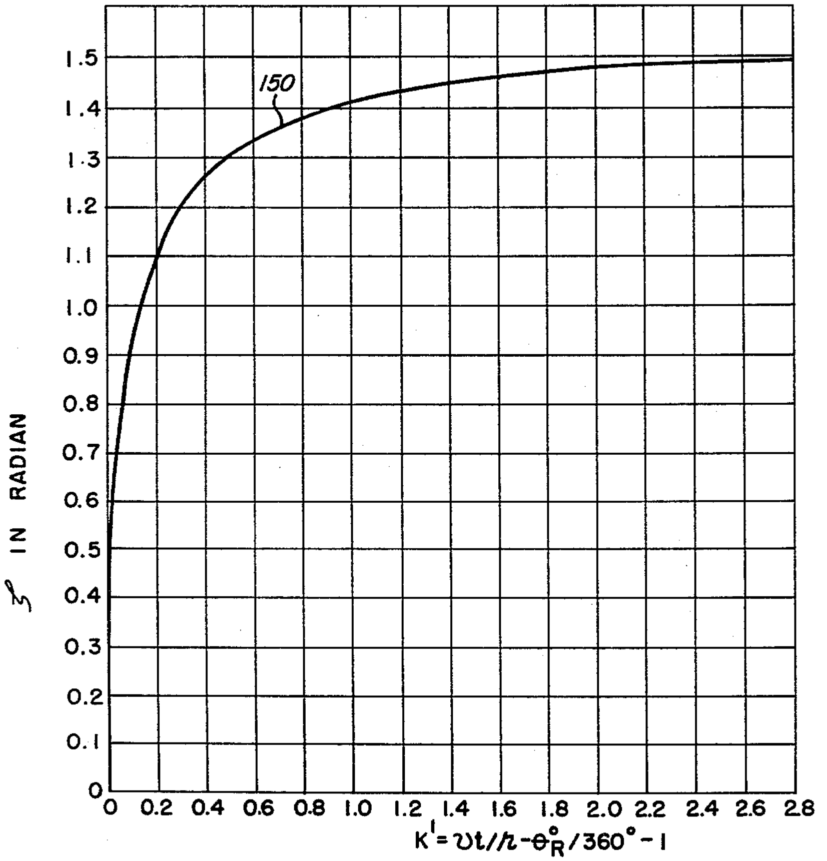
FIG. 13 is a graph of the inversion of the elliptical integral which serves as the basis of operation of the horizontal path program computer which provides flight angle.

Referring to FIG. 10, there is now shown a typical alternating current multiplier, which can be used as the multiplier 17a in FIG. 6. The input $v$, from the Doppler radar 10a or the hand driven potentiometer 12a in FIG. 6, is applied to a linear potentiometer 135. An input voltage from the clock 15a proportional to $t$ energizes the position servo 136. The well known feed back loop of the servo on amplifier is omitted for the sake of simplicity. The servo 136 positions the arm 137 to extract a voltage proportional to the product $vt$ in response to the inputs $v$ and $t$. In like manner, FIG. 11 shows the alternating current divider 19a of FIG. 6. The input $vt$ from multiplier 17a of FIG. 6 is applied to the high voltage end of a non-linear potentiometer 140. The divisor $r$ from the radar 18a is applied to an alternating current position servo 141 having a well known feedback loop and amplifier not shown. The servo 141 rotates the arm 142 through an angle proportional to $r$. The non-linear potentiometer 140 is wound so that the resistance between the point 143 and any other point along the circumference of the potentiometer is inversely proportional to the angle between those two points. In this manner, arm 142 extracts a voltage proportional to the quotient $vt/r$. It should be understood that the aforementioned devices, such as adders, subtractors, multipliers and dividers are for illustration purposes and other well known devices performing these functions can be substituted therefore. Referring now to FIG. 12, there is shown another embodiment of a function generator which can be substituted for the function generator 31 of FIG. 1 or function generator 100 of FIG. 6. In particular, an input voltage at terminal A, $$K-\frac{\theta_R}{360}-1$$

is applied to the position servo 145. The appropriate well known feedback loop, and the usual servo driving amplifiers have, for simplicity, been omitted from this servo as well as from other well known servo circuits of the system. Position servo 145 positions cam 146 having a specifically shaped outline curve representing the function obtained by inverting with respect to $\xi$ a particular elliptic integral. This elliptic integral relates the required angle of flight $\xi$ to the input variables K and $\theta_R$, the theory of which will be discussed in detail. The shape of this function when plotted against K' is shown in FIG. 13 in which a curve 150 represents the relationship between the required angle of flight $\xi$ in radions and the input voltage at the terminal A of the function generator. The shape of cam 146 corresponds to that of curve 150 of FIG. 13, where the radius, R, of cam 146, as shown in FIG. 12, is proportional to $\xi$ in FIG. 13, while the angle through which the cam is rotated by servo 145 is proportional to the input variable K' of the same figure. FIG. 12 shows an output cam and follower 151 which positions the arm 152 of a linear potentiometer 153 to extract an output voltage at terminal B2. A voltage source 154 is used to energize the potentiometer 153 by applying a positive voltage to one terminal of the potentiometer while the negative terminal of the voltage source is connected to output terminal B1 of the function generator. The voltage, therefore, between the terminals B1 and B2 is proportional to the required flight angle $\xi$.

Referring to FIG. 14, there is shown another embodiment of a function generator in which an input signal $$K-\frac{\theta_R{}^\circ}{360^\circ}-1$$

which is the same signal as applied to servo 145 in FIG. 12, is applied to position servo 160 which drives an arm 161 of a non-linear potentiometer 162. The servo is provided with an amplifier 147 feed back loop, not shown. A source of potential 163 is connected in series with the potentiometer 162 which is wound in such a manner that the resistance between the negatively connected end of the potentiometer and the pick-up arm 161 is proportional to the required angle of flight $\xi$, as shown in FIG. 13, while the angle through which the servo turns the arm from the negative end of the potentiometer is proportional to the input signal. The functional relationship between the angle of flight $\xi$ and the angle of rotation of arm 161 with reference to the negative end of the potentiometer is the inversion of the elliptic integral referred to in the description of the embodiment of FIG. 12, the curve representing said relationship being shown in FIG. 13.

Figure 15:
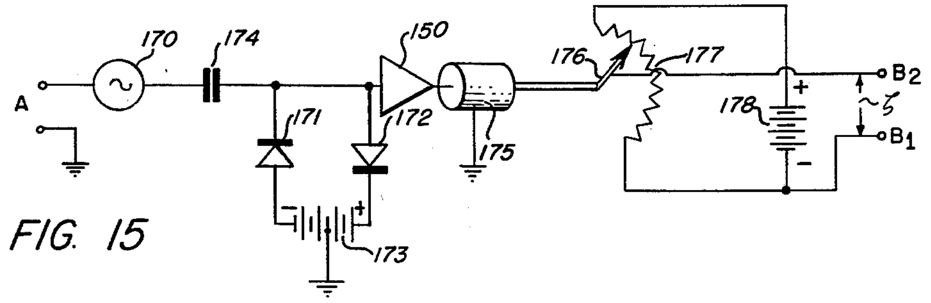
FIG. 15 is a schematic diagram of an alternating current function generator using clamped diodes to generate a function approximating the function shown in FIG. 13.

Referring to FIG. 15, the input signal, $$K-\frac{\theta_R{}^\circ}{360^\circ}-1$$

is applied at terminal A of the function generator 31 for the horizontal program computer shown in FIG. 1. This embodiment of the function generator shown in FIG. 15 includes an alternating current source 170 connected in series with the input signal to increase the input signal by a voltage $e$ in order to compensate for the bias voltage applied to a pair of diodes 171 and 172 used to clamp the input signal to three volts. The clamping diodes 171 and 172 are connected in parallel opposition with the input signal. These diodes are biased by a separate bias source 173 of approximately 3.0 volts which clamps the carrier to all values of input signal in excess of the three volt bias source. The alternating current source 170 is provided with an isolating capacitor 174. A clamped alternating current is applied to a position servo 175 in series with an amplifier 150 and having the well known feedback loop, not shown. The position servo drives the arm 176 of a linear potentiometer 177 which is connected in series with a D.C. source of potential 178. The arm 176 is connected to terminal B2 of the function generator of FIG. 1 while the negative side of the potentiometer is connected to terminal B1 of the function generator of FIG. 1. In operation, the amplitude of the envelope of the clamped alternating current input signal due to the conduction and saturation properties of the diodes is of the shape required to provide the angle of flight $\xi$ as a function of the aforementioned input signal at terminal A. This shape is again approximately that shown by the curve of FIG. 13.

Referring to FIG. 16, there is shown a function generator 180 which can be substituted for the alternating-current function generator 100 of FIG. 6. This generator utilizes the magnetization and saturation properties of a magnetic core having a low hysteresis loss. FIG. 16*a* shows a magnetization curve for such material in which is plotted flux density B against magnetomotive force H. Referring again to FIG. 16, a saturable reactor 181 is provided with an input winding 182 to which is fed a signal having a root mean square value proportional to $$K-\frac{\theta_R{}^\circ}{360^\circ}-1$$

at terminal A of FIG. 6. This value of the R.M.S. signal is obtained from the computing elements preceding the function generator in FIG. 6, and, in particular, the output of subtractor 26*a*. The input signal at terminal A magnetizes the core 181 and provides an output signal induced in output winding 183. The voltage $e_s$ induced in secondary winding 183 and amplified by the amplifier 149 is proportional to the time derivative of the flux density B. Rate servo 184 acts as a time integrator. To start the function generator 180, a starting switch 217 is depressed for a time long enough for the starting position servo 218, which is geared to rate servo 184, to position arm 185 at a point corresponding to starting point 188 of FIG. 16*a*. Position servo 218 is driven by a signal from secondary winding 183 fed through a well known low pass filter and amplifier circuit 219. The low pass filter acts as a real time integrator for the signal. The position of arm 185 is proportional to the required angle of flight $\xi$. This signal approximates the function $\xi$ of $$K-\frac{\theta_R{}^\circ}{360^\circ}-1$$

of FIG. 13 and drives a well known position servo 184 having an amplifier 149 and the usual sensing, comparison and feed-back elements, not shown. The position servo drives arm 185 of a linear potentiometer 186 energized by a source of electromotive force 187 which, for convenience, may be either alternating current or direct current. This potentiometer 186 is used to extract the output signal with great accuracy because the cycle of operation from the initial point 188 to the final value, which is zero and which corresponds to the origin of coordinates of FIG. 16*a*, and may occupy the entire length of the travel program which may be several hours in duration. That is to say, it may require several hours for the amplitude of the flux density curve to decrease from the initial value 188 to final value at the origin of coordinates. The reason for this is that at the beginning of a program the input signal at the terminal A is relatively high and decreases to zero as the craft approaches the point of destination. The inertia of the servo motor and of its arm 185 provides a smoothing action such that the position of the arm 185 corresponds to the mean value between the rising and descending branches of the magnetization curve of FIG. 16*a*.

Referring to FIG. 17 there is shown a block diagram of a guidance system for the projection of motion of a vehicle on a horizontal plane employing a function generator 190 which can be manually adjusted by means of handcrank 200 or by other means to drive said crank to provide a plurality of flight paths, all of which result in paths which satisfy the program of travel previously described. Elements of FIG. 17 perform the same function as corresponding elements of FIG. 1 and are for the sake of clarity provided with the addition of the subscript "*b*." Consequently, the output of divider 19*b* of FIG. 17 is the value of the variable K defined previously and the output of subtractor 23*b* is the angle $\theta_R$. The purpose of function generator 190 is to provide a voltage proportional to the required angle of flight $\zeta$ by means of position servo motor 191 and amplifier 217 rotating an arm 192 of a non-linear potentiometer 193 energized by a source of direct current 194. The feedback loop for the servo motor is not shown. The non-linear potentiometer 193 is wound so that its output is proportional to $n_0\sqrt{K^2-1}$ in which K is the input from the divider 19*b*, and $n_0$ is any suitable number, integer or non-integer, between 1 and 10 approximately. The output of the potentiometer, as extracted by arm 192, is connected to a well known D.C. subtractor 195 as the diminuend, the subtrahend of which is the angle $\theta_R$, which is the output of subtractor 23*b* of FIG. 16.

The output of the subtractor 195 is thus the value $n_0\sqrt{K^2-1}-\theta_R$. This output is fed to a multiplier 196 where it is multiplied by an adjustable factor *m*. The value of the factor *m* is introduced by the crank 200 which is actuated manually or by a servo, not shown. The multiplier 196 comprises a position servo 221, linear potentiometer 220 and 224 and an amplifier 222 in a servo circuit which will be described in connection with FIG. 17*a*. The output of the multiplier 196 is the tangent of the angle of flight $\zeta$, which is given by the expression $$\tan z = \pm m(n_0\sqrt{K^2 1} - 1\theta_R)$$

Since *m* can be either positive or negative, depending upon the direction of rotation of the crank 200, the sign of the tangent of $\zeta$ at the start of the program can be made either positive or negative and the resulting motion of the craft can start either to the right or the left of the line of sight from the craft to the point of destination. This flexibility permits desirable flight patterns to be selected for the control of air traffic or other control applications.

During the progress of the motion the value of K approaches 1 near point of destination and becomes equal to 1 at the point of destination. This is evident from the geometrical relationship of the horizontal projection of the flight path as shown by FIG. 2 and FIG. 17*b*. At the same time, the angle $\theta_R$ as seen in FIG. 2 and FIG. 17*b*, approaches zero and becomes zero at the point of destination, T, of the craft. From the above equation, therefore, the angle of flight $\zeta$ becomes zero and the craft, as noted, follows the direction preset into the computer by crank 20*b* of FIG. 17. Furthermore, as may be necessary under certain tactical conditions, increasing the value of the factor *m* increases the absolute value of the angle $\zeta$ and thus tends to keep the general configuration of the flight path away from the target area, the length of the flight path remaining constant in both instances. For example, FIG. 18 shows four calculated flight curves 202, 203, and 204, having a common branch 205, and curves 206 and 207. Each curve originates at the starting point 208 and terminates at the point of destination 209. All the curves are of the same length and each curve approaches the point of destination under an angle $\theta_R$ which is zero, this value as noted, being preset into the computer. All curves are drawn to scale and the value of K is 6.25. Thus, the length of each flight path is 6.25 times as long as the length of the straight line flight from starting point 208 to destination point 209. These curves may represent typical flights in cases in which there would be a long waiting period in the air before landing, say 30 minutes instead of, for example, 5 minutes. Again, curve 202 corresponds to a relatively small value of the factor *m* while curve 207 corresponds to a large value of the same factor, while curves 203 and 204 correspond to intermediate values of *m*.

Referring again to FIG. 17, the output of multiplier 196 is a voltage which varies proportionally to the tangent of the angle of flight and is fed to a well known commercially available amplifier 214 which drives position servo 215 having a feedback loop, not shown, and which in turn drives a non-linear potentiometer 216. This potentiometer is commercially available and wound in a well known manner, according to the inverse tangent law and is energized by a source of direct current 226. Consequently, the output at terminal $B_1$ and $B_2$ is the required angle of flight $\zeta$. FIG. 17*a* is a detailed schematic diagram of multiplier 196. It should be understood that the schematic of FIG. 17*a* is for illustration purposes and other multipliers capable of multiplying a voltage by an adjustable constant can be used.

Referring in particular to FIG. 17*a*, there is shown an embodiment of multiplier 196 of FIG. 17 which, as noted, includes linear potentiometer 220, the arm of which is positioned by the conventional position servo 221 having a conventional feedback loop, not shown. The output of subtractor 195 of FIG. 17 is applied to the amplifier 222 to drive the servo 221. Potentiometer 220 is energized by a voltage extracted by arm 223 of a second linear potentiometer 224 which is energized by a source of direct current 225. In order to obtain positive and negative values of the factor *m* the center point of the direct current source 225 is grounded and the center point of potentiometer 224 is also grounded. The position of the arm 223 is manually or by other means set by the crank 200 in accordance with whether the major portion of the desired flight path is to lie relatively near the starting point, that is remote from the target, or vice versa. Whether the flight path is remote or near to the target is determined by the numerical value of the factor *m* as set by the arm 223 and not by the sign of the factor *m* which is determined by the position of the arm 223 to the right or left of the grounded center point of potentiometer 224. The selected numerical values of *m* are displayed on linear scale 227 by pointer 228 mounted on the same shaft as the crank 200. In this manner, the shape of the flight path can be adjusted and at the same time, as noted, the length of the flight path to the target remains unchanged. However, in order to generate a flight path to the right or to the left of the line of sight from the craft to the target, either positive or negative values of *m*, respectively, are selected by the crank 200. This is because in the navigation system thus described, positive angles of flight are defined as corresponding to paths lying to the right of the line of sight in the direction of the target. FIG. 17*b* shows in detail the right path 229 and the left path 230, each starting from the same point 231 at which the program for the horizontal projection of the flight path was started. Both paths approach and reach the target point T at the same angle 232. Path 229 and 230 are equal in length and correspond to positive and negative values of $\zeta$, respectively, at the starting point 231. Since FIG. 17*b* is a schematic drawing for explanation purposes and not drawn to scale, the paths 229 and 230 do not appear equal in length. It should be noted that when the sign of *m* is reversed, it is not necessary to reverse the sign of the angle $\theta_R$, because as seen from FIG. 17*b*, regardless of whether the approach to the target is made to the right or left from the initial line of sight of the craft to the target, the signs of the angles $\theta_R$ and $\theta_R'$ remain unchanged. In this manner, hand-controlled flexibility of the flight path is achieved without violating the conditions of the flight program, that is the time to reach the target and the direction of motion at the target. This change of flight path, which can be made during travel, permits the avoidance of obstancles or obstructions encountered during travel, or the adjustment can be preset for planned flight paths.

Referring now to FIG. 19, there is shown a further embodiment of a navigation system for the horizontal projection of the flight path which avoids "flopover," that is excessive change in the direction of the generated flight path, such as may occur at points 124 and 125 of FIG. 8, or 132 of FIG. 9. As noted, rapid changes in the direction of the craft are undesirable because of stress placed upon the equipment and the discomfort of passengers, if aboard the craft. In particular the embodiment of FIG. 19 is described generally in FIG. 1 and where the elements are shown in FIG. 1, the same reference number with the addition of the subscript *c* are used.

In order to describe the problem relating to "flopover," FIG. 20 shows a flight path 233. The required direction over the target T is shown by line 234 which makes an angle $\theta_T$ with the North direction. With the embodiment shown in FIG. 1, flopover would normally occur at point 235, at which point the direction of motion is parallel to the required direction 234 over the target. When this condition obtains in FIG. 1, the craft follows a path such as 236. In the embodiment shown in FIG. 19, the sign of the angle of flight $\zeta$ is automatically reversed at the point 237. At this point the angle $\zeta$ becomes zero because the craft is moving directly toward the target. By reversing the sign of $\zeta$ at the point of tangency 237 to the line of sight 238, the craft will follow a path such as shown by curve 239 to the left rather than to the right of the line of sight. It should be noted that if the angle of $\zeta$ is reversed at a point such as 235 of FIG. 20, at which the angle $\zeta$ is not zero, a sharp change in the direction of motion of the craft will, of necessity, occur. However, if the angle of flight $\zeta$ is reversed at a point such as 237, at which $\zeta$ is equal to zero, the path of motion of the craft will remain smooth.

Referring again to FIG. 19, the output of the function generator 31*c* appears across terminal $B_1$ and $B_2$ in the usual manner. It should be understood that while the function generator 31*c* employs a pentode type tube, any of the function generators previously described in connection with FIG. 1 can be used. The outputs of terminals $B_1$ and $B_2$ are fed to a conventional relay 240. This relay is adapted to remain open as long as there is a voltage across the terminals $B_2$ and $B_1$ that is to say, as long as the angle of flight $\zeta$ is not equal to zero. However, whenever the angle of flight $\zeta$ becomes zero, relay spring 241 closes relay 240 and energizes a solenoid relay 242 by means of a source of direct current 243. This solenoid relay, when energized, actuates a conventional reversing switch 244 which reverses the polarity of the signal representing the angle of flight $\zeta$, and causes the flight path of the craft to change its course from the right side to the left side of the line of sight. This is shown in FIG. 20 by the portion of the curve 239 which is seen extending to the left of the line of sight 238.

Normally, the invention provides the angle of flight $\zeta$ as positive before the flopover point is reached and before the relay 240 is closed. Since a positive angle of flight is selected to correspond to a path lying to the right of the line of sight, the flight path will normally lie to the right of the line of sight. However, if, for any reason, it is desired to initiate the flight path to the left of the initial line of sight, a conventional switch 245 is provided to reverse the sign of the angle $\zeta$ from positive to negative and consequently, the flight will start initially to the left of the line of sight. Then when the relay 240 is closed, the angle of flight will again become positive and the path of flight will lie to the right of the line of sight. Thus, when the hand switch 245 is reversed to obtain a program commencing from the left of the line of sight, it is not necessary to reverse the sign of the angle $\theta_R$, as discussed in connection with FIG. 17*b*. Thus referring to FIG. 17*b*, it can be seen that a reversal of the angle of flight $\zeta$ does not reverse the sign of the angle $\theta_R$.

Referring now to FIG. 21, there is shown a schematic diagram of a computer for the curvature of the horizontal projection of the path of motion which generates a programmed path which avoids a general initial break in direction of motion of the craft at the moment when the program is initiated. In particular, the initial direction ordered by the program computer at the beginning of a program usually does not coincide with the direction of the craft at that particular moment, so that there will ensure an initial transition period in which the craft rapidly re-orients its direction of motion to correspond to the required direction.

It is, therefore, an object of the present embodiment of the invention to provide a navigation computer in which this transition period is eliminated. This is achieved by providing a program computer which generates a path of flight which is tangent to the direction in which the craft vehicle is travelling at the instant at which the program is initiated. In recomputing procedures this condition must prevail at every point along the path of travel, otherwise a break in direction would occur if an initial angle command were given at another point along the path of travel. This requirement of tangency of the direction of motion of the craft to its previous motion is achieved by generating a command which is in the form of the required curvature of the flight path rather than a direction of flight such as provided by the angle $\zeta$ of previous embodiments. In other words, the craft is directed along the initial path at an ordered bank angle, which corresponds to an ordered curvature of path rather than an ordered direction of motion. Consequently, the craft leaves its initial path along the tangent of that path and, thus, there is no break in direction at any point along the programmed flight. The required bank angle $\phi_b$ instead of the required direction of motion is fed to the auto-pilot. Since the bank angle $\phi_b$ depends upon the first derivative of the direction of flight of a craft with respect to a fixed direction of flight, the commands are thus based upon the first derivative of the angle of direction of flight $\theta_p$ rather than the angle $\theta_p$ itself. It should be remembered that $\theta_p$ is the angle between the direction of motion and the direction North, while the angle $\zeta$ is the angle between the required direction of motion and the line of sight from the craft toward the target, and $\theta_R$ is the angle between the previously defined line of sight and the required direction of flight over the target; while $\theta_T$ is the angle between the required direction of the craft at the target and the direction towards North, that is, an arbitrary fixed direction. From these definitions, it becomes clear that $$\zeta=\theta_P-\theta_R+\theta_T$$

and that $\zeta$ necessarily depends upon the angle $\theta_P$ and not upon its first time derivative. Therefore, the first derivative $\theta_P$, being by its nature anticipatory, provides a more sensitive and accurate guidance than heretofore obtained.

The device for generating the required curvature is shown in FIG. 21. In this figure, where the elements are shown in FIG. 1, the same reference numbers are used with addition of the subscript *d*. The function generator portion of this embodiment which provides the required bank angle will be described in detail inasmuch as the input $\theta_P$, $\theta_T$, K, *r* and *t* are obtained in the same manner as in FIG. 1. In particular, the input $\theta_P$ is provided by the compass 46*d*. The angle $\theta_T$ is provided by a manually operated potentiometer 22*d* which is set to the desired $\theta_T$ at the beginning of the program by means of a hand crank 20*d*. The output of divider 19*d* provides the value K, that is *vt*/*r*. The input *v* is provided by the Doppler radar 10*d* as selected by switch 14*d*. The distance to the target *r* is obtained from the radar 18*d*. The required time of completion of the flight program $t$ is obtained from a clock **15*d* set by the hand crank 16*d***.

The function generator provides the required bank angle $\phi_b$ by generating the function $$\frac{v^2}{g}q$$

in which $g$ is the acceleration of gravity and $q$ is the required curvature path of motion. As will be shown in the theory for the curvature computer to be described, the value $q$, in turn, is given by the formula:

$$q=\frac{3(\theta_P-\theta_T)-N}{vt}$$

in which $N=2b+c$.

In this equation $b$ and $c$ are two coefficients which enter into the expression for the required direction of flight referred to, say North. These values are required for calculation of the curvature $q$ in the above equation. A description of the manner in which these values are to be calculated will be shown in the theory for this embodiment of the computer.

The input $\theta_P$ to the function generator is fed to a subtractor 250, as the diminuend, the subtrahend being the input $\theta_T$ from potentiometer **22*d*. The output of subtractor 250 is the difference $\theta_P-\theta_T$ which is one factor of the foregoing equation. This factor is fed to a function generator 251, the construction of which will be described presently. The function generator 251 forms part of the generator for the function, $q$, said latter generator being represented by the numeral 290. The second input to the function generator is the factor K. The variable $\theta_T$ is supplied to subtractor 252, as the subtrahend and $\theta_{AT}$, from the subtractor 21*d* shown in FIG. 21, is applied to subtractor 252 as the minuend. The difference $\theta_{AT}-\theta_T$ is applied to function generator 251**.

In order to calculate the required curvature $q$, by using the values in the above equation, it is necessary to obtain the value of N which is, as noted, equal to $2b+c$ where $b$ and $c$ are internal auxiliary quantities which do not appear either in the input or output of the horizontal computers.

These values $b$ and $c$ are functions of the three inputs, as noted, which are $\theta_{AT}-\theta_T$, K and $\theta_P-\theta_T$. Therefore, the quantity N is also a function of these three inputs.

In order to obtain the values of a function of three variables, it is convenient to follow the procedure given by the article: "The Design of Mechanical Computers," by E. Pike and T. Silverberg which appeared in "Machine Design," vol. 24–2 of July and August, 1952, pp. 131–137 and particularly pp. 159—165.

In the above procedure, a function F of the three variables is represented by the following sequence, $$F_1+F_2+F_3+F_1.F_2+F_2.F_3+F_3.F_1+F_1.F_2.F_3$$

in which the functions $F_1$, $F_2$, and $F_3$ are functions of only one variable. The function generator 251 calculates the above expression of the output N of the aforementioned equation. The auxiliary variables $b$ and $c$ are determined from the following expressions:

$$\int_0^1 \sin I du=\frac{1}{K}\sin(\theta_{AT}-\theta_T)$$

$$\int_0^1 \cos I du=\frac{1}{K}\cos(\theta_{AT}-\theta_T)$$

in which:

$$I=bu+cu^2+[(\theta_P-\theta_T)-(b+c)]u^3$$

and $u$ is an integration variable equal to $s/s_0$ where $s$ is the length of the curve of travel from any particular point of the path to the point of destination and $s_0$ is the total length of the path. This ratio $$\frac{s}{s_0}=u$$

is the integration variable which is not contained in the result due to integration between the limits of zero and one. The process of derivation of the above three equations will become apparent from the theoretical explanation which is given later.

Referring to FIG. 22, there is shown a circuit diagram of the function generator 251 of FIG. 21. In particular, the three input variables, $\theta_P-\theta_T$, $\theta_{AT}-\theta_T$ and K are applied to amplifiers 260, 261 and 262, respectively, the output of which drive position servo motors 263, 264 and 265. The well-known comparison and feedback circuits are omitted.

The above servo motors drive non-linear potentiometers, 266, 267, and 268 which are energized by a source of direct current 269. The potentiometer 266 generates the function $F_1$ by either being wound to the particular function with a well-known shunting strip in parallel with the linearly wound turns, or by winding a strip of variable width on the cylinder of the potentiometer. Such potentiometers are commercially available. Potentiometer 267 generates the function $F_2$ and potentiometer 268 generates the function $F_3$.

The outputs $F_1$ and $F_2$ are fed to the well-known direct current multiplier 270, the output of which is $F_1F_2$. It should be understood that if direct current source 269 is replaced by a source of alternating current of similar R.M.S. value, the function generator can operate with alternating current. The outputs $F_2$ and $F_3$ from potentiometers 267 and 268, respectively are fed to multiplier 271, the output of which is the product $F_2.F_3$. As noted, the output of potentiometer 266 is $F_1$ and the output of potentiometer 268 is $F_3$. These outputs are fed to the multiplier 272, the output of which is $F_1F_3$. The output of multiplier 270 and the output of potentiometer 268 are fed to the multiplier 273, the output of which is $F_1F_2F_3$.

The output of potentiometer 266 and the output of potentiometer 267 are fed to a well-known adder 274, the output of which is $F_1+F_2$. The output of adder 274 and the output of potentiometer 268 are fed to the adder 275, the output of which is $F_1+F_2+F_3$. The output of multipliers 271 and 273 are applied to an adder 276, the output of which is thus $F_2F_3+F_1F_2F_3$. The output of multiplier 270 and adder 276 is fed to an adder 277, the output of which is the expression, $$F_1F_2+F_2F_3+F_1F_2F_3.$$

The output of adder 277 and the output of multiplier 272 are fed to an adder 278, the output of which is thus $F_1F_2+F_2F_3+F_3F_1+F_1F_2F_3$. The outputs of the adder 278 and adder 275 are fed to an adder 279, the output of which is, thus, the desired quantity N. In this manner, the quantity N is composed of the three functions $F_1$, $F_2$ and $F_3$, according to the expression contained in the above reference. It should be understood that the adders and multipliers of FIG. 22 can be either alternating current or direct current depending upon the character of the source 269. The alternating current adders are well-known and have not been previously described. However, the multipliers, dividers and direct current adders and subtractors have been previously described herein.

Referring again to FIG. 21, the output $\theta_P-\theta_T$ is also fed to an alternating current or direct current multiplier 280 which multiplies the output, by a constant factor of three. The output of multiplier 280 is therefore $3(\theta_P-\theta_T)$, which is the first term of the formula $$q=\frac{3(\theta_P-\theta_T-M}{vt}$$

The output of function generator 251 and of a well-known multiplier 280 are fed to a subtractor 281, the first output being applied as the subtrahend and the second as the minuend. Consequently the output of the subtractor 281 is the expression $3(\theta_P-\theta_T)-N$. This value is applied to a divider 282 as the numerator, the denominator being the product $vt$ obtained from the multiplier **17*d*. The output of divider 282 is thus the required curvature of path $q$. For a space vehicle, such as for example a ballistic missile or satellite, the output value $q$ is fed directly to the mechanism controlling the burning rate of the propulsion and attitude nozzles. In the present case, the value $q$ is used to determine the required bank angle $\phi$ of the craft. At the same time, a voltage proportional to the velocity $v$ of the craft is obtained from either the Doppler radar 10***d* or hand driven input 11*d* by means of selector switch 14*d*. This value $v$ is fed to a squaring device 283 in an alarm control indicator 307. This squaring device is similar to the function generators 263 and 266 of FIG. 22, with the exception that it contains a single potentiometer 266 wound so as to provide the square of the input $v$. Such a potentiometer is commercially available. The output of the squaring device 283 is fed to a dividing element 284 in which the value $v^2$ is divided by the acceleration of gravity $g$. This division can be achieved merely as a new interpretation of scales or a change in the value of the scales of $v^2$. The output of the element 284 is fed to a multiplier 285 in which it is multiplied by the value of the curvature $q$ obtained from divider 282. The output of conventional multiplier 285 is the value of the tangent $$\frac{v^2}{g}\cdot q$$

of the required bank angle $\phi_b$.

The tangent of the bank angle is fed by way of amplifier 286 to a position servo 287, which drives the arm of a non-linear potentiometer 288 energized by a source of direct current 289. The potentiometer 288 is wound according to the inverse tangent law, consequently the required bank angle $\phi_b$ appears at the terminals 290 and can be fed to actuate an auto-pilot or the servo motor used to actuate the control surfaces of the craft.

If at any instant of time during the performance of the program by the program generator of FIG. 21, the execution of the program becomes impossible because the required curvature is beyond the capability of the aircraft, an alarm device 305 is provided for indicating this condition. This alarm device compares the curvature required, as obtained from divider 282, with the maximum allowable curvature, $q_m$, as obtained from the flight characteristics of the craft. The value of $q_m$ can be introduced into the computer by hand input 298 which positions arm 299 of a linear potentiometer 300 energized by a source of direct current 301. The maximum curvature of the aircraft is applied to a well-known subtractor 302 as the subtrahend, the minuend being the curvature $q$ as obtained from the divider 282. The difference $q-q_m$ is fed to a biasing battery 303 which provides the cut-off voltage for alarm relay tube 304. When the required curvature $q$ becomes equal to the maximum possible curvature $q_m$, the grid of tube 304 reaches the cut-off voltage. Any further increase in the value of $q$ will cause the tube 304 to conduct and the alarm 305 in the plate circuit of the tube 304 to become energized. The plate voltage of tube 304 is provided by the plate source of voltage 306. In this manner, alarm 305 in the alarm control 307 indicates when the required curvature exceeds the flight capabilities of the craft. This alarm system indicates impossibility of performance only during the travel itself and not before the travel program has been initiated.

Referring now to FIG. 23, there is shown a Taylor expansion function generator 310 which can replace the function generator 251 of FIG. 21. This function generator aids in the calculation of the curvature $q$ of the flight path by calculating the quantity N, which, as noted, equals $2b+c$ where $b$ and $c$ are solutions of the equations given in connection with the description of the function generator 251. When the quantity N, taken as the output of function generator 310, is approximately a parabolic function of three inputs to the function generator namely, $\theta_P-\theta_T$, $\theta_{AT}-\theta_T$ and K, the function generator 310 is more accurate than the function generator 251 which is not specifically adapted to the generation of parabolic functions.

Referring in particular to FIG. 23, three inputs to the function generator are termed $$X_1=\theta_{AT}-\theta_P,\ X_2=\theta_T,\ X_3=K.$$

Then the function which the generator 310 calculates is in the form of a parabolic function, which is:

$$N=A'X_1+B'X_2+CX_3+A''X_1^2+B''X_2^2+C''X_3^2 +A'''X_1X_2+B'''X_2X_3+C'''X_3X_1$$

where the constants A'B'C', A"B"C", A'''B'''C''' are determined by known methods from the aforementioned table which gives N as a function of $X_1$, $X_2$ and $X_3$. The three inputs $X_1$, $X_2$ and $X_3$ in FIG. 23 are fed by way of amplifiers 312, 313, and 314, respectively, to the position servos 315, 316, and 317 driving non-linear potentiometers 318, 319 and 320. These potentiometers are wound in a known manner so as to give the squares of their corresponding inputs. Such potentiometers are available commercially. The three potentiometers are energized by a source of electromotive force 321. The outputs of the potentiometers are fed to the multipliers 322, 323, and 324, in which they are multiplied by the values of the coefficients A", B", C", respectively. Since these values are constant, the multiplication can be performed by a mere change of scale. The outputs of the multipliers 322, 323, and 324 are the quantities $A''X_1^2$, $B''X_2^2$ and $C''X_3^2$. In like manner, the outputs of the multipliers 325, 326 and 327 are voltages proportional to $A'X_1$, $B'X_2$ and $C'X_3$. The output of the amplifiers 312 and 314 is fed to a multiplier 328, the output of which is thus $X_1X_3$ which is fed to a multiplier 329. The input $X_1X_3$ is multiplied by a constant C'''. The output of the multiplier 329 is thus the term $C'''X_1X_3$. At the same time, the output of amplifiers 312 and 313 is fed to a multiplier 330, the output of which is thus proportional to $X_1X_2$. This value is fed to a multiplier 331 in which said value is multiplied by the constant A''', the output of which is thus a voltage proportional to the value $A'''X_1X_2$, this being the seventh term of the expression for N. Finally, the output of the amplifiers 313 and 314 are supplied to a multiplier 332 the output of which is the quantity $X_2X_3$. This quantity is fed to a multiplier 333 in which is it multiplied by the constant B'''. The output of this multiplier is thus $B'''X_2X_3$ which is the eighth term for the expression of N. The above referred to terms are combined by addition in a conventional adder circuit connected to junction point 334. This adder circuit is adapted to add three separate voltages. Herein shown the nine voltages corresponding to the nine terms in the Taylor expansion are fed through nine 1-megohm input resistors 335–343. The output of these resistors are combined at the junction points 344, 345, 346 and 347, which are connected to ground through 1-megohm resistors 348, 355, 356 and 357, respectively. The voltages at junction points 344–347 are fed to the grids of adding triodes 349, 350, 351 and 352. The sum of the plate currents due to the individual grid voltages are added and the voltage drop across resistor 353 constitutes the sum of the voltages at the junction points 344–347. A source of plate voltage is supplied by battery 354. In this manner the individual terms comprising the quantity N, after being determined individually in the multipliers and function generators 315, 316, and 317 are added together to produce a voltage proportional to the quantity N at output terminal 358.

FIG. 24 shows the calculated flight paths obtained with the horizontal flight path computer shown in FIG. 21. All flight paths start at the initial direction of 135 degrees from East by North, that is, 315 degrees counterclockwise from North. In FIG. 24, the point of destination of all the flight paths is point 360. All craft traversing these paths are required to arive at destination point 360 in a due West direction. These flight paths are all of the same length and are composed of sections of cornu spirals set end to end and tangent to each other. In this manner the curves show the path traveled to reach destination point 360 from different directions of the initial line of sight from the craft or vehicle to the point of destination, as well as different initial distances from said craft to said point of destination. For example, curve 361 shows the flight path for a craft headed in the general direction of the point of destination while curve 362 shows the flight path for a craft initially headed generally away from the point of destination.

The flight paths 361 and 362 have the same values of K, equal to 1.7, which is the ratio of the length of path to the initial distance from the craft to the point of destination. For example, for path 361, the bearing of the initial line of sight to the point of destination 360 is 155 degrees from East by North and for curve 362 the bearing of the initial line of sight to the point of destination is 6.1 degrees South of East. The length of paths 361 and 362 are the same and, therefore, a craft traveling at the same speed on either flight path, will arrive at the point of destination at the same time. These curves, as seen, do not contain "flopovers" and are the actual curves plotted for values generated in the navigational system shown in FIG. 21. For example, flight curve 361 is plotted for values in which K is equal to 1.7, the initial distance to the point of destination, $r$, is equal to 117.5 miles and the length of flight path, $s$, is equal to 200 miles. For path 362, for example, $K=1.69$, $r=168.2$ miles and $s=200$ miles. In this manner, it can be appreciated that the computer guides the craft to the point of destination under widely varying conditions.

Referring now to FIG. 25 there is shown a schematic diagram of a function generator 365 used in connection with a computer for the horizontal path of flight using arcs of cornu spirals as arcs of the flight paths. In this figure where the elements are shown in FIG. 1, the same reference numerals are used with the addition of the subscript. The function generator portion of this embodiment provides the required curvature of the flight path at any single instant of time by the calculation of two Fresnel integrals which together define a curvature which is the same as that of arcs of cornu spirals. An input to the function generator 365 is $\theta_R$ which is obtained from the output of adder 23e into which is fed the bearing $\theta_T$ of the required direction of flight at the point of destination. This input is normally generated by hand crank 20e. A second input to the function generator 365 is K obtained from divider 19e. As noted, K is the ratio of $vt/r$ and is provided in the manner described in FIG. 1. The third input to the function generator is the length of the intended flight path, $s=vt$, which is obtained as the output of multiplier 17e in the manner described with reference to FIG. 1. Input $\theta_R$ is fed to an amplifier 366, and to a position servo 367 which positions the armature 368 of a magnetic core 369 of well-known harmonic analyzer 370. Field coil 371 is energized by a source of alternating current 372. Due to the position of the armature as set by servo 367, output coil 373 provides an alternating voltage whose root means square value is proportional to the sine of the angle $\theta_R$. In addition, output coil 374 is positioned in electrical quadrature with coil 373 and provides an alternating voltage whose root means square value is proportional to the cosine of the angle $\theta_R$. The sine and cosine voltage outputs are fed, respectively, to well-known dividers 375 and 376. These inputs are applied as numerators while the input K is applied as the denominator. As a result, the output of divider 375 is a voltage proportional to sine $\theta_R/K$ and the output of the divider 376 is the quantity cosine $\theta_R/K$. These two outputs are fed to a function generator 380 which calculates a quantity N' which, when divided by input $vt$ in divider 381 provides the required curvature $q$ of flight paths which resemble cornu spirals. The function generator 380 operates in the same manner as that shown in FIG. 22 and will be described in detail in FIG. 26. The voltage proportional to the curvature $q$ is converted to the required bank angle by applying it to a well-known multiplier 385 which multiplies the value $q$ by the quantity $v^2/q$. This latter quantity is obtained by applying the velocity of the craft $v$ obtained from doppler radar 10e or manual input 11e, to a well-known squaring device 382 in the manner described in connection with FIG. 21. The output of squaring device 382 is applied to divider 383 and the output $v^2/g$ is multiplied by the value $q$ in multiplier 385. The output of the multiplier 385 is the tangent of the required bank angle $\phi_b$ which is transformed into the required bank angle $\phi_b$ by means of amplifier 386, position servo 387, non-linear potentiometer 388 and voltage source 389 in the manner described with reference to similar output apparatus shown in FIG. 21.

Referring to FIG. 26, a schematic diagram of the function generator 380 of FIG. 25 is shown. This generator provides an output which is the aforementioned auxiliary quantity N'. The inputs sin $\theta_R/K$ and cos $\theta_R/K$ from dividers 375 and 376, respectively, of FIG. 25 are applied to well known alternating current amplifiers 390 and 391, which drive position servos 392 and 393. These servos operate non-linear potentiometers 394 and 395, which are energized by a source of direct current 396. As previously noted, according to the method explained in the publications by E. Pike and T. Silverberg, the following equations are solved to provide values of the parameters $b$ and $c$ used in obtaining the auxiliary quantity N'. These equations, involving Fresnel integrals, which describe the cornu spirals, are:

$$\frac{\cos\theta_R}{K}=\int_0^1 \cos\ (bu+cu^2)\,du$$

$$\frac{\sin\theta_R}{K}=\int_0^1 \sin\ (bu+cu^2)\,du$$

the meaning of the quantities $\theta_R$ and K having previously been defined. The values $b$ and $c$ are obtained by a solution of the latter two equations and are therefore functions of inputs cos $\theta_R/K$ and sin $\theta_R/K$, respectively. Since the auxiliary functions $N'=b+2c$, to be described in detail in an explanation of the theory of computer N' is also a function of the above two inputs. By the Pike and Silverberg method, a function of two variables can be expressed as a sequence $F_1'+F_2'+F_1'F_2'$, where $F_1'$ and $F_2'$ are functions of only one variable.

The two aforementioned equations, as noted, are solved numerically for the parameters $b$ and $c$, which are seen to be both functions of sin $\theta_R/K$ and of cos $\theta_R/K$. From these values of the parameters $b$ and $c$ there is calculated the auxiliary quantity $N'=b+2c$. The values of N' are listed in the form of a double-entry table, to which the method of Pike-Silverberg can be applied directly, or the coefficients of a Taylor expansion can be determined by well known computational procedures, such as, for example, the method of least squares or the method of moments.

As an alternative to the Pike-Silverberg calculation method it is possible to assume two functions $$F_1''=\sum_{i=0}^{n} c_i\phi_i\left(\frac{\sin\theta_R}{K}\right)$$

and $$F_2''=\sum_{i=0}^{m} d_i\psi_i\left(\frac{\cos\theta_R}{K}\right)$$

in which $\phi_i$ and $\psi_i$ are appropriate orthogonal functions and to determine the coefficients $c_i$ and $d_i$ so as to obtain the best fit, in the least square sense, for example, as in the Pike-Silverberg expansion. It is also possible to calculate the maximum error and to select the coefficients so as to minimize the latter error by any standard method, such as that of "quickest descent."

In particular; the approximation to a function of two variables is by the Pike-Silverberg method:

$$F\left(\frac{\sin\theta_R}{K}\,\frac{\cos\theta_R}{K}\right)=F_1''+F_2''+F_1''F_2''$$

Calling $$\frac{\sin\theta_R}{K}=x_4$$

and $$\frac{\cos\theta_R}{K}=x_5$$

take:

$$F_1''=\sum_0^m c_i\phi_i x_4$$

and $$F_2''\sum_0^n d_i\psi_i(x_5)$$

in which $x_4$ and $x_5$ are defined above, and $\phi_i$ and $\psi_i$ can be, for convenience of calculation, taken as a set of complete normalized orthogonal functions and $c_i$ and $d_i$ are indeterminate coefficients. Denoting the approximate expression $F_1''+F_2''+F_1''F_2''$ by $F_0'$, the error of approximation is: $\Delta=F-F_0'$.

From this expression the error $\Delta$ and the maximum error $\Delta$ max is found. The latter is clearly a function of the unknown coefficient $c_id_i$.

$$\Delta\ \text{max}=\Delta\ \text{max}\ c_id_i$$

The coefficients are now determined so as to minimize the maximum error, $\Delta$ max. This is done most conveniently by the use of the well known method of "quickest descent." Once the coefficients are found by the above method, the curves of the functions $F_1''$ and $F_2''$ can be constructed and the potentiometers wound to these curves in a well known manner. The coefficients can also be found by the well known "least squares method," that is to say, by minimizing the sum of the squares of $\Delta$.

Potentiometer 394 is wound in a known manner so as to provide an output voltage proportional to the function $F_2'$ and potentiometer 395 is wound to provide a corresponding voltage expressing the function $F_2'$ when energized by a source of voltage 396. The outputs of these potentiometers are fed to an adder 397, the output of which is $F_1'+F_2'$. At the same time, the outputs of these potentiometers are coupled to a well known multiplier 398, the output of which is $F_1'F_2'$. These combined quantities are fed to an adder 399, the output of which is the required quantity N'. As shown in FIG. 25, this quantity is applied to the divider 381. It should be understood that while the output of the above-described function generator is a direct current signal, although its inputs are alternating current, the output can be converted to alternating current by well known devices. Alternatively, the source of voltage 396 can be an alternating current generator.

To obviate the use of potentiometers wound to a particular function, as obtained in the aforementioned article by Pike and T. Silverberg, FIG. 27 shows a function generator 400, which can replace the function generator 380 in FIG. 25. This function generator 400 has the wound potentiometers to generate the quantity N'. This function generator is used to advantage when the inputs sin $\theta_R$/K and cos $\theta_R$/K are relatively small numerical values and N' is expressed accurately by a parabolic function. The auxiliary quantity N' is generated in the following manner: The inputs sin $\theta_R$/K and cos $\theta_R$/K from dividers 375 and 376, respectively, of FIG. 25 are coupled to the amplifiers 402 and 403 and to position servos 404 and 405. These servos drive squaring function potentiometers 406 and 407 energized by a source of voltage 414. For the sake of brevity, sin $\theta_R$/K will be termed $X_4'$ and cos $\theta_R$/K will be termed $X_5'$ in the following equations which are used to generate the function N'. The output of potentiometer 406 is the value $X_4'^2$ and the output of potentiometer 407 is the value $X_5'^2$. At the same time, these inputs are coupled to multiplier 408, the output of which is $X_4'X_5'$ and further multiplied by a constant $C_{11}'$ in a well known multiplier 409. The value of this constant and further constants are obtained as the coefficients of a well known Taylor expansion of the quantity N'. The output of constant multiplier 409 is the value $C_{11}'X_4'X_5'$. The output of the potentiometers 406 and 407 are applied to multipliers 410 and 411 where they are multiplied by the numbers $a_{11}'$ and $b_{11}'$. The inputs to the function generator are also applied to multipliers 412 and 413, where they are multiplied by the Taylor expansion coefficients $a_1'$ and $b_1'$. The outputs of multipliers 409–413 are combined in an adder circuit similar to that described in FIG. 22.

It is seen that the sum of the above multipliers 409–413 constitutes a Taylor expansion for the quantity N'. In short, N' equals $$a_1'x_4'+a_{11}'x_4'^2+c_{11}'x_4'x_5'+b_{11}'x_5'^2+b_1'x_5'$$

Referring to FIG. 28 there is shown a further embodiment of a function generator to be used in connection with the navigation system of FIG. 25 in which the three inputs K, $\theta_R$ and $vt$ are used to calculate the required curvature $q$ of the flight path, such that the curvature $q$, thus obtained, cannot exceed a preset maximum curvature introduced into the function generator or automatically introduced from a separate computer located on the craft As opposed to previous embodiments of the horizontal path computer, this present embodiment permits the maximum curvature of the flight path of the craft to be set in advance of the commencement of the program. As is known, a particular craft cannot exceed a definite curvature in flight depending upon its individual construction and air density. This embodiment, therefore, provides a means of adjusting the shape of the flight path to the maximum permissible curvature of flight permitted by the characteristics of a particular craft. In this embodiment, a warning signal is provided whenever the actual curvature of the path of flight of the craft approaches or reaches the limiting curvature of which the craft is capable of performing. In particular, the input $\theta_R$ obtained from the adder 23e of FIG. 25, is applied at terminal 415 of function generator 416 of FIG. 28. This function generator 416 can be substituted for function generator 365 in FIG. 25 whenever it is desirable to know in advance that the curvature of flight will not exceed a particular preset value. The value $\theta_R$ is amplified by an amplifier 417 which drives position servo 418. These components may be either direct or alternating current elements. Servo 418 positions the armature of a well known harmonic analyzer 419, the field coils of which are energized by a source of alternating current 420. The outputs of the harmonic analyzer are two alternating voltages, the root mean square values of which are proportional sine $\theta_R$ and cosine $\theta_R$, respectively. These voltages are fed to alternating current dividers 421 and 422. The former voltages are divided by the value of the input K which enters the function generator at terminal 423. This input is obtained from divider 19e in the navigating system of FIG. 25. The output of the dividers 421 and 422 are voltages proportional to cos $\theta_R$/K and sin $\theta_R$/K.

These quantities are used in an auxiliary variable N'' upon which depends the curvature of the flight path. At the same time, a voltage proportional to the maximum value of the allowable curvature of the path is generated by a manually driven linear potentiometer 426, as set by the hand crank 427 and energized by a source of voltage 428. Alternatively, this voltage can be introduced from a well known pressure gauge or barometer 430 which is adapted to drive a substantially linear potentiometer 431 through a well known linkage 432. This linkage amplifies mechanically the motion of the diaphragm of the aneroid barometer 430. The actual air density $\rho_a$ is read by a pointer 433. The potentiometer is energized by a source of voltage 434. The output of potentiometer 431 is applied to the first terminal of a selector switch 435 which selects either the actual air density $\rho_a$, provided by potentiometer 431, or a generated minimum expected density $\rho$ min. This density is provided by a non-linear potentiometer 436 which is set manually by hand crank 437 and is energized by a source of direct current 428. The hand crank 437 is manually set to the maximum expected altitude $h$ max and is converted to the corresponding minimum density, $\rho$ min, by potentiometer 436 which is wound in a well known manner according to the function $\rho_0$ exp. $(-h \text{ max})/RT$, in which T is the absolute temperature of the standard atmosphere in degrees Fahrenheit absolute, $h$ max is the maximum expected altitude of the craft, R is the gas constant and $\rho_0$ is the air density at sea level. The output of potentiometer 426 is a voltage proportional to the minimum expected air density $\rho$ min and is applied to the other terminal of selector switch 435. Thus, either the output voltage proportional to the actual air density, $\rho$, or the expected minimum air density, $\rho$ min from potentiometer 436, is applied to multiplier 438 by means of selector switch 435. The aneroid barometer 430 and its associated circuitry provides the acutal air density at any time and provides a voltage proportional to maximum curvature possible with the latter air density by means of multiplier 438. This latter voltage is compared with a voltage proportional to the curvature of flight ordered by the function generator 416 in a manner to be described. If the ordered curvature exceeds the curvature derived from barometer 430, a warning signal is given. On the other hand, the potentiometer 426 is manually set to provide the expected minimum air density which is converted to maximum curvature in multiplier 438. This curvature, that is, the voltage corresponding to said curvature, is compared to a voltage proportional to the maximum expected curvature as calculated by the function generator 460 before the actual flight of the craft has commenced. When the maximum expected curvature exceeds the curvature corresponding to the maximum expected altitude of the craft, a further warning signal is given which indicates, before the flight starts, that the flight cannot be completed under the preset values of $\theta_R$, $vt$ and K. This assumes that the craft is to fly in air sufficiently dense to register on the aneroid barometer 430. For space flight applications in which air density is zero, the maximum known permissible curvature for a given craft, as determined by its characteristics, is supplied to the computer by a potentiometer similar to the aforementioned potentiometer 426 and wound so as to provide the maximum curvature directly. Such curvature can be manually introduced by crank 427. In this instance selector switch 439 is set to select only the voltage output of potentiometer 426.

When selector switch 439 is set to select the output of multiplier 438, a voltage proportional to the maximum permissible curvature of flight corresponding to the actual air density, $\rho$, is applied to multiplier 440 of the function generator. In multiplier 438, the minimum air density $\rho$ min, or actual air density $\rho$, depending on the position of selector switch 435, is multiplied by the factor $C_LS/2m$, in which $C_L$ is the coefficient of lateral force, S is the equivalent area of the lateral control surfaces and $m$ is the mass of the craft. In this manner, the voltage proportional to air density is converted to a voltage proportional to the maximum permitted curvature of flight path.

The flight path curvature is calculated in the following manner: The output voltage proportional to cos $\theta_R$ from harmonic analyzer 419 is applied to a divider 421, which divides said output voltage by the factor K applied to terminal 423. The output of divider 421 is, thus, the quantity cos $\theta_R/K$. In like manner, the output sin $\theta_R$ of harmonic analyzer 419 is applied to divider 422, where it is divided by the quantity K to provide an output equal to sin $\theta_R/K$. Multiplier 440 multiplies the maximum allowable curvature, $q_m$, as obtained from selector switch 439 by the length of flight path $vt$, as applied at terminal 441. The output of multiplier 440 is thus the quantity $q_mvt$. The outputs $q_mvt$, sin $\theta_R/K$ and cos $\theta_R/K$ are applied to a function generator 445*a* for generating the auxiliary quantity N″ used in calculating curvature of flight path $q$. The valve N″ is equal to $a_3+b_3$ where $a_3$ and $b_3$ are the solutions of the two equations:

$$\frac{\sin \theta_R}{K}=\int_0^1 \sin \frac{(q_mvt)}{(b_3)} [\sin (a_3+b_3u)-\sin a_3]du$$

and:

$$\frac{\cos \theta_R}{K}=\int_0^1 \cos \frac{(q_mvt)}{(b_3)} [\sin (a_3+b_3u)-\sin a_3]du$$

These equations are solved in any well-known manner to provide a table for the value of $a_3$ and $b_3$ which as well as N″ are functions of the outputs $q_mvt$, sin $\theta_R/K$ and cos $\theta_R$,$/K$, expressed in terms of the aforementioned three outputs. From the aforementioned method of Pike-Silverberg as described in connection with FIG. 22, a function generator for calculating N″ is provided. This function generator is identical in construction with the function generator 251 shown in FIG. 22, except that the potentiometers 266, 267, and 268 are replaced by potentiometers wound according to the curves for the three functions $F_1'F_2'F_3'$, respectively, corresponding to $F_1$, $F_2$, $F_3$ in connection with FIG. 22. These functions are obtained by the Pike-Silverberg or other appropriate methods. In particular, the function generator 445 is similar to the function generator shown in FIG. 22 and the value cos $\theta_R/K$, shown in FIG. 28, is connected to amplifier 260 of FIG. 22. The value sin $\theta_R/K$ is connected to amplifier 261 and the value $q_mvt$ is connected to amplifier 262. As noted, the potentiometers 266, 267, and 268 are wound according to the curves for the functions $F_1'$, $F_2'$, and $F_3'$ as determined by the aforementioned method or methods. The output from adder 279 is the quantity N″. This quantity is applied to amplifier 446 and position servo 447 which positions the nonlinear potentiometer 448 wound so as to represent the well-known cosine function of the input. The output taken from arm 449 to the potentiometer is therefore the quantity cos N″. This quantity is applied to multiplier 450 as one of the factors of the product $q$ while the other factor is the quantity $q_m$ obtained from multiplier 438 by way of switch 439. The output of multiplier 450 is the quantity $q$ appearing at terminal 451, and is the required curvature of flight path. Since the valve cos N″ is always less than unity, it can be seen that the quantity representing the curvature $q$ can never exceed the maximum permitted curvature $q_m$, which, therefore, achieves the purpose of the function generator 416. The quantity $q$ at terminal 451 can be converted to bank angle $\phi_b$ for introduction to the autopilot or to a visual display for the pilot in a manner identical to that shown in FIG. 21. In short, multiplier 285 connected to position servo 287 and to the inverse tangent potentiometer 288 are used to perform the described conversion.

On the other hand, when the intended flight program becomes impossible to execute after the commencement of a flight, an impossible flight alarm 455 is energized by being connected in series with the source of direct current 428 and potentiometer driven switch 456. This switch is connected on the shaft which drives the arm 449 of potentiometer 448 and is positioned to close by means of shaft movement whenever cosine N‴ becomes equal to unity.

Referring again to FIG. 28, the values sin $\theta_R/K$, or cos $\theta_R/K$ and $q_mvt$ are fed to an impossible program indicator 460 which is connected to function generator 416 and indicates in advance of the commencement of a program that the intended flight cannot be completed by the craft directed by the computer. In other words, the characteristics of the craft which represents maneuverability is insufficient to meet the requirements of the program.

Referring in particular to the impossible program indicator, switch 439 selects the output of potentiometer 426 which, as noted, was manually set to the minimum air density expected which corresponds to the maximum permitted curvature of the flight path for the craft. This output $q_m$ is applied to a subtractor 461 in which the manually set minimum expected curvature $p^*_m$ as calculated by a three input function generator 462. The maximum curvature $q^*_m$ is determined from graphs of flights under a plurality of values of $\theta_R$, $q_m vt$ and K according to well-known engineering techniques. Such techniques include experimental flights or by plotting such flight paths for values of curvature $q$ as obtained at terminal 451 for values of inputs K, $\theta_R$ and $vt$ at terminals 423, 415, and 441, respectively. The flight curves are plotted point by point and the value of maximum curvature, as graphically indicated, is found by known techniques. This value representing the maximum indicated curvature is entered into a table for values of the three input variables to function generator 462. These values are tabulated in a well-known manner and are used to determine the coefficients of the Taylor expansion of the function $q^*_m$ as a function of the three inputs supplied to function generator 462 by well-known methods, such as the "least squares" method or the "method of moments." The values of these coefficients are incorporated into the multipliers of either 310 of FIG. 23 or 462 of FIG. 28*a*. A schematic of function generator 462 is shown in detail in FIG. 28*a* which is a schematic diagram of a function generator for calculating the value of a function of three independent variables, such as the maximum expected curvature $q^*_m$ from the inputs sin $\theta_R/K$, cos $\theta_R/K$, and $q_m vt$ by means of a Taylor expansion. This function generator 462 is similar in operation to the generator shown in FIG. 23, and identical elements are indicated by the corresponding numbers of FIG. 23 with addition of the subscript "*a*." The inputs to amplifiers **312*a*, 313*a* and 314*a* are cos $\theta_R/K$ which is connected to 312*a*, sin $\theta_R/K$ which is connected to 313*a*, and $q_m vt$ connected to 314*a*. These values are squared in potentiometers 318*a*–320*a* in the manner described with reference to the elements in FIG. 23. The output of the squaring potentiometers 318*a*, 319*a* and 320*a* are multiplied by the Taylor coefficients A″, B″, and C″ in well known multipliers by constants 462, 463, and 464 to provide the squares of the input quantities multiplied by their corresponding Taylor coefficients. These outputs are combined with other outputs, to be described in connection with an adding circuit 334*a*** to provide an output signal $q^*_m$, at terminal **358*a*. Again, the outputs of multipliers 328*a*, 330*a* and 332*a* representing the cross-products of the Taylor terms, are multiplied by the values of the coefficients, previously provided by the aforementioned table. These values of coefficients A‴, B‴, and C‴ are incorporated in multipliers 466, 467 and 468, respectively. The inputs to function generator 462 are directly multiplied by the Taylor coefficients A′, B′, C′ in well known multipliers by constants 469, 470, 471, respectively, to provide the linear terms of the Taylor expansion. These additional values are combined in adding circuit 334*a*** with the aforementioned cross-products and quadratic terms to provide the combined output which is the value of the maximum expected curvature $q^*_m$. This value is fed to subtractor 461 to FIG. 28 as the minuend input value.

Referring again to FIG. 28, the permitted maximum curvature $q_m$, as obtained from switch 439 is fed to subtractor 461 as the subtrahend value. The difference value of the subtractor 461 is connected in series with a direct current bias source 472 to the control electrode of a switch tube 473. A warning indicator 474 is connected in series with a relay 475 in the grid circuit of said tube and in series with an anode voltage source 476. The bias source is adjusted so that the tube 473 conducts in response to a positive output signal from subtractor 461 indicating that the maximum expected curvature $q^*_m$ exceeds the maximum permissible curvature $q_m$.

The function generator **445*a* of FIG. 28 is shown in detail in FIG. 22. However, FIG. 29 is a schematic diagram of a function generator 500 for calculating the auxiliary value N″ in addition to course angle $\theta_P$. The value N″ is used in calculating the curvature of the path $q$ in the horizontal path or curvature computer 416 of FIG. 28. The three inputs to the function generator 445*a* are, as noted above, cos $\theta_R/K$, sin $\theta_R/K$ and $q_m vt$, as shown in FIG. 28. These inputs are fed to function generator 445*a* of FIG. 28 by way of terminals 501, 502, and 503. It should be understood that the embodiment shown in FIG. 29 is an improvement upon the embodiment of function generator 445 shown in FIG. 28 because it also provides an output proportional to the required course $\theta_P$ of the craft at output terminal 504. This is in addition to the auxiliary quantity N″ which appears at output terminal 505. The signal $\theta_P$ provides a direct indication of the required course of the craft for display by course indicator 506, or for use in connection with a rudder servo or autopilot, not shown. Thus, alternative guidance of the craft is made possible by the function generator 500. However, a separate output at terminal 507 supplies the value of the required direction of travel at the target $\theta_T$. This value is fed into the computer by being connected to hand input 20** of FIG. 1.

Referring in particular to FIG. 29, there is shown computing elements 508 and 509 which receive the inputs from terminals 501–503, and calculate the auxiliary quantities $a_3$ and $b_3$. These values are obtained as the solutions of the following two equations:

$$\frac{\sin\theta_R}{K}=\int_0^1 \sin\left\{\frac{q_m vt}{b_3}\left[\sin(a_3+b_3u)-\sin a_3\right]\right\}du$$

$$\frac{\cos\theta_R}{K}=\int_0^1 \cos\left\{\frac{q_m vt}{b_3}\left[\sin(a_3+b_3u)-\sin a_3\right]\right\}du$$

where $u$ is an integration constant. These equations are solved by the aforementioned Pike-Silverberg method for the three basic functions $F_1$, $F_2$ and $F_3$ or for the coefficients of their Taylor expansion by well known methods. The potentiometers 266, 267, and 268 of FIG. 22 are used in connection with the circuit indicated by subcomputers 508 and 509 of FIG. 29. These potentiometers are wound according to the Pike-Silverberg basic functions, each of one independent variable, or the Taylor expansion coefficients method described in detail in connection with FIG. 23 and FIG. 22, respectively. The output of subcomputers 508 and 509 are the auxiliary quantities $a_3$ and $b_3$ derived in connection with the theory for the horizontal computer to be given in detail following a description of the embodiments of the horizontal computer.

The quantity $a_3$ is applied to an adder 510 where it is combined with $b_3/2$, the latter intermediate quantity being obtained from the multiplier 511, which multiplies the quantity $b_3$ by one-half. It is not required that multiplier 511 be a separate element inasmuch as multiplication by one-half can be achieved by a mere reinterpretation of scales. Thus, if 10 volts at the output of computer 509 corresponds to unity, this same voltage is considered as representing a number which is one-half of the one at the input to adder 510. It should be understood that the multiplier 511 can also be a voltage divider.

The output of adder 510 is thus the quantity $$a_3+\frac{b_3}{2}$$

This quantity is fed to a well known amplifier 512, position servo 513 and non-linear potentiometer 514 energized by a source of direct current 515. The potentiometer 514 is wound in a well known manner according to the cosine law. The output of potentiometer 514 is thus the quantity $$\cos\left(a_3+\frac{b_3}{2}\right)$$

This quantity is supplied as one of the input factors to multiplier 516. The second factor is obtained in the following manner.

The output of multiplier 511, which is $b_3/2$ is applied to the usual combination of amplifier 517, position servo 518, and a non-linear potentiometer 519 which is energized by a source of constant potential 515. The potentiometer 519 is wound in a well known manner according to the sine law. Thus, the output of potentiometer 519 is the quantity sine $b_3/2$. This quantity is applied to the divider 520 as the dividend, the divisor being obtained directly from the mutiplier 511 and is therefore $b_3/2$. Consequently, the output of divider 520 is a voltage proportional to the quantity sine $(b_3)/2$ divided by $(b_3)/2$ which is the aforementioned second factor.

The output of multiplier 516 is fed to a multiplier 521 where it is combined with the signal voltage $q_m vt$ obtained from terminal 503. This quantity, as seen, is the quantity for maximum curvature multiplied by the length of path remaining to the point of destination. The output of multiplier 521 is the sum of the values corresponding to the angle $\theta_\rho$, the course of the vehicle with respect to North, and angle $\theta_T$, corresponding to the desired direction of motion at the destination point, also, with respect to North. The sum of these two angles is applied to a subtractor 522 in which the angle $\theta_T$ is subtracted from the sum of the two angles. The remainder or output of subtractor 522 is the required course of the vehicle with respect to North. The value $\theta_T$ is obtained from terminal 507 and is manually introduced into the system as hereinbefore described. The required angle of motion of the vehicle $\theta_\rho$ is fed to a course indicator 506 and is connected to an autopilot or similar control mechanism by way of terminal 504.

At the same time, the outputs of subcomputers 508 and 509, respectively, are fed to an adder 523 in which their combined output is the auxiliary quantity N″ referred to previously and which is available at terminal 505 for further processing as described in connection with FIG. 28.

The exposition of the theory of the computer for the horizontal path of motion of a vehicle is provided to indicate the mathematical basis for operation of the embodiments of the horizontal computer, and the reasons for which said computer controls the motion of a vehicle along a continuously recomputed path to arrive at a preset point of destination at a preset instant of time and to be moving upon reaching said point of destination in a preset direction. The mathematical analysis of the guidance problems in the horizontal direction takes into consideration the preset requirements of the program of motion for the vehicle or craft. These requirements are, first the horizontal velocity of the vehicle, that is, the projection of the velocity of the vehicle upon a horizontal plane; second, the required duration of motion to reach the preset point of destination; third, the bearing, in respect to, say, North, of the line of sight of the vehicle to the point of destination and, fourth, the use of the principle of a recomputing procedure. This latter principle is one in which any point in space is considered to be the starting point of a path of travel from which the program is solved anew in a continuous manner.

As a preliminary to the matematical discussion the results of the theory are summarized briefly for convenience. The required guidance angle, $\zeta$, is defined as the angle between the direction of motion and the line of sight from the craft to the point of destination at any one instant of time. This angle possesses a definite value at any particular point along the path of motion. By means of the theory to be described this angle was found to be given by the curve shown in FIG. 13. In this figure, the ordinate represents the required angle of motion $\zeta$ and constitutes the output variable of the horizontal path computer. The abscissa represents the input to the function generator of the embodiments of the horizontal path computer and is proportional to the quantity:

$$K_1=\frac{vt}{R}-1-\frac{\theta_R{}^\circ}{360^\circ}$$

in which $r$, $v$, $t$, and $\theta_R{}^\circ$, the latter expressed in degrees, are previously defined values. It is to be noted that $$\frac{vt}{r}-1=\frac{vt-r}{r}$$

is the ratio of the excess of length of the path of travel over the distance to the point of destination to that distance itself. The value of this ratio is always greater than unity and reaches unity only at the point of destination. This fact constitutes a basic reason why the vehicle reaches the point of destination at the preset instant of time.

The latter equation and the aforementioned curve also indicate that at the point of destination the angle of motion $\zeta$ becomes zero because $vt=r$ and $\theta_r=0$ simultaneously. In this manner, the vehicle approaches the point of destination at the initially preset angle $\theta_{R_0}$, the subscript 0 indicated that this is the value of the angle $\theta_R$ at the instant of time at which the horizontal path computer was put into operation and the programmed motion of the vehicle was thus started.

The following is the theory of the computer for ordering the angle of motion in a horizontal direction. The horizontal path computer is supplied with two inputs, namely, the value of the parameter K and the angle $\theta_R$. These inputs are used to compute the command or guidance signal $\zeta$ which is either displayed to the pilot, or fed into an autopilot. The mathematical basis of the computer is now given briefly. Polar coordinates are used with the pole at the point of destination. In these, the radius-vector is taken in a normalized form, that is, as the ratio of the instantaneous value of the radius vector Y to the initial value $Y_0$ of the same. The angle $\theta_R$ is defined as the angle between the present direction of the radius vector and the direction over the point of destination at which it is desired the vehicle to move upon reaching said point of destination.

The various embodiments of the horizontal path computer are based upon a set of two parametric equations: one for $p=r/r_0$ and the other for $\theta$.

The polar equations of the path of motion are taken in the parametric form:

$$\rho=1-p;\ \theta=ap\ (1-p) \qquad (1)$$

in which $\rho$ is the normalized radius-vector, $\theta$ is the azimuth, and in which the parameter $\rho$ is limited in range, to the interval:

$$0<p\leqq 1$$

From Equation 1:

$$\frac{d\rho}{dp}=1$$

and $$\frac{d\theta}{dp}=\theta+a_4-2a_4p=\theta+a_4(1-2p) \qquad (2)$$

the point of destination:

$$p=1;\ \rho=0;\ \theta=\theta_R$$

At the start of the program:

$$p=0;\ \rho=1;\ \theta=0$$

The angle $\zeta$ is obtained from $$\tan\zeta=\frac{rd\theta}{-dr}=-\rho\frac{\theta'}{\rho'} \qquad (3)$$

so that the angle of guidance $\zeta$ is:

$$\tan \zeta = -\frac{\theta'_{(0)}}{-1} = \theta'_{(0)} = \theta_R + a_4 \quad (4)$$

from which $$a = \tan \zeta - \theta_R \quad (5)$$

but since $$ds^2 = dr^2 + r^2 \frac{2}{d\theta}$$

$$(ds)^2 = (dr)^2 + (r^2)(du)^2$$

$$K = \int_0^1 \sqrt{(\rho')^2 + \rho^2(\theta')^2 dp}$$

$$= \int_0^1 \sqrt{1 + (1-p)^2[\theta_R + a_4(1-2p)]^2 dp} \quad (6)$$

or making use of the value of $a$ given in Equation 5

$$K = \int_0^1 \sqrt{1 + (1-p)^2[\theta_R + (\tan \zeta - \theta_R)(1-2p)]^2 dp} \quad (7)$$

which is a complete elliptic integral of the Second Kind.

Equation 7 yields the values of K as a function of the two variables $\theta_R$ and $\zeta$ in the form of a double-entry table. Since for $\zeta = \pi/2$, the tangent becomes infinite so does K, and as a consequence the mesh of K in the table becomes wider and wider as $\zeta$ approaches 90°. This is of course, not desirable and it is preferable to retabulate the results so as to list the values of $\zeta$ as a function of K and $\theta_R$. This can be done graphically with accuracy sufficient for engineering purposes, by plotting K against $\theta_R$ and $\zeta$, and cutting across the resulting graph with straight lines, parallel to the axis of the abscissa and corresponding to equally spaced values of K. The resulting set of simultaneous numbers obtained are then replotted, this time with $\zeta$ as the ordinates. The same result can be obtained arithmetically by any one of the numerous well-known methods of backward interpolation available and is preferably carried out on an electronic digital computer in order to save time. In mathematical terms, this is the inversion, with respect to $\zeta$, of the elliptic integral (7).

Since the number of solutions of the problem dealt with by the horizontal program computor is, clearly, limitless, other forms, besides the one shown by Equation 7 are possible, and can be considered. For example:

$$K = \int_0^1 \sqrt{1 + p^2[2p(\theta_R + \tan \zeta) - \tan \zeta]^2 dp} \quad (7a)$$

This is of somewhat simpler form than Equation 7 or:

$$K = \int_0^1 \sqrt{(4p-1)^2 + (1-p-2p^2).^2 - [\theta_R(\theta_R + \tan \zeta)(2p-1)]^2 dp} \quad (7b)$$

This is a hyperelliptic integral so that numerical evaluation and inversion are in order. However, it is clear that it satisfies the conditions of a straight line flight path for which $\theta_R = 0$, $\zeta = 0$ and $$K = \int_0^1 (4p-1)\,dp = 1$$

thereby making $K = 1$ as required. Neither the form (7a), nor the form (7b) lead to such a simple approximate expression for the angle of guidance as does the form adopted as the basis of the design of the analytical form of the horizontal program computer.

By adopting any one of the various possible forms for the parameter K, the shapes of the resulting paths of motion can be altered at will and the one selected which best meets all requirements such as "flattening" the path, i.e., making the path deviate only a little from the initial direction of the target when $\theta_R$ is at or near 180°. From the prepared table it can be seen that the shift of the $\theta_R = 180°$ curve with respect to the curve $\theta_R = 0°$ is very close to 0.5 on the scale of the K, as has been embodied in the horizontal computer. The shapes of the two curves discussed is such that no significant error is introduced by shifting the curve $\theta_R = 180°$ so as to coincide with the curve $\theta_R = 0°$.

The sheet $\zeta = \zeta(K, \theta_R)$ folds on itself at $\theta_R = 180°$, so that the function $\zeta$ is double-valued, and possesses identical values at any K for two values of $\theta_R$: one, positive, the other, negative. The curve $\zeta$ is symmetrical about the axis of the K's only for $\theta_R = 0$, as it should be on the basis of Equation 7. The curve $\theta_R = 90°$ lies significantly nearer to the curve $\theta_R = 0°$ than to the curve $\theta_R = 180°$.

In view of the above, the function $\zeta = \zeta(\theta_R, K)$ can be adequately represented by the single curve appearing in FIG. 13.

The integral in Equation 7 can be simplified by approximate methods to provide simple expressions for the angle of guidance $\zeta$. The first is based on an approximate integration of the integral (7) by means of the trapezoidal rule and yields:

$$\sec \zeta = 4K - 1 - 2\sqrt{1 + (\theta_R/2)^2} \quad (8)$$

The second, and more accurate approximation, based on Simpson's rule, gives:

$$\sec \zeta = 6K - 1 - 4\sqrt{1 + (\theta_R/2)^2} \quad (9)$$

The erorr in $\zeta$ caused by the use of these approximations is, in general, of the order of 2°, which is practically negligible when a recomputing process is used. Further, the values of the coefficients in Equations 8 and 9 are flexible. Consequently, they can be chosen so as to achieve some desired characteristic of the path of motion, such as the "flattening" mentioned previously. The following coefficients must be so chosen, however, that at the point of destination, the angle $\zeta$ becomes zero. This means that for $K = 1$ and $\theta_R = 0$, $\sec \zeta = 1$, and so, using the general form:

$$\sec \zeta = a^*K - 1 - b^*\sqrt{1 + (\theta_R/2)^2} \quad (10)$$

where $a^*$ and $b^*$ are coefficients, the above condition is expressed as:

$$1 = a^* - 1 - b^*$$

or $$a^* - b^* = 2$$

so that:

$$\sec \zeta = b^*[K - \sqrt{1 + (\theta_R/2)^2}] + (2K - 1) \quad (11)$$

for any $b^* > 0$.

It is seen that the two approximate expressions Equations 8 and 9 given above for $\sec \zeta$ conform to the above condition. In this manner, the curve shown in FIG. 13 of the horizontal computer has been derived mathematically for which the order transmitted to the moving vehicle is the angle of motion $\zeta$.

The embodiments in which curvature is transmitted as an order to the moving vehicle are based upon the following computer theory which is given as an example in as much as the theory for embodiments which employ cornu spirals and the like are not included herein for the sake of brevity.

The following is the theory of the computer for the limited curvature of the path of travel. Referring to FIG. 2, a dotted perpendicular line PA, is dropped from P to the line TA, and let $\beta$ be the angle between the direction of motion of the vehicle and the intended direction of motion over the point of destination, and $q$ be the curvature, $q_m$ be the maximum curvature of the path: $-q_m \leq q \leq q_m$; let $s$ be the variable length of arc of the path and $s_0$ be the length of path at any one instant of time $0 \leq s \leq s_0$. Let:

$$q = q_m \cos(a_3 + b_3 u) = \frac{d\beta}{ds} \cdot \frac{du}{du} = \beta' \frac{du}{ds} = \frac{\beta'}{s_0}$$

in which $$K=\frac{s}{s_0};\ s=s_0u;\ ds=s_0du$$

Integrating with respect to $u$:

$$\beta=\frac{q_m s_0}{b_3}\cdot \sin\ (a_3=b_3u)+A_1$$

At the point of destination T:

$$u=0,\ \beta=0$$

so that $$0=\frac{q_m s_0}{b_3}\sin\ a_3+A_2$$

and:

$$\therefore A_2=-\frac{q_m s_0}{b_3}\sin\ a_3$$

and so:

$$\beta=\frac{q_m s_0}{b_3}\left[\sin\ (a_3+b_3u)-\sin\ a_3\right]$$

From FIG. 2:

$$A_1P=r\sin\theta_R=\int_0^{s_0}\sin\beta ds=s_0\int_0^1\sin\beta du=s_0\int_0^1\sin\left\{\frac{q_m vt}{b^3}\left[\sin\ (a_3+b_3u)-\sin\ a_3\right]\right\}du$$

$$A_1T=r\cos\theta_R=\int_0^{s_0}\cos\beta ds=s_0\int_0^1\cos\beta du=s_0\int_0^1\cos\left\{\frac{q_m vt}{b_3}\left[\sin\ (a_3+b_3u)-\sin\ a_3\right]\right\}du$$

in which the integrals are Bessel functions. Further:

$$\frac{\sin\theta_R}{K}=\int_0^1\sin\beta du=\int_0^1\sin\left\{\frac{q_m vt}{b_3}\left[\sin\ (a_3+b_3u)-\sin\ a_2\right]\right\}du \qquad (12)$$

$$\frac{\cos\theta_R}{K}=\int_0^1\cos\beta du=\int_0^1\cos\left\{\frac{q_m vt}{b_3}\left[\sin\ (a_3+b_3u)-\sin\ a_3\right]\right\}du \qquad (13)$$

These equations are solved for the constants $(a_3)$ and $(b_3)$:

$$\therefore (a_3,\ b_3)=F_{1,2}\left(\frac{\sin\theta_R}{K},\frac{\cos\theta_R}{K},q_m vt\right)$$

where F represents a function.

The curvature at any point $p$ in FIG. 2 is:

$$q(1)=q_m\cos\ (a_3+b_3)=q_m\cos N''$$

where:

$$N''=a_3+b_3$$

The maximum allowable curvature is given by:

$$q_m=F_2\left(\frac{\sin\theta_R}{K},\frac{\cos\theta_R}{K},q_m vt\right)$$

and the angle $\beta$ coresponding to point $p$ is:

$$\beta(1)=\frac{q_m vt}{b_3}\left[\sin\ (a_3+b_3)-\sin\ a_3\right]=\frac{2q_m vt}{b_3}\cos\frac{1}{2}(2a_3+b_3)\ .\ \sin\frac{1}{2}(b_3)$$

or:

$$\beta(1)=\frac{2q_m vt}{b_3}\cdot\cos\ (a_3+b_3)\ .\ \sin\frac{b_3}{2}$$

that is:

$$\beta(1)=q_m vt.\ \cos\left(a_3+\frac{b_3}{2}\right)\cdot\frac{\sin\left(\frac{b_3}{2}\right)}{\left(\frac{b_3}{2}\right)}$$

Now, from FIG. 2:

$$\beta=\theta_T+\theta_P$$

or $$\theta_P=\beta-\theta_T=q_m vt\,F_3(a_3b_3)$$

in which:

$$F_3(a_3,\ b_3(=\cos\left(a_3+\frac{b_3}{2}\right)\cdot\frac{\sin\left(\frac{b_3}{2}\right)}{\left(\frac{b_3}{2}\right)}$$

and $\theta_P$ is the required corner angle of the vehicle with respect to North as can be seen from the above figure.

There will now be described the system for controlling the motion of a vehicle or craft in the vertical direction.

Referring to FIG. 30 there is shown a pictorial view of a vehicle or craft 700 intending to reach a given point of destination 701, and to touch a predetermined plane 713 or ground at a preset angle of inclination 714 of the flight path, that is, the angle between the tangent to the path of descent and the plane of the ground at the point 701. In this vertical path system navigation along a fixed path with its attendant difficulties is eliminated. In its place, the vertical path of descent is computed anew from every point in space. This method, as noted, is termed the recomputing method or procedure in which every point of space occupied by the vehicle or craft is considered as the initial point of the program from which the landing problem is continuously solved anew. As described with reference to the horizontal computer, this recomputing procedure compensates or corrects for appreciable errors in speed, height and range of the craft from the point of destination.

As seen in FIGS. 30 and 32, the craft 700 carries an altimeter 702 which preferably is of the sonic or radar type to provide accurate low altitude height information, $h$. A tracking radar 703 is provided to challenge a transponder or reflector 704 located near to the intended point of destination 701. The tracking radar provides slant range $r_2$ and the angle of depression $\phi$, that is, the angle between a line parallel to the plane 713 and the line of sight. From these inputs $h$, $r_2$, and $\phi$ the vertical path computer calculates the required inclination of the path of descent and the velocity of descent, $v_h$ with respect to the ground or plane 713, for any given instant of time. These values are either displayed on indicator 705 and 706 of FIG. 32 for use by the pilot of the craft or these outputs can be used as inputs to an elevator control system for the vehicle. In particular, the required angle of inclination of path at terminal 707, connected to indicator 705, is fed to well known servo amplifier 708 which operates the elevator servo 709 to move the elevator surface 710 of the craft. A well known horizontal stable platform 711 provides indication of the actual angle of descent $y_1'$. This angle is compared in comparator 712 with the required angle of inclination $y'$ and the difference between these angles actuates servo 709 by means of amplifier 708. In this manner, the elevator surface 710 or similar device for controlling the altitude of a craft is maintained in a position such that the actual angle of descent of path $y_1'$ is kept equal to the required angle of descent $y'$ as calculated by computer 715 in a manner to be described in detail.

Alternatively, by closing switch 716 and opening switch 717 the landing operation can be executed using the indication of the required vertical velocity of descent $v_h$ appearing at terminal 718. The required velocity of descent $v_h$ is applied to a well known comparator circuit 719 in which the voltage corresponding to $v_h$ is compared with the voltage corresponding to the actual velocity of descent $v_h'$. The velocity of descent is obtained by integrating a voltage proportional to the vertical acceleration $\ddot{y}$ obtained from a well known vertical accelerometer 721 carried by stable platform 711. This vertical acceleration is integrated by means of a conventional real time integrator 720. The difference voltage between the required velocity signal $v_h$ and the actual velocity of descent $v_h'$ is applied to an amplifier 722 and operates the actuator element 723 of the elevator 710 of the craft. In this manner, the required velocity of descent is continuously compared with the actual velocity of descent and the elevator surface 710 is positioned in such an altitude as to maintain equality between the required computed and the actual velocity of descent.

While this method of controlling the vertical motion has been described specifically for use in connection with an aircraft, it should be understood that this arrangement can be used to control the vertical motion of missiles and space vehicles, as for instance in the case of a soft lunar landing. In such instance, the elevator surface 710 is replaced by the element used to control motion in the vertical direction in such vehicles or in a direction perpendicular to the plane 713 of FIG. 30.

Referring now to FIG. 31, the invention contemplates placing on the ground the control equipment for guiding the landing of the craft. In such instance, the craft is guided by a signaling means such as radio signals, radio link or well known communication system or other signal system. As shown in FIG. 31, a craft **700*a* carries a transponder or reflector 730 which returns signals in response to energy transmitted by radar 731 which can be in a fixed location or located in a movable vehicle 732. Radar 731 is provided with a conventional elevation angle measuring device which generates at terminal 733 an electrical quantity proportional to the angle of elevation $\phi$. The radar also provides the slant range to the craft, $r_2$, which appears as a voltage at terminal 734. The voltage proportional to the angle of elevation $\phi$ is fed to an amplifier 735 which operates a position servo 736. The latter servo actuates a non-linear potentiometer 737 energized by a source of voltage 742 and wound so as to provide an output voltage proportional to the sine of the angle $\phi$. This voltage is fed to a conventional multiplier 738 in which it is multiplied by a voltage proportional to the slant range $r_2$, obtained previously. The output of this multiplier represents the height $h_1$ of the aircraft over the level of the tracking radar 731. To this height is added the height $h_v$ of the tracking radar above the ground 713 by means of adder 739. The output of adder 739 is the total height $h$ of the aircraft above the ground level 713. This output is connected to terminal 740 for use in the computer 760 of FIG. 33 by being fed to terminal 761**.

Referring to FIG. 32, the angle of elevation $\phi$ obtained by tracking radar 731 of FIG. 31 is applied to terminal 714 of FIG. 32. Alternatively, the angle of elevation $\phi$ is obtained from the height $h_1$, which is the output of multiplier 738 of FIG. 31 and is applied by way of terminal 715 to the terminal 729 of FIG. 32. In the latter case, the height $h_1$ is divided by the slant range $r_2$ at terminal 724 to obtain the sine of the angle of elevation $\phi$. Thus, divider 725 provides a signal proportional to the sine of the angle $\phi$ and this signal drives position servo 726 through amplifier 727. The position servo 726 actuates a non-linear potentiometer 728 which is wound according to the well known inverse sine law so that the output of this potentiometer is a signal proportional to the angle $\phi$. This output is fed to subsequent computation circuits, to be described, by means of a selector switch 745 to obtain the required speed of descent $v_h$ of the vehicle. Selector switch 745 can select the angle of elevation or depression $\phi$ either directly from terminal 714 of FIG. 32 or from the potentiometer 728. This angle of elevation, or depression in the case of a landing operation, is multiplied by a constant $n$ in the multiplier 746. The output $n\phi$ is applied to a subtractor 747 which evaluates the first term of the equation which determines the required angle of descent. The slope of descent $y'$ is equal to $n\phi-(n-1)\tan\phi_0$, where $\phi_0$ is the required angle of the path of the vehicle at the landing point 701 of FIG. 30. The angle $\phi_0$ is introduced into the computer by a hand control 748 which positions the arm of a non-linear potentiometer 749 wound according to the law: $(n-1)\tan\phi_0$ representing the second term of the above equation. Subtractor 747 subtracts the second term from the first to produce the required slope of descent $y'$ which appears at terminal 707.

Simultaneously, the slope of descent $y'$ is fed to multiplier 755 which multiplies $y'$ by the air speed of the vehicle $v_a$ which appears at terminal 756 of the computer 715. It should be understood that the velocity of the vehicle, sometimes referred to as "air speed," can be obtained by any suitable means, and preferably by Doppler radar or Venturi or Pitot tube. Thus, the multiplier 755 provides the velocity of descent $v_h$ which appears at the terminal 716 of computer 715 of FIG. 32. Either the slope of descent $y'$ or the velocity of descent $v_h$ can be used for control of the vehicle depending upon the position of the selector switches 716 and 717 which are interlocked to operate so that one switch is open when the other is closed. In this manner, the vertical path or landing computer of FIG. 32 provides a flight path which is obtained by the recomputing process, the general shape of which is determined by the value of the constant $n$. This constant is built in or prewired into the computer by the aforementioned shape of the winding on potentiometer 749 and by the construction of multiplier 746. For example, the character of the flight path may be varied so that the descent of the vehicle is at first slow and then rapid, or vice versa; or a generally uniform rate of descent throughout the entire path can be generated. This, however, does not mean that the craft is made to traverse a fixed or preset path since the path is continuously recomputed from the instantaneous inputs $\phi$, $h_1$ and $r_2$. While the character of the flight path is thus fixed by the value $n$ in the computer of FIG. 32, there are flight situations, such as weather turbulence or obstructions on the ground, which require a change in the character of the path during or prior to a flight. This change can be achieved by making the value of the constant $n$ adjustable, either automatically or by hand. This adjustment is shown in the computer 760 of FIG. 33 to be described.

It should, of course, be understood that adjustment of the constant $n$ does not affect the time, angle of descent or initial altitude of the program, and that the flight path remains a recomputed flight path throughout the program.

Again, if it is desirable to achieve greater accuracy in the velocity or angle of descent, particularly for programs in which the angle of depression $\phi$ is large, such as in space vehicles, the angle of descent $\phi$ is obtained from terminal 714 of computer 715. In such cases, multiplier 746 is replaced by a well known function generator which generates the quantity $n\tan\phi$ instead of $n\phi$. This generated function is then fed to subtractor 747 of computer 715.

Referring again to FIG. 32 the angle at touchdown or landing angle $\phi_0$ of FIG. 30 is applied by means of hand crank 748 to non-linear potentiometer 749 wound according to the expression $(n-1)\tan\phi_0$. The output of the potentiometer is fed to subtractor 747, where it is subtracted from the output of multiplier 746. The output of this subtractor 747 is the required angle of descent as given by the expression $n\phi-(n-1)\tan\phi_0$. This latter value is applied to multiplier 755 for multiplication by a voltage proportional to the velocity of the vehicle $v_a$, applied at terminal 756 of computer 715, the output of the multiplier 755, as noted previously, is the required velocity of approach of the vehicle to the plane 713 of FIG. 30. The velocity at terminal 756 is obtained by conventional means. The non-linear potentiometers 728 and 749 are energized by the source of direct current 757 in the usual manner.

Referring to FIG. 33, a landing computer 760 comprises an input terminal 761 to which is applied a signal proportional to the perpendicular distance from the vehicle **700*a* of FIG. 31 to a plane 713. This signal can be obtained from terminal 740 of the tracking radar 731, or by a conventional altimeter. A signal proportional to the slant range $r_2$ from the vehicle to the landing point is applied at the input terminal 762. This signal can be obtained at terminal 724 of the radar 731 of FIG. 31. Divider 763 divides the signal at terminal 761 by the signal at terminal 762 to obtain a voltage proportional to the ratio $h/r_2$. This latter quantity is fed through a conventional amplifier 764 to a position servo 765 which actuates the arm of a non-linear potentiometer 766, wound in a conventional manner according to the tangent of the inverse sine law. The output of this potentiometer is therefore the tangent of the angle of depression $\theta$. This output is applied to the multiplier 768 in which it is multiplied by a constant $n$ exceeding unity in value. The output of this multiplier 768 constitutes the first term of the expression determining the required angle of descent. The expression for the required angle of descent was discussed in relation to FIG. 32. The potentiometer 766 is energized by a direct current source 767. The required angle at touchdown or alighting $\theta_0$ is fed into the computer by a hand crank 769 which positions the arm of non-linear potentiometer 770. The output of this potentiometer is the tangent of the angle $\theta_0$. This output is supplied to multiplier 771 which multiplies the output by a constant $(n-1)$. Therefore, the output of multiplier 771 is $(n-1)\tan\theta_0$. The value $n$ in the multipliers are set by the hand crank 772. It should be understood that the value of the constant $n$, which determines the shape of the flight path, should exceed unity to avoid reversal of the output sign of multiplier 771. The output of this multiplier constitutes the second term of the expression for the required angle of descent $y'$ which reaches the output terminal 773 through a selector switch 774**.

The velocity of motion of the vehicle, $v_a$, is applied to computer 760 by way of terminal 775 connected to a multiplier 776 which multiplies this value by the required angle of descent $y'$. The output of multiplier 776 represents the required velocity of descent $v_h$ which reaches the output terminal 777 by selector switch 778. This switch is ganged with selector switch 774 so that, when one switch is open the other is closed, since either output $v_h$ or the output $y'$ are adequate for the control of the motion of a vehicle and their simultaneous use becomes unnecessary. Accordingly, the output of subtractor 772 represents the quantity $$y'=n\tan\phi-(n-1)\tan\phi_0$$

From this expression it is seen that at the end of the journey when $\phi$ equals $\phi_0$, $y'=\tan\phi_0$ as required by the program, since for small angle, the tangent of an angle can be replaced by the angle itself.

The symbols used in above theory are shown in connection with FIG. 34 which defines the quantities used in the present vertical computer system. FIG. 34 shows the vertical projection of the path of a vehicle which is referred to a co-ordinate system YOX in which $v_x$ is the horizontal projection of the velocity $v_a$ of the craft. The theory of the vetrical computer is given below.

The equation of the path of descent can be represented by a generalized parabola:

$$y=ax^n+bx(n>1)$$

From this, differentiating $y$ with respect to $x$:

$$y'=nax^{n-1}+b$$

Therefore, at the origin, $x=0$:

$$y'(0)=b=\tan\phi_0$$

Also:

$$ax^n=y-bx$$

or:

$$ax^{n-1}=\frac{y}{x}-b=\tan\phi-\tan\phi_0$$

And so, finally:

$$y'=\frac{v_h}{v}=n\ (\tan\phi-\tan 0_0)+\tan 0_0$$

This is because $(v_x\approx v)$.

Rewriting the above in the form:

$$y'=\frac{v_h}{v}=n\tan\phi-(n-1)\tan\phi_0=n\phi-(n-1)\phi_0$$

because for small angles, the tangent of such angles can be replaced by the angles. In this manner, the law governing the motion of the craft is obtained.

The above discussion is the logical basis for the embodiments of the landing computer. The theory for the horizontal computer has been described.

Referring now to FIGS. 34 and 35, there are shown a schematic diagram of a vetrical flight of a vehicle and a schematic diagram for a vertical path computer for fulfilling the requirement of passing over the point of destination T at a predetermined angle $\phi_0$, at a predetermined height $h_0$, and at a predetermined instant of time $t$.

The equation which gives the required vertical control is shown above in the following form, since in the above equation, $$\phi=\frac{h-h_0}{s}$$

$$y'=\frac{h-h_0}{s}n-\phi_0(n-1)$$

where $y'$ is the required inclination of the flight path for any given instant of time, $h$ is the perpendicular distance of the craft from a fixed plane such as the surface of the earth, sea or any other fixed surface at the given instant of time, $h_0$ is the required altitude of the craft at the termination of the vertical program, $\theta_0$ is the angle to the fixed plane in which the craft is intended to move upon reaching the destination. The slope of the flight path is taken by definition as being positive when the craft is moving towards the fixed plane. In addition, $s$ is the distance in the fixed plane between the actual position of the vehicle and its destination, $n$ is a numerical constant which according to following discussion is either a constant or a function of $vt$, where $vvv_x$, and, $v_x$, as noted, is the component of the velocity in the fixed plane and $t$ is the time left to complete the program to arrive at the point of destination, T. The control signal of the craft, that is to say, $y'$, is given by the foregoing equation which insures that the vehicle will move at a specified angle $\theta_0$ and at the normal distance $h_0$ from the fixed plane when reaching its destination. As can be seen from the theory given above, the fulfillment of these conditions resides in the fact that the second term of the equation, $\theta_0$, is multiplied by a factor which is less by unity than the factor by which the term $h-h_0/s$ is multiplied. In this feature lies the basis of the solution of the program problem relating to vertical program computer. The first term of the above equation is equal to the average slope $\theta$ between the position of the vehicle at the instant considered and its destination, so that the above equation can be rewritten in a more condensed, and suggestive form:

$$y'=n\theta-(n-1)\theta_0$$

and this is precisely the equation for $y'$ given by the aforementioned theory.

In previous embodiments of the invention, the factor $n$ was kept constant throughout the entire program. A constant factor $n$ corresponds to a flight path which is a curve consisting of arcs of parabolas of degree $n$, as noted above. If the factor $n$ is varied as a function of $s=vt$, a curved path of motion is obtained in a novel manner, the equation of which is complicated and consists of logarithmic exponential and exponential integral terms, but which nevertheless, insures that the craft fulfills all the requirements of the vertical program. The embodiment of FIG. 35, therefore, provides a device which is capable of varying the properties of the path of motion in any desired manner, by simply altering the form of the function $n$ of $s=vt$, thus permitting the vehicle to pass a desired point at a given altitude and at a given angle.

It is generally considered desirable to have the vehicle move at the average slope $\phi$ for as long as possible and to reach the intended slope $\phi_0$ only in the very last phase of the flight. In this way, the altitude at no time varies greatly from the intended altitude $h_0$. If the factor $n$ is maintained constant, the maximum altitude can exceed the final altitude by as much as 15,000 feet, with $s$ equal to 600,000 feet; $\phi_0=\frac{1}{3}$ and $h-h_0=30{,}000$ feet, which does not appear to be desirable. Accordingly, the preferred embodiment contemplates keeping $n$ constant for a large fraction of the length of flight path, $s=v_xt$, and then to increase it gradually in any suitable manner to a higher value, ordinarily two or three, near the point of destination, T, as shown in FIG. 34.

Since $s=vt$, the above equation can be rewritten in the form:

$$-\dot{y}=v_xy'=v_x\left\{tv_x\frac{f'(tv_x)}{f(tv_x)}\,\frac{h-h_0}{s}+\left[tv_x\frac{f'(tv_x)}{f(tv_x)}-1\right]\phi_0\right\}$$

By comparing this equation with the equation for $y'$ given previously, it is seen that:

$$n=tv_x\frac{f'(tv_x)}{f(tv_x)}$$

This equation is applicable to all forms of the function $f(tv_x)$ which fulfills the specified conditions of vanishing together with its first derivative at the intended point of destination, i.e., at $s=0$.

FIG. 35 is a schematic diagram of a vertical path computer which operates according to the above theory and in which the inputs $h$ and $t$ are applied, respectively, to terminals 801 and 803. The inputs $\phi_0$, $h_0$ and $v$ are applied, respectively, by handcranks 800, 802, and 804 and drive linear potentiometers 796–798 shown diagrammatically for simplicity, but operating to provide a voltage proportional to the displacement of the arm of a potentiometer, similar to those previously described in embodiments shown in FIGS. 1,6, 14, or 15. Handcrank 805 drives line potentiometer 799. The input voltage developed by handcrank 800 determines the required final slope $0_0$ of the flight path. This final slope is multiplied by a function of the distance $s$, namely $[\phi_1(s)-1]$ which is a result of combination of the inputs 801–805 in a manner to be described.

The horizontal speed $v_x$ of the craft can be set in either by handcrank 804 or be supplied by other devices such as a Doppler radar or a Venturi tube measuring air velocity. When the inclination of the flight path exceeds approximately thirty degrees, the horizontal velocity $v_x$ becomes substantially less than $v$ by the factor $1/\sqrt{1+y'^2}$ where $y'$ is the inclination of the path of the craft. However, this correction factor for steep flight angles is not used herein. The inputs not set-in by hand are supplied at terminals 801 and 803. The first supplies the altitude $h$ of the craft at any given point of the path and the second at 803 supplies the time left over to reach the target, T, shown in FIG. 34. The latter time is provided by a clock, not shown. The inputs 801 and 802, that is to say, $h$ and $h_0$ are combined through the subtractor 806, the value of the output of which gives the difference $h-h_0$. This value is fed to the divider 807 as the dividend. The divisor input is obtained from the inputs $t$ and $v$ at terminals 803 and input 804. The inputs $t$ and $v$ are multiplied together by a multiplier 808 to provide the length of the horizontal projection, $s=v_xt$, of the path remaining to the target. This quantity can also be obtained directly from a distance measuring device. After division of $h-h_0$ by $s$ in the divider 807, the resulting ratio, which is $(h-h_0)/s$, is fed to a multiplier 809. The other input fed to multiplier 809 is the output of a function generator 810, the input to which is the length of path remaining, that is $s=v_xt$. The latter value is obtained from the multiplier 808. The results of the multiplication of these two inputs in the multiplier 809 is fed to a subtractor 811 as the minuend, the subtrahend, which is unity, is provided by a well known source of voltage equal to unity by means of generator 820. This subtractor 811 subtracts a voltage proportional to unity from the output of function generator 810 so that the output of subtractor 811 is a voltage proportional to $\phi_1(s)-1$. The function generator 810 comprises an amplifier driving a position servo having the well known sensing element and feedback loop. The position servo, not shown, positions the arm of a potentiometer wound according to the function $\phi_1(s)$. This function is preferably made equal to unity for values of $s$ up to approximately .8 of the intended length of flight path or for a time interval which is less by approximately 5 seconds than the programmed duration of travel. The function $\phi_1(s)$ rises then substantially linear or in any smooth manner from the value 1.0 to the value 2.0 approximately at the intended point of destination. As noted previously, this provides a flight path which extends directly toward the point of destination for substantially the length of the path and then curves in a tangential manner so as to obtain the required angle of flight $\phi_0$ at the destination point. This provides an optimum path of motion in that the path does not deviate substantially from the line of sight between the initial and final points of the flight. The function generator 810 is not shown in detail since it is similar to the previously described function generators used in the horizontal and vertical computers, that is, it consists of the well known amplifier, position servo, and non-linear potentiometer. The output of subtractor 811 is applied to a well known multiplier 812 where it is multiplied by the manually introduced angle $\phi_0$ by means of handcrank 800. The output of multiplier 812, therefore, is a voltage proportional to the quantity $\phi_0[\phi_1(s)-1]$. This latter voltage is applied to a subtractor 813 as the subtrahend; the minuend, which is a voltage proportional to the value $$\frac{h-h_0}{s}\cdot\phi_1(s)$$

is obtained from the multiplier 809. The signal resulting from this subtraction performed in subtractor 813 is a voltage proportional to the required angle of approach or descent $y'$. This voltage is applied by way of selector switch 815 to the auto pilot of the craft or to a standard display device such as a cross-hair indicator for displaying the required angle of descent to the pilot. Alternately, the speed of descent $\dot{y}=v_h$, that is the time derivative of altitude, is obtained by multiplying the required angle of descent $y'$ in a well known multiplier 816 by the speed of the craft $v$. This latter speed of the craft is supplied by the handcrank 804, driving a linear potentiometer 798, the output of which is a voltage proportional to $v$. This speed $v$ can also be obtained from a Doppler radar, a Venturi tube, or an anemometer mounted on the craft in the case of motion through the atmosphere or stratosphere. The output of multiplier 816 is thus the required speed of descent $\dot{y}$ which is fed to output terminal 817 by way of a selector switch 818. This output is fed to a velocity of descent indicator or to an auto-pilot for display or control purposes. It should be understood that, under usual flight conditions, either the output of terminal 814, that is to say, the angle of descent, or the output of terminal 817, $\dot{y}$ the velocity of descent, can be used depending upon the type of auto pilot or indicating apparatus provided on the craft. Thus, switches 815 and 818 permit either output or both outputs to be used. In this manner, the vehicle is guided so as to pass over a given point, at a given altitude, at a given instant of time and at a given angle of inclination. This device can be used also for refueling or other operations during flight at predetermined points in space and at given instants of time.

It should be understood that the function $\phi_1(s)$ can be manually introduced into the computer, instead of being generated in the function generator 810. This is achieved by means of input handcrank 805 driving a potentiometer 799. Thus, selector switch 819 can be set to select either the output of the function generator 810 or the output of potentiometer 799 which is driven by handcrank 805. This manual control permits a change in the shape of the path of motion without interruption of or interference with the preset flight program. Thus, it is possible to vary the flight during the progress of said flight so as to avoid undesirable regions of space, such as due to storms or obstructions.

It should be noted that the vertical computer, as such, is not provided with a timing device to insure that the point of destination is reached at the preset instant of time. This timing is maintained by a clock which is part of the horizontal path computer system and is set manually to the desired duration of travel. No setting is required for the vertical computer, because with the type of vertical path generated the height of the vehicle from the plane varies monotonically, that is to say, the height is either continuously increasing or decreasing, so that the preset altitude over the point of destination is reached only at the destination point. This latter point is reached in the preset time because of the operation of the horizontal computer. In this manner, both the vertical and horizontal computers cooperate to guide the vehicle both in the vertical and horizontal directions in a manner to fulfill the preset program.

Referring now to FIGS. 36 and 37 there is shown a combined guidance system for directing a vehicle located at point P, at zero elevation from the ground in both the vertical and horizontal directions so as to reach the point of destination T at a preset instant and to be moving when reaching the point of destination in a preset direction which makes the preset angle $\theta_T$ with the direction North. In particular, FIG. 36 is a schematic diagram of the path of travel $s$ of the vehicle in both the vertical and horizontal directions. A Doppler radar is located at the point $o$ on the ground plane $xoy$ to supply the vertical and horizontal data required for the vertical and horizontal path computers located also on the ground plane. These computers are shown in FIG. 37 in connection with the circuitry for converting the information supplied by a radar into a form suitable for the computers. FIG. 37 is a schematic diagram of a system which locates a vehicle, obtains the range R to said vehicle and the angles of azimuth and elevation, $\alpha$ and Y, respectively, shown in FIG. 36. In that figure, $h_1$ is the elevation of the vehicle shown at point P above the plane $xoy$. The destination point T is shown to be in the plane $xoy$ for simplicity of the exposition and on the axis $oy$ since this axis can always be passed through the points $o$ and $T$. However, a correction will be introduced in the following theory for the case in which the point T lies at the preset altitude, $h_0$, above the plane $xoy$. The trace on the plane $xoy$ of a cylinder containing the path $s$ is shown as the curve $s'$ in FIG. 36. Stated in order words, the curve $s'$ is the projection on the plane $xoy$ of the actual path of travel $s$. The horizontal program computer controls the shape of the path $s'$ by ordering the angle of motion $z$ shown in FIG. 36. The motion of the vehicle in the vertical direction is controlled by the vertical computer by generating the angle of inclination shown in FIG. 36. This is the angle between the instantaneous velocity of the vehicle, $v$, and the plane $xoy$. The value $r_0$ is the actual range PT, that is, the distance between the point P and the point of destination, T. The angle P, TP' is the angle of elevation or depression, $\phi$, which constitutes one of the inputs to the vertical path computer shown in FIG. 37. The projection of the range $r_0$ on the plane $xoy$ is the line P'T and is indicated by $r$, the latter being one of the inputs to the auxiliary circuitry of the horizontal computer in FIG. 37. The purpose of the auxiliary circuit is to convert the inputs $r$, $\alpha$ and Y, supplied by the radar in FIG. 36, to the inputs $\theta_R$, K, $\phi_0$ and $h_1$ required by the vertical and horizontal computers. These quantities are shown in FIGS. 36$a$ and 36$b$.

Referring to FIG. 36, there is shown the range from the craft to a radar R, as determined by the radar, from the point $o$ to the point P in FIG. 36, and the angle of elevation $y\gamma$ and azimuth $\alpha$, the latter being the angle between the axis $ox$ in FIG. 36 and the line OP', where P' is the projection of the point P on the plane $xoy$.

FIG. 36$b$ is also referred to in the exposition of the theory of the system shown in FIG. 36 and shows the actual range $Y_0$ from point P to point T and the projection of the range $r_0$ on the plane $xoy$, indicated again by the letter $r$, which is the distance between the point P' and T. FIG. 36$b$ also shows the relationship between the angle $\phi_R$, $\theta_T$, and $\theta_{AT}$. The origin $P_{11}$ of FIG. 36$b$ is located at the point $P_{11}$ of FIG. 36, the axis $P_{11}x_1$, $P_{11}y_1$ and $P_{11}z_1$ remaining parallel to the corresponding axis shown in FIG. 36. This is done in order to simplify the derivation of the equations which follow in connection with the theory of system shown in FIG. 37, without sacrificing the generality of the theoretical derivations since the origin of a coordinate system can be placed at any convenient point in space.

Referring to FIG. 36$b$, it is seen that:

$$\theta_R = \theta_T - \theta_{AT}$$

and:

$$\theta_{AT} = 2\pi - (\pi/2 + \alpha_1) - \tan^{-1}\left(\frac{P_{11}T}{P'P_{11}}\right)$$

so that:

$$\theta_R = \theta_T - 2\pi + (\pi/2 + \alpha_1) + \tan^{-1}(P_{11}T/P_1P_{11}) =$$

$$\theta_T + \alpha_1 + \tan^{-1}\left(\frac{P_{11}T}{P'P_{11}}\right) - \frac{3\pi}{2}$$

The time left to complete the journey is:

$$t = T_0 - t_1$$

in which $T_0$ is the preset duration of motion and $t_1$ the time elapsed since the start.

Now FIG. 36:

$$h_1 = R \sin\gamma$$

and so:

$$h = h_1 - h_0 = R \sin y - h_0$$

Further it can be seen easily that:

$$OP_1 = r \cos\gamma$$

$$OP = P_1P_{111} = OP_1 \sin\alpha$$

$$r = r_0 \cos\phi$$

$$= R \cos\gamma \sin\alpha$$

$$P_{11}T = L - R \cos\gamma \sin\alpha$$

$$P_1P_{11} = R \cos\gamma \cos\alpha$$

and so:

$$\theta_R = \theta_T + \alpha_1 + \tan^{-1}\left(\frac{P'P_{11}}{P_{11}T}\right) - \frac{3\pi}{2} =$$

$$\tan^{-1}\left(\frac{R \cos\gamma \cos\alpha}{L - R \cos\gamma \sin\alpha} + \theta_T = \alpha_1 = \frac{3\pi}{2}\right.$$

$$\phi = \tan^{-1}(h_1/r)$$

$$r = \left(\overline{P'P_{11}}^2 + \overline{P_{11}T}^2\right)^{1/2} = [(R \cos\gamma \cos\alpha)^2 + (L - R \cos\gamma \sin\alpha)^2]^{1/2}$$

and:

$$s = vt\left(\text{or } \int_0^{T_0 - t_1} v\,dt = F/T_0 - t_1\right)$$

The component of the velocity $v$ along the direction of R is:

$$v \cos\theta = R$$

therefore:

$$v = R/\cos\theta$$

and:

$$\cos \theta = ll_1 + mm_1 + nn_1$$

Now, referring to FIG. 36*a* it is seen that the direction cosines of the vector OP are:

$$l_1 = \cos \alpha$$

$$m_1 = \sin \alpha$$

$$n_1 = \sin \gamma$$

while reference to FIG. 36*b* shows that the direction cosines *l*, *m* and *n* of the velocity vector *v* are given by:

$$l = \cos (\zeta + LP_{11}P_1T)$$

in which:

$$\tan LP_{11}P_1T = L/\overline{P_1P_{11}} = \frac{L}{R \cos \gamma \cos \alpha}$$

$$1 = \cos \left[ \zeta + \tan^{-1} \left( \frac{L}{R \cos \gamma \cos \alpha} \right) \right]$$

$$m = \sin \left[ \zeta + \tan^{-1} \left( \frac{L}{R \cos \gamma \cos \alpha_1} \right) \right]$$

$$n = \cos (\pi/2 - \phi - \lambda) = \sin (\phi + \lambda)$$

so that:

$$\cos \theta_1 = \cos \alpha_1 \cos \left[ \zeta + \tan^{-1} \left( \frac{L}{R \cos \gamma \cos \alpha} \right) \right] +$$

$$\sin \alpha_1 \sin \left[ \zeta + \tan^{-1} \left( \frac{L}{R \cos \gamma \cos \alpha} \right) \right] + \sin \gamma \sin (\phi + \lambda) =$$

$$\cos \left[ \alpha - \zeta - \tan^{-1} \left( \frac{L}{R \cos y \cos \alpha} \right) \right] +$$

$$1/2 \cos [(\gamma - \phi - \lambda) - \cos (\gamma + \phi + \lambda)]$$

Referring in particular to FIG. 37, the combined ground-based vertical and horizontal system comprises a well known radar dish 825 and indicator 826 which is shown for obtaining range R. The radar dish 825 is mounted upon gimbals 827 which rotate about a vertical axis and gimbals 828 which rotate about a horizontal axis. The axis of the vertical gimbals carries a potentiometer arm 829 which makes contact with a linearly wound potentiometer 830 energized by a source of constant voltage 831. The arm 829 is actuated by the vertical gimbal to provide a signal proportional to the azimuth angle $\alpha$ of FIG. 36. This signal is fed to a conventional series of servo components to generate the sine and cosine of the angle $\alpha$. These components comprise a conventional amplifier 832, a position servo 833 and a pair of non-linear potentiometers 834 and 835, wound, respectively according to the sine and cosine laws. Arms 836 and 837, respectively, of the potentiometers are located on the same axis, so that the sines and cosines are obtained with the help of one position servo.

The horizontal gimbal 828 actuates potentiometer arm 838 which slides along a linearly-wound potentiometer 840 which is connected to the vertical gimbal 827 and rotates with it. The vertical potentiometer is energized by the power supply 831 and the arm 838 provides a signal proportional to the angle of elevation $\gamma$ of FIG. 36. The signal $\gamma$ is fed to a function generator which generates the sine and the cosine of that angle and comprises an amplifier, 841 position servo 842 and potentiometer arms 843 and 844 of the non-linear potentiometers 845 and 846, respectively, to generate sine $\gamma$ and cosine $\gamma$ in the same manner as the functions sine $\alpha$ and cosine $\alpha$ were generated. For brevity, in both function generating components, the well known error sensing element, feedback circuit and comparison elements are omitted. By the same token, the remaining function generator of FIG. 37, to be described, do not shown this well known error sensing circuitry.

Referring again to FIG. 37, a signal proportional to the sine $\gamma$ is supplied to a well known multiplier 847, which multiplies this signal by the range R obtained from indicator 826. The product is the height $h_1$ shown in FIG. 36. This value $h_1$ is applied to a subtractor 848 of FIG. 38 as the minuend, the subtrahend $h_0$, being the height of the point of destination T of FIG. 36, above the plane *xoy*. This latter value $h_0$ is manually introduced by a linear potentiometer, not shown, and positioned by the manual handcrank 849. For convenience, linear potentiometers for the hand inputs 886 and 906 of FIG. 37 and 849, 880 and 917 of FIG. 38 are not shown. For graphical simplicity the height $h_0$ is shown to be equal to zero in FIG. 36. Thus, $h_0$ can be set to any value since the above derivation is based upon the equation $$h = h_1 - h_0 = R \sin \gamma - h_0$$

which is true for any value of $h_0$. The difference obtained from the element 848 represents one of the inputs to the vertical path computer 850 of FIG. 39 located on the ground. This input is applied to terminal 867. This computer 850 can be any of the previously described embodiments of the vertical program computer. However, in FIG. 39 a special and simplified form is presented.

A horizontal path program computer 860 can be any of the previous embodiments of the horizontal program computers capable of generating the angle of motion $\zeta$. This computer 860 requires as inputs the angle $\theta_R$ at terminal 861, and the parameter K at terminal 862 in order to provide the angle of motion zeta, defined previously, at terminal 863 for transmission by a standard communication link, for guidance of the craft in the horizontal direction. The manner in which the inputs $\theta_R$ and K are obtained will be described in detail in a manner similar to that given with respect to the inputs to the vertical program computer 850. The computer 850 operates on these inputs to provide the angle of approach $\lambda$ in the vertical direction, which signal appears at terminal 864 of computer 850 and is transmitted by a conventional communication link, not shown, to the vehicle P of FIG. 36 for its guidance in the vertical direction. It should be understood when the vehicle is to be guided only in the horizontal direction, the angle $\lambda$ is made permanently equal to zero or the output of the vertical program computer can be deenergized by turning selector switch 865 to the "off" position 866.

Since the inclination of the vertical path of flight of the vehicle to the ground plane *xoy* or to a given plane is, in most cases, small, say 0 to 15°, the tangent of the inclination angle can be replaced by the sine of said angle or by the angle itself as performed in computer 850, particularly because the recomputing process is used. This process continuously corrects for any accumulated errors due to the above approximation. Thus, when the tangent of the angle of inclination is used in the vertical path computer of the angle of approach, the time left to complete the journey to the ground plane must be specifically introduced into the vertical program computer. However, when the sine of the angle of inclination is used, it is not necessary to introduce the remaining time to the target, and the angle of inclination can be obtained by dividing the height *h*, as obtained from subtractor 848 of FIG. 38, by the range *r*.

The value of *r* of FIG. 36 and the manner in which *r* is obtained will be given in the description of FIGS. 37–39. The above referred to division operation of *h* into *r* is performed in divider 870 of computer 850 in FIG. 39. The quantity *h* is applied to the divider 870 by way of terminal 867 as the dividend. The divisor *r*, is supplied by way of terminal 871, the quotient being the angle of inclination $\phi$ of the line of sight from the vehicle to the point of destination. The quotient is multiplied by a constant $n_2$, the value of which exceeds unity. As previously described, the general shape of the curve of vertical approach depends upon the value of the constant $n_2$, which as noted, when approaching unity, approaches a straight line from the instantaneous position of the vehicle to the point of destination. For values greater than unity, the angle of approach $\lambda$ is relatively large at the start of the travel, and approaches the final angle $\phi_0$ at the end of the travel.

The final angle of approach $\phi_0$ is introduced by way of manual input 894 driving a linear potentiometer not shown. This potentiometer can be similar to potentiometer 882 and is applied to the vertical computer 850 by way of terminal 868. Also connected to terminal 868 is a multiplier 873, which multiplies $\phi_0$ by the constant $(n_2-1)$ to determine the second term of the equation for the vertical angle of approach λ which is equal to $\phi n_2\phi+(n_2-1)\phi_0$, as derived in the theory for the vertical computer. The output of multiplier 873 is therefore $(n_2-1)\phi_0$. This is added to $n_2\phi$ in adder 874 to provide the quantity λ, which appears at terminal 864.

Referring again to FIG. 37, the inputs $\theta_R$ and $k$ at terminals 861 and 862, respectively, of the horizontal computer 860 will be obtained in the following manner.

The antenna 825 of FIG. 37 as noted, provides the range R from the radar to the vehicle shown in FIG. 36. This range is used to determine the velocity of the vehicle by applying the range to a well-known differentiating circuit 875 in which the range is differentiated in respect to real time, to obtain the time derivative $\dot{R}$, which, in turn, is fed to a selector switch 876.

It should be understood the time derivative of range can be obtained directly from a Doppler radar, not shown, located at point $o$ in FIG. 36, and which can be applied to the system by way of terminal 877 and selector switch 876. A third way to obtain velocity of the vehicle is by means of a tri-Doppler system located on the ground and which supplies the velocity $v$ by way of terminal 878 and selector switch 879.

The derivative $\dot{R}$ is applied to a divider 885 of FIG. 37 as the dividend, while the cosine of the angle $\theta_1$, shown in FIG. 36 as being the angle between the radius vector OP and the velocity vector $v$, is applied to the divider 885 as the divisor, to obtain an output which is the velocity of the vehicle $v$. As noted, this velocity of the vehicle is an input which must be made available to the ground based horizontal computer of the present embodiment.

The manner of obtaining the value cos $\theta_1$ is explained below. The velocity $v$, as obtained from the divider 885, is applied to selector switch 879. The purpose of this switch is to apply to the system the velocity of the craft from a selected one of four possible sources. The first source consists of the radar 825 which is used to drive the divider 885 with range information; the second source is a Doppler radar, not shown, connected to terminal 877 and which supplies the time derivative of range $\dot{R}$, to the divider 885, to obtain the velocity $v$. The third source of velocity information can be, as noted, from a ground-based tri-Doppler system, not shown, which supplies velocity information by way of terminal 878. The fourth source of velocity information is obtained from the hand input 880. The last three sources of velocity information are selected by switch 879, while the time derivative or range $\dot{R}$ is obtained from two sources, above referred to, by way of selector switch 876. In this manner, the system is adapted to obtain the velocity of the vehicle either through a conventional radar, a Doppler radar, a tri-Doppler ground based system, or, when the velocity of the vehicle is known and is constant, a hand input 880 can be used. This input can consist of a manually-set linear potentiometer, not shown, and similar to potentiometer 882 shown in FIG. 39.

In multiplier 881 of FIG. 39, the velocity $v$ is multiplied by the angle of approach λ as obtained from terminal 864 to provide an output signal $\dot{h}$ proportional to the required velocity of approach of the vehicle to the plane $xoy$ of FIG. 36. Selector switch 865 selects as the output of the vertical path computer either the required angle of approach λ or the required velocity of approach $\dot{h}$. These signals constitute the orders and are transmitted by a conventional communications link, now shown to the vehicle at P in FIG. 36.

Referring again to FIG. 37, the range R, is supplied to a multiplier 883 in which this range is multiplied by the cosine of the angle of elevation of the radar beam $\gamma$, shown at point $o$ in FIG. 36. This cosine is obtained from the arm 844 of $\theta$ cosine potentiometer 846. The output of multiplier 883 is the quantity R cos $\gamma$. This quantity is supplied to multiplier 884 in which the latter value is multiplied by sine $\alpha$,, the sine of the azimuth angle of the radar beam originating from point $o$ in FIG. 36. This latter value is obtained from arm 836 of the sine potentiometer 834. The output of 884 is R cos $\gamma$ sin $\alpha$. This output is fed to subtractor 962 in which it is subtracted from the distance L, shown in FIG. 36. As seen, L is the known distance between the location of the radar and the point of destination T or its projection on the plane $xoy$. Thus, L constitutes a known distance or input which is supplied to the system by a potentiometer driven by a hand input shown at 886 and similar to input 882. The distance L is the linear distance from the radar location at point $o$ and the point of destination T or its projection on the plane $xoy$ for the vehicle. This point T, as noted, can be located either on the plane $xoy$, or at a known altitude $h_0$ above the plane $xoy$ which constitutes a further input quantity. The output of subtractor 962 is applied to a squaring function generator 887 comprising a well known potentiometer wound according to the square law and feedback loop, not shown. The output of squaring potentiometer 887 is $(L-R\cos\gamma\sin\alpha)^2$, which appears in the equation for the range $r$ in the above theory of the land-based computer system. This latter value is applied to an adder 888 in which it is added to the quantity $(R\cos\gamma\cos\alpha)^2$, obtained in the following manner. The output of multiplier 883 is applied to a multiplier 889 in which it is multiplied by the value cosine $\alpha$ obtained from arm 837 of cosine potentiometer 835. The output of multiplier 889 is fed to a squaring function generator 890, the output of which is the expression referred to above. The output of adder 888 is the square of the range $r$ of FIG. 36, which is the distance in the plane $xoy$ between the foot of the perpendicular P, $P^1$ and the point of destination T. This latter value, $r^2$, is fed to a square root function generator which comprises an amplifier 892 which drives a position servo 893 and a nonlinear potentiometer 891 wound according to the square root law. The output of this potentiometer is the range $r$, which is supplied as an input to terminal 871 of vertical computer 850 of FIG. 39.

Thus, the inputs $h$, $\phi_0$ and $r$ have been obtained and fed to the vertical path computer 850 for generation of the angle of approach λ of the vehicle or the velocity of approach $\dot{h}$, as selected by switch 865 depending upon the guidance equipment available aboard the craft. The value $\dot{h}$ is generally fed to an auto pilot, while the angle of descent λ is fed to either an auto pilot or cross-hair indicator in the craft.

Referring again to FIG. 39, the inputs to the horizontal computer 860 are obtained in the following manner. The output of multiplier 889 of FIG. 37 is applied to a divider 900 as the dividend. The divisor is obtained from subtractor 885. The output of the divider 900 is thus the quantity R cos $\gamma$ cos $\alpha$ divided by $L-R\cos\gamma\sin\alpha)$. This value is fed to a well-known function generator shown in FIG. 38, consisting of an amplifier 901, position servo 902, nonlinear potentiometer 903 wound according to the inverse tangent law and pick-off arm 904 which extracts a voltage proportional to the angle, the tangent of which is the aforementioned input quantity. The output of potentiometer 903 is fed to an adder 905 for the addition of this quantity to the angle $\theta_T$ shown in FIG. 36*b*, which is the angle between the direction North and the direction of the required motion at the point of destination T. The angle $\theta_T$ is applied to the input system of the present embodiment by means of manual input 906 of FIG. 37. This input can be a linear potentiometer similar to potentiometer 882 except that the dial scale, not shown, is graduated in terms of the angle $\theta_T$ rather than in terms of $\alpha$. The calibration of the output voltage of adder 905 is selected so that when both inputs to the adder 905 are zero, the output corresponds to the angle $3\pi/2$. Thus, the constant $3\pi/2$ is added to the sum of the two input signals. The reason for the addition of this constant is required by the geometry of FIG. 36 as seen in the first three equations appearing in the derivation of the theory of the ground-based computer in connection with FIG. 36. Consequently, the output of the adder 905 is the quantity $$\theta_R-\alpha_1+\frac{3\pi}{2}$$

as is clear from the above discussion. This value is applied to adder 907 in which it is added to the angle $$\alpha_1-\frac{3\pi}{2}$$

This angle, as shown in FIG. 36, is the angle between the direction North and the direction from the radar at point $o$ and the point of destination T. This angle $\alpha_1$ is applied to the input system for the vertical and horizontal computer by way of a linear input potentiometer 882, the arm of which is positioned by handcrank 932. The zero of the scale of this potentiometer is offset by the angle $-3\pi/2$ so that when the angle $\alpha_1$ is equal to $3\pi/2$, the output of the potentiometer is zero. This means that when the angle $\alpha_1$ is $3\pi/2$, the pickup arm 908 is at grounded contact 909. The output of the adder 907 of FIG. 38 is the angle $\theta_R$, which is fed to the horizontal computer 860 at terminal 861 of FIG. 39.

The second input to the horizontal path computer 860 is the parameter K. This value is obtained from a divider 915 which divides the length of the path of motion $s$ by the range $r$ obtained by potentiometer 891 of FIG. 37. The length of path $s$ is obtained from selector switch 916 which selects the value $s$ from two alternate input sources which will now be described. The first manner of obtaining $s$ is by means of an input potentiometer 917 of FIG. 38 which introduces into the system the total programmed duration of travel $T_0$. At the same time, a timing device 918 producing a voltage proportional to the elapsed time of motion $t_1$ is actuated to determine the time elapsed from the start of travel toward the point of destination. The timing signal from the clock 918 together with the output potentiometer 917 is fed to a subtractor 919 which subtracts the value $t_1$ from the value $T_0$ to obtain the time remaining for the completion of the program $t$. The output of potentiometer 919 is applied to a multiplier 920 in which the remaining travel time $t$ is multiplied by the velocity of the vehicle $v$. This latter value is obtained from the selector switch 879.

The output of multiplier 920 is the length of path traveled $s$ in the case in which the velocity is substantially constant. In the instance in which the velocity varies substantially, say 20 percent, from the preset value introduced into the system at hand input 880, the length of travel $s$ is obtained from an integrator 921. This integrator can be any well-known type such as ball and disc, ball and cone or, preferably, an electrical circuit such as a capacitor integrating circuit. The integrator determines the integral of $v.dt$ between the limits of $T_0$ and $T_0-t_1$ which are provided by the input 917 and the clock 918, as shown by the corresponding equation in the theory. The velocity $v$ is, in this case, a function of time and is obtained from selector switch 879. The value of the length of travel path $s$ is obtained by subtracting in subtractor 931 the output of integrator 921 from the total initial distance to the destination point along the path of travel $s_0$. This distance $s_0$ is obtained at input 933. The length of path $s$ can be obtained directly from a computer, not shown, at terminal 934. This input $s$ is applied to selector switch 916. In certain applications, distance along the path of travel may be preset, rather than velocity and time, into the guidance system. This arrangement may be desirable when the velocity must be lowered for particular landing conditions. The time or fourth input is not preset with this arrangement and the value of $s$ is obtained from terminals 960 or 961 of switch 916 depending upon whether $s$ is obtained from input 933 or terminal 934, as discussed above. This completes the description of the generation of the inputs K and $\theta_R$ to the horizontal path computer.

It should be understood that the horizontal path computer 860 of FIG. 39 can be any of the previously described embodiments which generate the required angle of motion $\zeta$ with respect to the line of sight P'T of FIG. 36.

Referring again to FIG. 37, the generation of the previously referred to angle $\theta_1$, which is the angle between a line representing the velocity vector $v$ and the radius vector OP in FIG. 36, will now be described. For this purpose the angle of motion of the vehicle $\zeta$, as obtained from terminal 863 of FIG. 39, is fed back by way of line 922 to a subtractor 923 of FIG. 38 as the subtrahend. The minuend input to the subtractor is the angle $\alpha$, previously referred to and obtained from the potentiometer 829 of FIG. 37. The difference between these inputs is fed to a subtractor 924 of FIG. 38 as the subtrahend. The minuend value applied to the subtractor is obtained from arm 925 of nonlinear potentiometer 926, wound according to the inverse tangent law. This arm is driven by position servo 927 in response to a signal amplified by amplifier 928. This latter signal, thus to be amplified is obtained from the divider 929 of FIG. 38. The dividend applied to the divider 929 is a signal proportional to length L between the position $o$ of the radar and the point of destination T. This signal is introduced to the system by way of input 886. The dividend applied to the divider 929 is the output of multiplier 889, that is, a signal proportional to the product R cos $\gamma$ cos $\alpha$.

The output of divider 929 represents the quantity L divided by R cos $\gamma$ cos $\alpha$. This output is applied to a function generator consisting of the amplifier 928, position servo 927 and $n$ nonlinear potentiometer 926 wound according to the inverse tangent law. The output of arm 925 of potentiometer 926 is applied to the subtractor 924 as the subtrahend, the minuend being the quantity $\alpha-\zeta$ which is obtained from subtractor 923. The difference which is the output of subtractor 924 is applied to a function generator which generates the cosine of the angle obtained from subtractor 924. This function generator comprises an amplifier 925, position servo 936, nonlinear potentiometer 937 wound according to the cosine law and a pick-off arm 938 which extracts a voltage proportional to the first term of the expression for the cosine of the angle $\theta_1$ appearing in the final equation of the theory given in connection with FIG. 36.

The second term of the expression for cosine $\theta_1$, as seen from the exposition of the theory, is obtained in the following manner: The required angle of approach, $\lambda$, as obtained from terminal 864 of the vertical path computer 850 of FIG. 39, is taken by way of a feedback line 939 to an adder 940. The required angle of approach $\lambda$ is added to the angle of depression $\phi$ which is obtained from the divider 941 of FIG. 38. In this divider, the height of the vehicle above the intended point of destination, $h$, as obtained from subtractor 848, is divided by the range $r$, as obtained from nonlinear potentiometer 891 of FIG. 37. Thus, the output of the adder 940 of FIG. 39 is $\phi+\lambda$.

The output $\phi+\lambda$ is added to the angle of elevation of the radar beam $\gamma$, as obtained from arm 838 of potentiometer 840 of FIG. 37. For this addition, an adder 942 is provided, the output of which is therefore, the angle $\gamma+\phi+\lambda$. At the same time, the output of adder 940 is fed to a subtractor 943 as the minuend, the subtrahend being the aforementioned angle $\gamma$. Consequently, the output of subtractor 943 is the angle $\gamma-\phi-\lambda$. The output of adder 942 is led to a cosine function generator comprising an amplifier 944, a position servo 945 and a nonlinear potentiometer 946 wound according to the cosine law. Consequently, the arm 947 of the potentiometer 946 extracts a voltage proportional to cosine $(\gamma+\phi+\lambda)$. This voltage is applied to an adder 948 as the first addend of the sum used in determining the value of cosine $\theta_1$, the second addend of such sum being obtained as follows:

The output of subtractor 943 is supplied to a cosine function generator comprising an amplifier 949, position servo 950, and a nonlinear potentiometer 951 wound according to the cosine law. The potentiometers 946 and 951 are energized by a common source of potential 956. Thus, the pick-up arm 952 extracts a voltage proportional to cosine $(\gamma-\phi-\lambda)$. This value is applied to the adder 948 as the second addend. The sum or output of adder 948 is supplied to a multiplier 953 in which the sum is multiplied by one-half. This multiplier, it should be understood, can be a voltage divider or merely a reinterpretation of the scale of the voltages. The output of multiplier 953 is fed to an adder 954 which adds the output of multiplier 953 to the output of the nonlinear potentiometer 937 of FIG. 38. The output of the adder is, thus, cosine $\theta_1$. The latter value is fed back to divider 855 of FIG. 37 as the divisor, the dividend $\dddot{R}$ being obtained from selector switch 876 to obtain the velocity $v$ of the vehicle. This velocity $v$ is supplied to multiplier 881 in which it is multiplied by the required angle of descent $\lambda$ obtained at terminal 864 of the vertical computer 850. The output of multiplier 881 is thus this required velocity of descent $\bar{h}$ which is supplied to selector switch 865. In this manner, the calculated velocity of the vehicle $v$ is applied to selector switch 879 of FIG. 38. As noted, selector switch 879 selects any one of three values of $v$ for further processing as described above. The vertical and horizontal computers 850 and 860 utilize this velocity value $v$ in obtaining the required orders for the guidance of the vehicle. The final outputs of the system are shown in FIG. 39, the angle of flight $\zeta$ obtained at terminal 863 of FIG. 39, and the required velocity of descent at terminal 865 of the same figure. Three separate velocity inputs for the value $s$ are available at switch 879 of FIG. 38, two separate inputs for the value $s$ are available at selector switch 916 of FIG. 38, and two inputs for the angle $\phi$ are available at selector switch 955 of FIG. 39. In this manner, the reliability and versatility of the system is increased by redundancy of inputs. The present embodiment thus provides the required inputs for the ground-based vertical 850 and horizontal 860 computers of the guidance system.

This completes the description of the embodiments of the invention illustrated herein. However, many modifications and advantages thereof will be apparent to persons skilled in the art without departing from the spirit and scope of this invention. Accordingly, it is desired that this invention not be limited to the particular details of the embodiments disclosed herein, except as defined by the appended claims.

What is claimed is:

1. In combination, means for generating a signal representing a function including a plurality of adjustable parameters at least equal to the number of conditions imposed upon the path of travel of an object, adjustable means for producing signals representing said parameters, said adjustable means including means for controlling the intended time of arrival of said object, and means for generating from said signal representing said function a signal for guiding said object along a path of travel defined by said signal.

2. A guidance system for a moving vehicle comprising means for generating a signal representing the value of a function of the coordinates of the path of travel of said vehicle, means for feeding into said signal generating means a plurality of signals representing parameters at least equal to the number of conditions imposed upon said path of travel of said vehicle, measuring means for for producing said plurality of signals representing said parameters, latter said means including adjustable means for imposing upon said system information to control the intended time of arrival of said vehicle, and means fed by said signal generating means for continuously providing signal representing the values of said parameters in terms of the coordinates of the present position of the vehicle and said imposed conditions, and means for generating from said signal representing said function, control signals for guiding said vehicle along a path of travel defined by said signals.

3. A device for defining the path of travel of a vehicle in a coordinate system by a signal continuously varying as a function of said coordinates comprising, means for applying to the source of said signal signals representing a number of adjustable parameters at least equal to the number of conditions imposed upon said path of travel of said vehicle, adjustable means for producing signals continuously modifying said parameters, said adjustable means including means for imposing upon said device information to control the intended time of arrival of said vehicle, means for continuously obtaining the values of said adjustable parameters in terms of the coordinates of the present position of said vehicle and said imposed conditions, and means for generating from said signals representing said function a signal for guiding said vehicle in a predetermined plane and a signal for guiding said vehicle in a plane normal to said latter plane.

4. In combination, measuring means for generating a first signal respectively proportional to the distance between the instantaneous position of a vehicle and a fixed target, at a preset normal distance from a predetermined plane and a predetermined point of destination, adjustable means for generating a second signal proportional to the angles between lines connecting said latter-recited vehicle and target and said recited plane, and function-generating means fed by said signals to provide first and second control signals, the first of said signals representing the direction of motion of said vehicle in a direction parallel to said predetermined plane and a second signal for guiding said vehicle in a plane perpendicular to said predetermined plane, means for feeding into said function generating means a third signal equal to the predetermined time to arrival of said vehicle and a fourth signal representing the angle of arrival at the point of destination of said vehicle.

5. A guidance system for a moving vehicle comprising means for generating signals proportional to predetermined functions of the coordinates of the path of travel of said vehicle, means for feeding into said signal generating means signals representing a plurality of parameters exceeding the number of conditions imposed upon said path of travel of said vehicle, adjustable means for producing a plurality of signals each of which represents one of said parameters, said latter means including means for imposing upon said system information to control the intended time of arrival of said vehicle, and means for continuously determining from said latter signals the values of the parameters the number of which equals the number of imposed conditions in terms of the coordinates of the present position of the vehicle and said imposed conditions, means for generating from said values signals for guiding said vehicle along a path of travel defined by said values, and adjustable means fed by the parameters in excess of the number of imposed conditions to change the shape of said path of travel.

6. A system for controlling the motion of a vehicle by controlling the curvature of the path of motion of said vehicle comprising means for providing a first signal proportional to the length the path to be traversed by said vehicle, means for measuring the distance from said vehicle to a preset point of destination of said vehicle to provide a second signal, means for dividing said first by said second signal to obtain a third signal, means for providing a fourth signal representing the angle between the line of sight from said vehicle to said point of destination and the desired direction of motion of said vehicle at said point of destination, and means for combining said third and fourth signals to provide an output signal proportional to the required curvature of the path of motion at any instant of time during the time of motion of said vehicle.

7. A system for controlling the motion of a vehicle comprising measuring means for generating a signal proportional to the angle between a plane on which said vehicle is to land and the line of sight from said vehicle to the point on said plane at which said vehicle is required to alight, means for imposing upon said system information to control the intended time of arrival of said vehicle, means for generating a signal proportional to the normal distance between said vehicle and said plane, function generating means fed by said latter signals for generating a signal proportional to the slant range from said vehicle to the point where said vehicle is to alight, and means for providing a signal proportional to the angle at which said vehicle is required to alight, and means for combining said recited signals to provide a control signal which represents the required angle of approach of said vehicle to said plane.

8. A guidance system for a moving vehicle comprising measuring means for generating a signal the value of which is proportional to the distance of said vehicle to a fixed point, means for generating a signal the value of which varies proportionately to the angle of elevation of the line of sight from said point to said vehicle, and means for generating a signal whose value varies proportionately to the azimuth of the line of sight from said point to said vehicle, timing means for generating a signal proportional to the desired duration of travel of said vehicle from the position of said vehicle to a preset point of destination, means for measuring the angle between the desired direction of motion at said point of destination and the projection upon a predetermined plane of the line of sight from said vehicle to said point of destination to provide a further signal, means for generating a signal proportional to the normal distance between said vehicle and the above predetermined plane, means for generating a signal proportional to the angle of inclination to said plane of the path of said vehicle at the point of destination, measuring means for generating a signal proportional to the distance between the projection of the location of the vehicle upon said predetermined plane and the projection of the point of destination upon said predetermined plane, means for generating a signal proportional to the angle between a predetermined direction and the line of sight between the location of the vehicle and said projection of the point of destination upon said plane, and function generating means fed by each of said signals to generate output signals for controlling the motion of said vehicle in directions, respectively, parallel and perpendicular to said predetermined plane.

9. A system for generating a signal proportional to the required inclination of the path of motion of a vehicle at any instant of time so as to guide said vehicle to reach a given destination point in space in a given time, at a given inclination in relation to a given plane in space, and at a preset normal distance from said plane, comprising measuring means for generating a first signal proportional to the normal distance between the instantaneous position of the vehicle and said plane in space, measuring means for generating a second signal proportional to the required normal distance at the point of destination of said vehicle from said plane, means for providing a third signal proportional to the time remaining to reach said point of destination from the instantaneous position of the vehicle, means for providing a fourth signal proportional to the velocity of motion of said vehicle, function generating means fed by latter four recited signals to provide a first output signal proportional to the inclination of the line of sight from the instantaneous position of the vehicle to the point of destination with respect to said fixed plane, and means fed by said first output signal to generate an output proportional to the inclination of the path of said vehicle with respect to said predetermined plane.

10. In combination, means for generating a first signal proportional to the angle between the line of sight from the instantaneous position of a vehicle to a preset point of destination, means for generating a second signal proportional to the instantaneous distance from the vehicle to the point of destination, means for providing a third signal proportional to the velocity of motion of said vehicle, means for providing a fourth signal proportional to the time remaining to reach said point of destination, means for providing a fifth signal proportional to the maximum curvature of the path of motion of said vehicle, means for providing a sixth signal proportional to the time left to reach said point of destination, means fed by each of said signals for deriving an output signal, and means for multiplying said fifth signal by the cosine of said latter-recited output signal to obtain a second output signal proportional to the required curvature of flight path at any particular instant of time.

11. A guidance system comprising means for determining the length of travel to reach a preset point of destination to provide a first signal, means for measuring the direction of the line of sight from the instantaneous position of said vehicle to the said point of destination with respect to a specified direction in said vehicle to provide a second signal, means for measuring the angle between said axis of the vehicle and the preset direction of motion of said vehicle at said point of destination to provide a third signal, means for combining said second and third signals to provide a fourth signal equal to the angle between the required direction of motion at the point of destination and said line of sight, means for generating a fifth signal proportional to the instantaneous distance from the vehicle to the point of destination, and function generating means for combining said first, fourth and fifth signals to provide a control signal, and second function generating means fed by said control signal to provide continuously the required direction of motion of said vehicle at any instant of time with respect to said line of sight.

12. In combination, means for generating a first signal proportional to the angle between the line of sight from the instantaneous position of a vehicle to a preset point of destination and the required direction of motion of said vehicle at said point of destination, means for generating a second signal proportional to the instantaneous distance from the vehicle to the point of destination, means for providing a third signal proportional to the distance remaining along said path of motion of said vehicle, means for providing a fourth signal proportional to the maximum curvature of the path of motion of said vehicle, means fed by each of said signals for deriving an output signal, and means for multiplying said fourth signal by the value of a function of said latter-recited output signal, the absolute value of which does not exceed unity, to obtain a second output signal proportional to the required curvature of flight path at any particular instant of time, which curvature, thus, does not exceed the maximum permissible value.

13. In combination, means for generating a first signal proportional to the angle between the line of sight from the instantaneous position of a vehicle to a preset point of destination and the required direction of motion of said vehicle at said point of destination, means for generating a second signal proportional to the instantaneous distance from the vehicle to the point of destination, means for providing a third signal proportional to the velocity of motion of said vehicle, means for providing a fourth signal proportional to the maximum preset curvature of the path of motion of said vehicle consistent with maneuverability characteristics of said vehicle, means fed by each of said signals for deriving an output signal proportional to a predetermined combination of said signals, and means for multiplying said fourth signal by the value of a function of said latter-recited output signal, the absolute value of which is less than unity, thereby to obtain a second output signal proportional to the required curvature of flight path at any particular instant of time.

14. A guidance system for generating a signal proportional to the inclination of the path of motion of a vehicle with respect to a predetermined plane comprising means for providing a signal whose value varies proportionately to the normal distance from said recited plane to said vehicle, means for providing a second signal the value of which varies proportionately to the duration of travel remaining to reach the point of destination at a preset time of arrival, means for imposing upon said system information to control the intended time of arrival of said signal, means for feeding said first and second signals into function generating means combining said signals corresponding to said position and velocity to generate a signal proportional to the inclination of the line of sight of said vehicle to a predetermined point in space at a preset normal distance from said plane to provide a first output signal, wherein the locus of said predetermined point is, by definition, a function of position and velocity, means for measuring the distance from said vehicle to the recited point of destination to provide a third signal, second function generating means operating on said third signal to provide a second output signal, means for multiplying said first output signal by the second output signal to provide a third output signal, means for subtracting a preset function of the preset inclination of said vehicle at said preset point of destination to said plane from said third output signal to provide a fourth output signal, proportional to the inclination of the path of said vehicle with respect to said predetermined plane.

15. A system for controlling the motion of a vehicle so that vehicle reaches a preset point of destination at a preset instant of time and is moving upon reaching said point of destination in a preset direction by controlling the curvature of path of said vehicle comprising means for providing a first signal proportional to the length of the path of travel to be traversed by said vehicle, means for providing a second signal, the value of which varies proportionately to the distance from said vehicle to a preset point of destination of said vehicle, means for dividing the first signal by the second signal to obtain a third signal, means for providing a fourth signal proportional to the angle between the line of sight from said vehicle to said point of destination and a preset direction of motion of said vehicle at the point of destination, means for providing a fifth signal proportional to the length of path remaining to be traversed at any instant of the time during the motion of said vehicle, and function generating means fed by said signals providing a signal proportional to the required curvature of path, said function generating means including adjustable means for producing a number of signals representing a plurality of parameters, the number of said parameters being at least equal to the number of conditions imposed upon the path of said vehicle.

16. A guidance system for a moving vehicle which system at any instant of time provides the angle between the required direction of motion of the vehicle and a line of sight from the vehicle to the point of destination so that said vehicle reaches the point of destination at a preset time and is moving upon reaching said point of destination in a prescribed direction, comprising means for measuring the distance from the instantaneous position of said vehicle to said point of destination to provide a first signal, means for determining the time required to reach said point of destination to provide a second signal, means for measuring the angle between the axis of said vehicle and the line of sight from the instantaneous position of said vehicle to the said point of destination to provide a third signal, means for measuring the angle between the axis of said vehicle and the required direction of motion of said vehicle at said point of destination to provide a fourth signal, means for combining said third and fourth signals to provide a fifth signal proportional to the angle between the line of sight from the instantaneous position of said vehicle to the said point of destination and the required direction of motion at said point of destination, and means for providing a sixth signal proportional to the velocity of motion of said vehicle, means for multiplying the second by the sixth of said signals to obtain a seventh signal, means for dividing the value of said seventh signal by the first signal to obtain an eighth signal, means for linearly combining the eighth and fifth signals to obtain a ninth signal, and function generating means fed by said ninth signal to provide the required direction of flight.

17. A system for producing an output signal which varies in accordance with the direction of flight and instantaneous position of a vehicle comprising means for producing by a recomputing procedure a guidance signal derived from the combination of a first input signal with a predetermined function of a second input signal, means for imposing upon said system information to control the instant of arrival of said vehicle, said input signals derived from means for providing the position and direction of motion of said vehicle and the imposed instant of arrival with respect to a fixed target and means for combining in a linear manner the first input signal with said second input signal, to obtain a third signal, and function generating means fed by said third signal to provide said output signal.

18. A guidance system for a moving vehicle which system at any instant of time provides the angle between the required direction of motion of the vehicle and a line of sight from the vehicle to the point of destination so that said vehicle reaches the point of destination at a preset time and is moving upon reaching said point of destination in a prescribed direction, comprising distance measuring means for providing a first signal whose electrical quantity varies proportionately to the distance along the path of travel required to reach said point of destination, means for measuring the angle between the line of sight from the instantaneous position of said vehicle to the said point of destination and a reference axis in said vehicle to provide a second signal, means for measuring the required direction of motion of said vehicle at said point of destination with respect to said reference axis to provide a third signal, means for combining said second and third signals to provide a fourth signal equal to the angle between the line of sight from the instantaneous position of said vehicle to the said point of destination and the required direction of motion of said vehicle at said point of destination, means for generating a fifth signal proportional to the instantaneous distance from the vehicle to the point of destination, means for providing a sixth signal proportional to the velocity of motion of said vehicle, and function generating means fed by said first, fourth, fifth, and sixth signals for deriving a control signal to control the motion of the craft with respect to the angle between the required direction of motion and said line of sight.

19. A guidance system for a moving vehicle which at any instant of time provides the angle between the required direction of motion of the vehicle and a line of sight from said vehicle to a point of destination so that said vehicle reaches the point of destination at a preset instant of time and is moving upon reaching said point of destination in a prescribed direction, comprising means for providing an input signal which varies proportionately to the time required to reach said point of destination, means for measuring the angle between the line of sight from the instantaneous position of said vehicle to said point of destination and the required direction of motion of said vehicle at said point of destination to provide a further signal, means for generating a signal proportional to the instantaneous distance from the vehicle to the point of destination, means for providing an input signal proportional to the velocity of motion of said vehicle, and function generating means combining each of said signals in a manner to provide a control signal proportional to the angle between the required direction of motion at said instant of time and said line of sight.

20. In combination, timing means for determining the time required for a vehicle to reach a preset point of destination to provide a first signal, means for measuring the angle between the line of sight from the instantaneous position of said vehicle to the said point of destination and a reference axis in said vehicle to provide a second signal, means for measuring the required direction of motion of said vehicle at said point of destination to provide a third signal, means for combining said second and third signals to provide a fourth signal equal to the angle between the line of sight from the instantaneous position of said vehicle to the said points of destination and the required direction of motion at said vehicle at said point of destination, means for generating a fifth signal proportional to said instantaneous distance from the vehicle and the point of destination, means for providing a sixth signal proportional to the velocity of motion of said vehicle, means for combining said first, fourth, fifth and sixth signals to provide a single signal, and function generating means fed by said single signal for deriving from said single signal and output signal indicating the instantaneous direction of motion of said vehicle.

21. In a guidance system, a function generator for obtaining the angle between the direction of the required motion of a vehicle and the line of sight from the instantaneous position of said vehicle to the point of intended destination of said vehicle comprising function generating means for obtaining an output signal equal to the value of a specific function, means for introducing into said function generating means a signal representing the ratio of the length of path of said moving vehicle to the distance to the point of intended destination, and further means for measuring the angle between the instantaneous direction of the motion of said vehicle and the intended direction of motion at the point of destination, and function generating means fed by the output of latter said means for obtaining a control signal proportional to the value of the angle of motion thereby providing said vehicle with the required guidance information.

22. A guidance system comprising means for providing a first signal which varies proportionately to a preset length of travel to reach a preset point of destination, means for measuring the angle between the line of sight from the instantaneous position of said vehicle to the said point of destination and the required direction of motion of said vehicle at said point of destination to provide a second signal, means for generating a third signal proportional to the instantaneous distance from the vehicle to the point of destination, means for combining said signals to provide a control signal which varies continuously as the required curvature of path of motion of said vehicle at any instant of time.

23. A device comprising a guidance system for providing a first signal which varies proportionately to the time required for a craft to reach a preset point of destination, means for generating a second signal proportional to the angle between the line of sight from the instantaneous position of said craft to said point of destination and the required direction of motion of said craft at said point of destination, means for generating a third signal proportional to the instantaneous distance from the craft to the point of destination, means for providing a fourth signal proportional to the velocity of motion of said craft, means for combining said first to fourth signals continuously to produce an output proportional to the angle between the required direction of motion and said line of sight, and means fed by said output signal for reversing the sign of said output signal at the instant of time when the angle of motion becomes zero.

24. A guidance system for an aircraft which system at any instant of time provides the curvature of the path of motion of the aircraft such that said aircraft reaches a preset point of destination at a preset instant of time and is moving upon reaching said point of destination in a prescribed direction, comprising means for providing a first signal which varies proportionately to the time required by said aircraft to reach said point of destination, means for measuring the angle between the line of sight from the instantaneous position of said aircraft to said point of destination and the required direction of motion of said aircraft at said point of destination to provide a second signal, means for generating a third signal proportional to the instantaneous distance from the aircraft to the point of destination, means for providing a fourth signal proportional to the velocity of motion of said aircraft, and function generating means fed by each of said signals for deriving an output signal proportional to the required bank angle of said aircraft at any instant of time so as to reach said point of destination at said preset time and in said prescribed direction.

25. A guidance system for a moving vehicle which system at any instant of time provides the direction of motion of the vehicle so that said vehicle reaches a preset point of destination at a preset instant of time and is moving upon reaching said point of destination in a prescribed direction, comprising means for providing a first signal which varies proportionately to the time required to reach said point of destination, means for generating a second signal proportional to the angle between the line of sight from the instantaneous position of said vehicle to said point of destination and the required direction of motion of said vehicle at said point of destination, means for generating a third signal proportional to the instantaneous distance from the vehicle to the point of destination, means for providing a fourth signal proportional to the distance along the path of travel to the point of destination of said vehicle, function generating means fed by each of said signals comprising means for generating a function including, adjustable means for producing a number of signals representing a plurality of parameters, the number of said parameters being at least equal to the number of conditions imposed upon the path of said vehicle, means for continuously determining from said latter signals the values of said parameters in terms of the coordinates of the present position and direction of motion of said vehicle and said imposed conditions, and means for generating in response to said function generating means values of signals for guiding said vehicle along the path of travel defined by said values.

26. A system for controlling the motion of a vehicle comprising means for generating a first signal proportional to the angle between a plane on which said vehicle is to alight and the line of sight from said vehicle to the point on said plane at which said vehicle is required to alight, means for generating a second signal proportional to the normal distance between said vehicle and said plane, means for generating a third signal proportional to the slant range from said vehicle to the point where said vehicle is to alight, means for introducing into said system the angle at which said vehicle is required to alight to provide a fourth signal, and function-generating means for combining said latter four signals to provide an output signal proportional to the required angle of approach of said vehicle to said plane, means for providing a fifth signal proportional to the velocity of motion of said vehicle, and means for combining said latter signal with the signal proportional to the angle of approach of said vehicle to said aforementioned plane to provide a resulting signal proportional to the required velocity of approach of said vehicle to said plane.

27. A guidance system for a moving vehicle which at any instant of time provides the angle between the required direction of motion of the vehicle and a line of sight from said vehicle to the point of destination so that said vehicle reaches the point of destination at a preset time and is moving upon reaching said point of destination in a prescribed direction, comprising timing means for determining the time required to reach said point of destination to provide a first signal, means for measuring the angle between the line of sight from the instantaneous position of said vehicle to the said point of destination and a reference axis for said vehicle to provide a second signal, means for determining the required direction of motion of said vehicle at said point of destination to provide a third signal, means for combining said second and third signals to provide a fourth signal equal to the angle between the line of sight from the instantaneous position of said vehicle to said point of destination and the required direction of motion of said vehicle at said point of destination, means for generating a fifth signal proportional to the instantaneous distance from the vehicle and the point of destination, means for providing a sixth signal proportional to the distance along the path of travel to the intended point of destination of said vehicle, and function generating means associated with each of said first, fourth, fifth and sixth signals for deriving an output signal proportional to the angle between the required direction of motion of said vehicle and said line of sight from the instantaneous position of said vehicle to the intended point of destination.

28. A guidance system for a moving vehicle which at any time specifies the angle between the direction of motion of the vehicle and the line of sight from the vehicle to the point of destination comprising means for determining the speed of said moving vehicle with respect to a predetermined plane, a timing device for providing a first output signal corresponding to the intended duration of travel of said vehicle to reach the intended destination, means for multiplying said first output of said timing device by the speed of said vehicle to provide a second output signal proportional to the desired distance of travel of said vehicle to reach said destination at said intended time, ranging means for continuously providing a third output signal proportional to the distance from the instantaneous position of said vehicle to the point of intended destination, means for obtaining a fourth output signal proportional to the ratio of the second to third output signals, means for obtaining a fifth signal proportional to the angle between the desired direction of motion when reaching the point of destination and the direction of the line of sight, means for combining said fourth and fifth output signals and a summing device, said summing device comprising means for subtracting from said fourth output a signal proportional to unity to produce a seventh output signal, means for producing a signal proportional to the ratio of the fifth output to the constant $2\pi$ radians, thereby to produce a sixth output signal, means for generating a signal proportional to the angle between said line of sight and said predetermined plane to provide an eighth output signal, means for providing a ninth output signal proportional to a preset angle between the direction of motion at the point of destination and the predetermined plane, means for feeding said sixth, seventh, eighth and ninth output signals into function generating means, said latter means comprising means for generating from said latter recited signals a predetermined relationship between the required direction of motion of said vehicle at any point during its motion to said sixth, seventh, eighth, and ninth signals to provide a guidance signal for said vehicle.

29. A function generator for obtaining the angle between the direction of the required motion and the line of sight from the instantaneous position of a moving vehicle to the point of intended destination of said vehicle comprising means for generating a signal representing the value of a specific function of the coordinates of the present position of said vehicle, vector solver means fed by said latter signal for obtaining from said function the value of the angle of motion, means for introducing into said function a signal equal to the preset value of the ratio of the length of path to the intended point of destination to the distance between the instantaneous position of the vehicle to the point of destination and further means for introducing into said function a second signal equal to the angle between the line of sight from the instantaneous position of the vehicle to the point of destination and the required direction of motion at said point of destination, said second signal proportional to the value of the angle of motion to provide said vehicle with the required guidance.

30. A guidance system for a moving vehicle which system at any instant of time provides the angle between the required direction of motion of the vehicle and a line of sight from the vehicle to the point of destination so that said vehicle reaches the point of destination at a preset time and is moving upon reaching said point of destination in a prescribed direction comprising means for measuring the time required to reach said point of destination to provide an input signal, measuring means for generating a signal proportional to the angle between the line of sight from the instantaneous position of said vehicle to said point of destination and the required direction of motion of said vehicle at said point of destination, measuring means for generating a signal proportional to the instantaneous distance from the vehicle to the point of destination, further measuring means for providing an input signal proportional to the velocity of motion of said vehicle, and function generating means fed by each of said signals comprising a nonlinear driving mechanism operating a linear voltage divider adapted to receive said combined inputs to provide a first output signal, servo means for integrating said first output signal to provide an output signal having a root mean square value proportional to the angle between the required direction of motion and said line of sight.

31. A guidance system for a moving vehicle which system at any instant of time provides the required curvature of the path of travel such that said vehicle reaches a preset point of destination at a preset time and is moving upon reaching said point of destination in a prescribed direction, comprising measuring means for providing a first signal the value of which varies proportionately to the time required to reach said point of destination, measuring means for generating a second signal the value of which varies proportionately to the angle between the line of sight from the instantaneous position of said vehicle to the said point of destination and the required direction of motion of said vehicle at said point of destination, means for generating a third signal proportional to the instantaneous distance from the vehicle to the point of destination, means for providing a fourth signal proportional to the velocity of motion of said vehicle, function-generating means fed by each of said signals for deriving first and second intermediate output signals which are a function of the distances of the instantaneous position of the vehicle along two mutually perpendicular directions from said point of destination, measuring means for producing a fifth signal proportional to the maximum allowable curvature of path of the vehicle, and means for adding said intermediate output signals together to produce the required curvature of path which curvature does not exceed a value corresponding to said fifth signal.

32. A system for controlling the motion of a vehicle comprising measuring means for generating a first signal proportional to the angle between a plane on which said vehicle is to land and the line of sight from said vehicle to the point on said plane at which said vehicle is required to alight, measuring means for generating a second signal proportional to the normal distance between said vehicle and said plane, measuring means for generating a third signal proportional to the slant range from said vehicle to the point where said vehicle is to alight, and means for providing a fourth signal proportional to the angle at which said vehicle is required to alight, function-generating means fed by said signals for combining all of said signals to provide an output signal proportional to the required angle of approach of said vehicle to said plane, said latter means including means for multiplying the tangent of the angle represented by said first signal by a constant value exceeding unity to provide a first product, means for subtracting from said first product a second product comprising the tangent of the angle represented by the fourth signal by the excess of the aforesaid constant value over unity to provide a signal proportional to the angle of approach of said vehicle to said plane.

33. A system for controlling the motion of a vehicle comprising means for introducing into said system a first signal proportional to the angle betwen a plane on which said vehicle is to alight and the line of sight from said vehicle to the point on said plane at which said vehicle is to alight, measuring means for generating a second signal proportional to the normal distance between said vehicle and said plane, measuring means for generating a third signal proportional to the slant range from said vehicle to the point where said vehicle is to alight, and means for providing a fourth signal proportional to the angle at which said vehicle is required to alight, function-generating means for combining all of said signals to provide an output signal proportional to the required angle of approach of said vehicle to said plane, said latter means including means for multiplying the value of the angle represented by said first signal by a constant value exceeding unity to provide a first product, means for subtracting from said first product a second product comprising the value of the angle represented by the fourth signal by the excess of the aforesaid constant value over unity to provide a signal proportional to the angle of approach of said vehicle to said plane.

34. A system for controlling the motion of a vehicle comprising measuring means for generating a first signal proportional to the angle between a predetermined plane which said vehicle is to touch and the line of sight from said vehicle to the point on said plane at which said vehicle is required to touch the afore-recited plane, measuring means for generating a second signal proportional to the normal distance between said vehicle and said plane, measuring means for generating a third signal proportional to the slant range from said vehicle to the point where said vehicle is to touch said above-recited plane, and means for providing a fourth signal proportional to the angle at which said vehicle is required to meet the plane together with function-generating means for combining said latter signal to provide an output signal proportional to the required angle of approach of said vehicle to said plane, measuring means for providing a sixth signal proportional to the velocity of motion of said vehicle, and function-generating means for combining said latter signals with said seventh signal to provide a guidance signal proportional to the required velocity of approach of said vehicle to said plane.

35. A system for controlling the motion of a vehicle in respect to a predetermined fixed plane comprising measuring means for generating a first signal proportional to the perpendicular distance from said vehicle to said plane, measuring means for providing a second signal proportional to the slant range from said vehicle to the intended point of alighting on said plane, measuring means for providing a third signal proportional to the tangent of the angle at the point of alighting, function-generating means for combining the first two of said signals to generate a fourth signal proportional to the tangent of the angle between the line of sight from said vehicle to said point of alighting and said aforementioned plane, means for multiplying said fourth signal by a first constant value exceeding unity, which constant determines substantially the shape of said flight path to provide a first output signal, means for multiplying said third signal by a second constant equal to said first constant diminished by unity, to provide a second output signal, and means for subtracting said second output signal from said first output signal to provide a third output signal proportional to the required angle of approach of said vehicle to said fixed plane.

36. A guidance system for controlling the motion of a vehicle by ordering the curvature of the path of motion of said vehicle, said curvature being ordered so that the vehicle is to reach a preset point of destination at a preset instant of time and to be moving, upon reaching said point of destination, in a preset direction, comprising means introducing into said system a first signal proportional to the length the path of travel to be traversed by said vehicle, ranging means for measuring the distance from said vehicle to the point of destination of said vehicle to provide a second signal, computer means for dividing said first by said second signal to produce a third signal, measuring means for providing a fourth signal proportional to the angle between the line of sight from said vehicle to said point of destination and the desired direction of motion of said vehicle at the point of destination, means for providing a fifth signal proportional to the maximum permissible curvature of path of the vehicle, and function-generating means for combining said third, fourth, and fifth signals to provide an output signal proportional to the required curvature of the path of travel at any instant of time during the time of motion of said vehicle, and means for comparing said fifth signal with said output signal to provide a signal indicating when the ordered curvature of path exceeds the value represented by said fifth signal.

37. A guidance system for a moving vehicle which at any time specifies the angle between the direction of motion of the vehicle and the line of sight from the vehicle to the point of destination comprising means for determining the speed of said moving vehicle with respect to a frame of reference, a timing device for providing a first signal corresponding to the intended duration of travel of said vehicle to reach the intended destination, means for multiplying said first signal of said timing device by the speed of said vehicle to provide a second signal proportional to the desired distance of travel of said vehicle to reach said destination at said intended time, ranging means for continuously providing a third signal proportional to the distance from the instantaneous position of said vehicle to the point of intended destination, means for obtaining a fourth signal proportional to the ratio of the second to third signals, means for obtaining a fifth signal proportional to the angle between the desired direction of motion when reaching the point of destination and the direction of the line of sight of the instantaneous position of the vehicle and the point of destination, means for combining said fourth and fifth signals and a summing device, said summing device comprising means for subtracting from said fourth signal the sum of a signal proportional to unity and a signal proportional to the ratio of the fifth signal to an angle corresponding substantially to a complete circumference, thereby to produce a sixth signal, means for feeding said sixth signal to function generating means, said latter means comprising means for generating a predetermined relationship between the required direction of motion of said vehicle at any point during its motion to said sixth signal.

38. In combination, means for providing a first signal which varies proportionately to the time required for a vehicle to reach a preset point of destination, measuring means for generating a second signal proportional to the angle between the line of sight from the instantaneous position of said vehicle to the said point of destination and a preset direction of motion of said vehicle at said point of destination, ranging means for generating a third signal proportional to the instantaneous distance from the vehicle to the point of destination, measuring means for providing a fourth signal proportional to the velocity of motion of said vehicle, and function generating means fed by each of said signals including integrating means to provide a first output signal, and computer means fed by said first output signal to provide a second output signal proportional to the angle between the required direction of motion and said line of sight.

39. A guidance system comprising measuring means for generating a first signal proportional to the inclination of the path of motion of a vehicle with respect to a predetermined plane, means for introducing into said system a second signal having a value which is proportional to the distance to a given destination point in space at a given normal distance from said plane, function-generating means for combining said first and second signals corresponding to said position and velocity in a manner to generate a first output signal proportional to the inclination of the line of sight of said vehicle to a predetermined plane in space at a preset normal distance from said plane, means to provide a third signal proportional to the height of the vehicle above the preset point of destination, means to provide a fourth signal proportional to the distance from the instantaneous position of said vehicle to the point of destination, computer means for dividing said third by said fourth signals to provide a fifth signal, and computer means for multiplying said first signal by a constant the value of which exceeds unity to provide a sixth signal, means for multiplying the preset angle of inclination of the path of travel of said vehicle by the excess by which said constant exceeds unity to provide a seventh signal, means for subtracting the seventh from the sixth signal to provide an output signal proportional to the required angle of approach of said vehicle to said given plane.

40. A control system for producing an output signal proportional to the required curvature of path of a vehicle so as to reach a preset point of destination at a preset instant of time and to be traveling when reaching said destination in a prescribed direction comprising means for introducing a first signal proportional to the length of path of motion to the point of destination, ranging means for obtaining a signal the value of which is proportional to the distance between the instantaneous position of the vehicle and the point of destination, computer means for dividing the first by said second signals to obtain a third signal, measuring means for producing a fourth signal the value of which is proportional to the angle between the line of sight from the vehicle to the point of destination, and servo means fed by said third and fourth signals to generate continuously a signal proportional to the required curvature of the path of motion at any instant of time.

41. A guidance system for a moving vehicle which at any instant of time provides the angle between the required direction of motion of the vehicle and a line of sight from the vehicle to the point of destination so that said vehicle reaches the point of destination at a preset time and is moving upon reaching said point of destination in a prescribed direction, comprising means for providing an input which varies proportionately to the time required to reach said point of destination, means for generating a signal proportional to the angle between the line of sight from the instantaneous position of said vehicle to said point of destination and the required direction of motion of said vehicle at said point of destination, means for generating a signal proportional to the instantaneous distance from the vehicle to the point of destination, means for providing an input signal proportional to the velocity of motion of said vehicle means for combining said inputs into a resultant signal, and function generating means cooperating with each of said inputs and including a position servo, a linear potentiometer having a contact arm, and a non-linear driving device driven by said servo and connected to said contact arm to provide from said above recited inputs a predetermined function of the angle of rotation of said servo and of the position of said contact arm on said potentiometer.

42. A guidance system for a moving vehicle which at any instant of time provides the angle between the required direction of motion of the vehicle and a line of sight from the vehicle to the point of destination so that said vehicle reaches the point of destination at a preset time and is moving upon reaching said point of destination in a prescribed direction, comprising means for providing a first signal which varies proportionately to the time required to reach said point of destination, means for measuring the angle between the line of sight from the instantaneous position of said vehicle to said point of destination and the required direction of motion of said vehicle at said point of destination to provide a second signal, means for generating a third signal proportional to the instantaneous distance from the vehicle to the point of destination, means for providing a fourth signal proportional to the velocity of motion of said vehicle, and function generating means fed by each of said signals and including vector solver means adapted to provide a predetermined function which represents the angle of motion at any instant of time, and control means driven by said vector solver means to provide a voltage proportional to said first-recited angle.

43. In combination, means for generating signals respectively proportional to the values of a plurality of functions of independent input signals, each of said input signals having a value which is proportional to the value of an independent variable, computer means for adding signals representing the values of said functions to provide a first signal proportional to the sum of said functions, computer means for multiplying signals representing said functions in pairs, means for adding signals representing said pairs to provide a second signal, means for progressively multiplying together signals representing the values of said functions to obtain products of said functions taken three at a time and progressively taken in an increased number of factors up to the number of said input signals, and means for adding signals representing the sum of said products to said first signal to obtain a signal proportional to the value of the function of said independent variables.

44. A system for generating a signal proportional to the required inclination of the path of motion of a moving vehicle so as to reach a given destination point in space in relation to a given plane in space comprising means for generating a first signal proportional to the normal distance between the instantaneous position of the vehicle and said plane in space, means for generating a second signal proportional to the required normal distance at the point of destination of said vehicle from said plane, means for providing a third signal representing the time remaining to reach said point of destination from the instantaneous position of the vehicle, means for providing a fourth signal proportional to the velocity of motion of said vehicle, means for combining said latter four-recited signals to provide a first output signal proportional to the inclination of the line of sight from the instantaneous position of the vehicle to the point of destination with respect to said fixed plane, means for generating a signal representing the value of a predetermined function of the distance remaining between said vehicle and said point of destination, said function starting at a value of substantially unity at a predetermined initial insant of time and increasing to a substantially greater value at the point of destination, and means for multiplying said signals representing said latter function by said first output signal proportional to said inclination of said line of sight to produce a second output signal, mans for subtracting the value of a signal proportional to unity from said signals representing said function, to provide a third output signal, means for multiplying the second output signal by said first-recited means to provide a fourth output signal, and means for subtracting said fourth output signal from said first output signal to provide the instantaneous inclination of the path of motion of said vehicle with respect to said plane.

45. A guidance system for a moving vehicle which system at any instant of time provides the angle between the required direction of motion of the vehicle and the line of sight from the vehicle to the point of destination so that said vehicle reaches the point of destination at a preset time and is moving upon reaching said point of destination in a prescribed direction, comprising means for providing an input signal which varies proportionately to the time required to reach said point of destination, means for generating an input signal proportional to the angle between the line of sight from the instantaneous position of said vehicle to said point of destination and the required direction of motion of said vehicle at said point of destination, means for generating an input signal proportional to the instantaneous distance from the vehicle to the point of destination, means for providing an input signal proportional to the velocity of motion of said vehicle, and function generating means fed by each of said input signals and including servo means, a cam driven by said servo means and adapted to provide an output signal representing the value of a predetermined function which value is equal to the angle of motion at any one instant of time as determined by said above-recited input signals.

46. In combination, means for providing a first signal which varies proportionately to the time required for a vehicle to reach a preset point of destination, means for generating a second signal proportional to the angle between the line of sight from the instantaneous position of said vehicle to the said point of destination and the required direction of motion of said vehicle at said point of destination, means for generating a third signal proportional to the instantaneous distance from the vehicle to said point of destination, means for providing a fourth signal proportional to the velocity of motion of said vehicle, means for combining each of said signals, to provide fifth signal, and function generating means fed by said fifth signal including integrating means adapted to provide an output signal proportional to said required angle of motion to reach said preset point of destination at said required time and in said required direction.

47. A guidance system for a moving vehicle which system at any instant of time provides the angle between the required direction of motion of the vehicle and a line of sight from the vehicle to the point of destination so that said vehicle reaches the point of destination at a preset time and is moving upon reaching said point of destination in a prescribed direction, comprising means for providing a first signal which varies proportionately to the time required to reach said point of destination, means for generating a second signal proportional to the angle between the line of sight from the instantaneous position of said vehicle to the said point of destination and the required direction of motion of said vehicle at said point of destination, means for generating a third signal proportional to the instantaneous distance from the vehicle to the point of destination, means for providing a fourth signal proportional to the means for combining said signals into a single signal, and function generating means cooperating with said single signal and including a position servo, a cam driven by said servo and shaped to provide a predetermined function which represents the angle of motion at any one instant of time as determined by said above-recited single signal, a linear potentiometer controlled by said cam, means for applying a source of voltage across the potentiometer, said potentiometer adapted to extract a voltage proportional to the angle of motion between the required direction of motion of said vehicle and said line of sight.

48. A guidance system for a moving vehicle which system at any instant of time provides the angle between the required direction of motion of the vehicle and a line of sight from the vehicle to a point of destination so that said vehicle reaches the point of destination at a preset time and is moving upon reaching said point of destination in a prescribed direction, comprising measuring means for providing a first signal which varies proportionately to the distance along the path of travel required to reach said point of destination, means for measuring the angle between the line of sight from the instantaneous position of said vehicle to the point of destination and the required direction of motion of said vehicle at said point of destination to provide a second signal, measuring means for generating a third signal proportional to the instantaneous straight-line distance from the vehicle to the point of destination, and function-generating means fed by each of said signals to provide a guidance signal, said function generating means fed by said measuring means for providing a signal having a value which is proportional to the angle between the required direction of motion and said line of sight.

49. In combination, a system for generating an output signal proportional to inclination of the path of motion of a vehicle with respect to a predetermined plane so as to guide said vehicle to reach a given destination point in space at a preset normal distance from said plane, at a given time and at a given inclination in relation to a given plane in space in response to signals corresponding respectively to position and velocity of a vehicle at a given instant of time comprising means for combining signals corresponding to said position and velocity to generate a first output signal proportional to the inclination of the line of sight of said vehicle to a predetermined point in space at a preset normal distance from said plane wherein the locus of said predetermined point is, by definition, a function of position and velocity, means for multiplying said first output signal by a predetermined function of the distance from said vehicle to said predetermined point in space, to produce a second output signal, means for generating a signal which is proportional to a product of the angle of motion of said vehicle at said point of destination and a predetermined function, and means for combining said second output signal with said latter-recited signal to provide said first-recited output signal.

50. A system for controlling the motion of a vehicle in respect to a fixed plane comprising measuring means for generating a first signal proportional to the perpendicular distance from said vehicle to said plane, measuring means for providing a second signal proportional to the slant range from said vehicle to the intended point of destination of said vehicle, means for providing a third signal proportional to the tangent of the angle between said fixed plane and the direction of motion of said vehicle at said point of destination, function generating means fed by said latter three signals for combining said signals according to a function containing a parameter which is varied in a manner to obtain a path of motion which terminates at the preset point of destination at a preset instant of time and at a preset angle with respect to said plane at said point of destination to provide an output signal, and means fed by said output signal for providing a control signal having a value which is proportional to the inclination of the path of motion in respect to said plane.

51. A guidance system for a moving vehicle which system at any instant of time provides the required bank angle of the path of travel such that said vehicle reaches a preset point of destination at a preset time and is moving upon reaching said point of destination in a preset direction, comprising measuring means for providing a first signal which varies proportionately to the time $t$ required to reach said point of destination, means for measuring the angle $\theta_R$ between the line of sight from the instantaneous position of said vehicle to the said point of destination and the required direction of motion of said vehicle at said point of destination to provide a second signal, measuring means for generating a third signal proportional to the instantaneous distance, $s$, from the vehicle to the point of destination, measuring means for providing a fourth signal proportional to the velocity, $v$, of motion of said vehicle, means for generating a signal $Q_m$, proportional to the maximum allowable curvature of the path of travel of said vehicle, function generating means fed by each of said signals for deriving first and second output signals which are respectively proportional to the two quantities $a_3$ and $b_3$, said latter two quantities being predetermined functions of the aforementioned quantities $t$, $\theta_R$, $s$, $v$, and $Q_m$.

52. A guidance system for a moving vehicle which system at any instant of time provides the angle between the required direction of motion of the vehicle and a line of sight from the vehicle to the point of destination so that said vehicle reaches the point of destination at a preset time and is moving upon reaching said point of destination in a prescribed direction, comprising measuring means for providing an input which varies proportionately to the time required to reach said point of destination, measuring means for generating a signal proportional to the angle between the line of sight from the instantaneous position of said vehicle to said point of destination and the required direction of motion of said vehicle at said point of destination, measuring means for generating a signal proportional to the instantaneous distance from the vehicle to the point of destination, measuring means for providing an input signal proportional to the velocity of motion of said vehicle, and function generating means fed by each of said inputs and including servo means, a non-linear potentiometer having an output arm positioned by said servo means, a source of electrical potential connected in series with said potentiometer, and means for extracting from means driven by said servo means an electrical signal proportional to the required angle of motion.

53. A guidance system for a moving vehicle which system at any instant of time provides the required curvature of path of motion of the vehicle so that said vehicle reaches the point of destination at a preset time and is moving upon reaching said point of destination in a prescribed direction, comprising means for providing a first signal which varies proportionately to the time required to reach said point of destination, means for generating a second signal proportional to the angle between the line of sight from the instantaneous position of said vehicle to the said point of destination and the required direction of motion of said vehicle at said point of destination, means for generating a third signal proportional to the instantaneous distance from the vehicle to the point of destination, means for providing a fourth signal proportional to the velocity of motion of said vehicle, means associated with each of said inputs for deriving a first auxiliary signal proportional to a first function of said above-recited signals, means for deriving a second auxiliary signal proportional to a second function of said above-recited inputs, means for generating and adding two quantities $a_3$ and $b_3$ to provide a first output signal proportional to the required curvature of path where $a_3$ and $b_3$ are the solutions of the two simultaneous equations, $$\frac{\sin \theta_R}{k}=\int_0^1 \sin \frac{q_m vt}{b_3}[\sin (a_3+b_3u)-\sin a_3]du$$

$$\frac{\cos \theta_R}{k}=\int_0^1 \cos \frac{q_m vt}{b_3}[\sin (a_3+b_3u)-\sin a_3]du$$

in which $\theta_R$ is the angle between the line of sight and the required direction of motion of said vehicle at the point of destination, $k$ is the ratio of the length of path of travel to the distance of the vehicle to the point of destination, $q_m$ is the maximum permissible curvature of the path of motion, $v$ is the average speed of the vehicle, and $t$ is the duration of time, remaining at any instant to complete the travel of said vehicle to the point of destination, the first term of each of said equation being said first and second auxiliary signals, respectively, means for generating a fifth signal proportional to the maximum curvature of said path of motion which can be traversed by said vehicle, and means for comparing said latter signal with said first output signal proportional to the sum of $a_3$ and $b_3$ to provide a warning signal indicating when the ordered curvature of path exceeds the curvature of path which can be traversed by said vehicle.

54. A system for controlling the motion of a vehicle in respect to a fixed plane comprising measuring means for generating a first signal proportional to the prependicular distance from said vehicle to said plane, measuring means for providing a second signal proportional to the slant range from said vehicle to the intended point of destination on said plane, means for providing a third signal proportional to the tangent of the angle at the point of destination, function-generating means for combining the first two of said signals to generate a signal proportional to the tangent of the angle between the line of sight from said vehicle to said point of destination and said aforementioned plane, means for multiplying said signal proportional to the tangent by a first constant value exceeding unity, which constant determines the shape of the path of motion of said vehicle to provide a first output signal, means for multiplying said third signal by a second constant value equal to said latter constant diminished by unity, to provide a second output signal, and means for subtracting said second output signal from said first output signal to provide a third output signal proportional to the required angle of approach of said vehicle to said fixed plane.

55. A guidance system for a moving vehicle which system at any instant of time provides a signal representing the curvature of the path of motion of the vehicle such that said vehicle reaches the point of destination at a preset time and is moving upon reaching said point of destination in a prescribed direction, including measuring means for providing a first signal which varies proportionately to the time required to reach said point of destination, measuring means for generating a second signal proportional to the angle between the line of sight from the instantaneous position of said vehicle to said point of destination and the required direction of motion of said vehicle at said point of destination, measuring means for generating a third signal proportional to the instantaneous distance from the vehicle to the point of destination, measuring means for providing a fourth signal proportional to the velocity of motion of said vehicle, and function generating means fed by each of said signals for generating signals representing three functions of predetermined combinations of said signals, means for adding the products of said function according to a predetermined sequence, thereby to provide at any instant of time a signal proportional to said required curvature of path.

56. Guidance means for defining the path of travel of an object in a coordinate system comprising generator means for providing a signal representing a function of said coordinates, means for continuously recomputing the values of signals representing adjustable parameters in terms of the coordinates of the present position of said object to continuously alter the shape of said path, the number of said adjustable parameters being at least equal to the number of conditions imposed on the path of travel, means for imposing upon said guidance means information to control the intended time of arrivel of said object, means for applying to said generator means said signals representing said adjustable parameters, and means for determining from said signal representing a function control signals representing orders for guiding said object along a path of travel defined by latter-recited said function.

57. A guidance system for a moving vehicle which at any time specifies the angle between the direction of motion of the vehicle and a line of sight from the vehicle to the point of destination comprising means for determining the speed of said moving vehicle and putting out a speed signal, a timing device for providing a first output signal corresponding to the intended duration of travel of said vehicle to reach the intended destination, means for multiplying said first output of said timing device by the speed signal to provide a second output signal proportional to the desired distance of travel of said vehicle to reach said destination at said intended time, ranging means for continuously providing a third output signal proportional to the distance from the instantaneous position of said vehicle to the point of intended destination, means for obtaining a fourth output signal proportional to the ratio of the second to third output signals, means for obtaining a fifth signal proportional to the angle between the desired direction of motion when reaching the point of destination and the direction of said line of sight, means for combining said fourth and fifth output signals in a summing device, said summing device comprising means for subtracting from said fourth output a signal proportional to unity to produce a seventh output signal, means for producing a signal proportional to the ratio of the fifth output signal to the constant $2\pi$ radians, thereby to produce a sixth output signal, means for feeding said sixth and seventh output signals into function generating means, said later means comprising means for generating from said latter signals a predetermined relationship between the required direction of motion of said vehicle at any point during its motion and said sixth and seventh output signals.

58. In combination, means for providing a first signal which varies proportionately to the time required for a vehicle to reach a preset point of destination, means for generating a second signal proportional to the angle between the line of sight from the instantaneous position of said vehicle to the point of destination and a preset direction of motion of said vehicle at said point of destination, means for generating a third signal proportional to the instantaneous distance from the vehicle to the point of destination, means for providing a fourth signal proportional to the velocity of motion of said vehicle, and means for combining said latter-recited signals to provide a fifth signal, and function generating means fed by said fifth signal and including servo means for generating an output signal proportional to the angle of motion of said vehicle.

59. A guidance system for a moving vehicle which system at any instant of time provides a signal representing the instantaneous curvature of path of motion of the vehicle and a line of sight from the vehicle to a preset point of destination so that said vehicle reaches the point of destination at a preset instant of time and is moving upon reaching said point of destination in a prescribed direction comprising measuring means for providing a first signal which varies proportionately to the time required to reach said point of destination, measuring means for generating a second signal proportional to the angle between the line of sight from the instantaneous position of said vehicle to the said point of destination and the required direction of motion of said vehicle at said point of destination, measuring means for generating a third signal proportional to the instantaneous distance from the vehicle to the point of destination, measuring means for providing a fourth signal proportional to the velocity of motion of said vehicle, means for generating a fifth signal proportional to the maximum permissible curvature of the path of motion of said vehicle function-generating means fed by each of said recited signals for deriving a first output signal proportional to a predetermined function, the absolute value of which is less than unity, and means for multiplying said first output signal by said fifth signal which is proportional to the maximum permissible curvature of path of motion to obtain a second output signal proportional to the required curvature of path of motion at any particular instant, whereby said curvature of path of motion does not exceed the maximum allowable curvature.

60. A guidance system for providing a signal proportional to the inclination of the path of motion of a vehicle with respect to a predetermined plane so as to guide said vehicle to reach a given destination point in space at a given normal distance from said plane, and at a given inclination in relation to the given plane in space in response to signal quantities corresponding respectively to position and velocity of the vehicle at a given instant of time comprising means for combining said signal quantities corresponding respectively to the position and velocity of a vehicle at a given instant of time to generate a signal proportional to the inclination of the line of sight of said vehicle to a predetermined point of destination in space at a preset normal distance from said plane, means for measuring the height of the vehicle above the preset point of destination, means for measuring the distance from the instantaneous position of said vehicle to the point of destination, dividing means to provide a first signal proportional to the ratio of the height of the vehicle above the preset point of destination to the distance from the instantaneous position of said vehicle to the point of destination, means for multiplying said first signal by a constant the numerical value of which exceeds unity to provide a second signal, means for multiplying the preset angle of inclination of the path of travel of said vehicle by the amount by which said constant exceeds unity to provide a third signal, and means for subtracting the third from the second of said signals to provide an output signal proportional to the required angle of approach of said vehicle to said given plane.

61. A guidance system for generating a signal proportional to inclination of the path of motion of a vehicle with respect to a predetermined plane so as to guide said vehicle to reach a given destination point in space at a given normal distance from said plane, and at a given inclination in relation to the given plane in space in response to signal quantities corresponding respectively to position and velocity of a vehicle at a given instant of time comprising means for combining said signal quantities corresponding respectively to the position and velocity of a vehicle at a given instant of time to generate a signal proportional to the inclination of the line of sight of said vehicle to a predetermined point of destination in space at a preset normal distance from said plane, means for measuring the height of the vehicle above the preset point of destination, means for measuring the distance from the instantaneous position of said vehicle to the point of destination, computer means to provide a first signal proportional to the ratio of the height of the vehicle above the preset point of destination to the distance from the instantaneous position of said vehicle to the point of destination, means for multiplying said first signal by a predetermined function of the length of path remaining to the point of destination the value of which exceeds unity to provide a second signal, means for multiplying the preset angle of inclination of the path of travel of said vehicle by the amount by which said function exceeds unity to provide a third signal, and means for subtracting the third from the second of said signals to provide an output signal proportional to the required angle of approach of said vehicle to said given plane.

62. In combination, means for providing a first signal which varies proportionately to the time required for a vehicle to reach a preset point of destination, means for generating a second signal proportional to the angle in degrees between the line of sight from the instantaneous position of said vehicle to the said point of destination and the required direction of motion of said vehicle at said point of destination, means for generating third signal proportional to the instantaneous distance from the vehicle to the point of destination, means for providing a fourth signal proportional to the velocity of motion of said vehicle, means for dividing the product of said first and fourth signals by said third signal to provide a fifth signal, means for subtracting from said fifth signal a sixth signal proportional to the ratio of the second signal expressed in degrees divided by the value 360 to provide a seventh signal, and means for subtracting a signal proportional to unity from said seventh signal to provide a resulting single signal, and function generating means fed by said single signal adapted to provide an output signal proportional to the required direction of motion of said vehicle.

63. In combination, means for providing a first signal which varies proportionately to the time required for a vehicle to reach a preset point of destination, means for generating a second signal proportional to the angle between the line of sight from the instantaneous position of said vehicle to the said point of destination and the required direction of motion of said vehicle at said point of destination, means for generating a third signal proportional to the instantaneous distance from the vehicle to the point of destination, means for providing a fourth signal proportional to the velocity of motion of said vehicle, means for combining said signals to provide a first output signal and function generating means fed by said first output signal to provide a second output signal proportional to a predetermined function of the angle of motion of said vehicle, electrical means for adjusting the value of said latter-recited function to provide a third output signal which determines the character of the path of motion of said vehicle, and switching means for inserting into the output of said function-generating means a signal representing said above-recited function of the angle of motion to obtain a fourth output signal proportional to said angle of motion of said vehicle.

64. A guidance system for a moving vehicle which system at any instant of time provides the angle between the required direction of motion of the vehicle and a line of sight from the vehicle to the point of destination so that said vehicle reaches the point of destination at a preset time and is moving upon reaching said point of destination in a prescribed direction, including means for providing first signal which varies proportionately to the time required to reach said point of destination, means for generating a second signal proportional to the angle between the line of sight from the instantaneous position of said vehicle to the said point of destination and the required direction of motion of said vehicle at said point of destination, means for generating a third signal proportional to the instantaneous distance from the vehicle to the point of destination, means for providing a fourth signal proportional to the velocity of motion of said vehicle, means for combining said recited signals into a single signal and function generating means fed by said single signal comprising means for generating a non-linear function consisting of a factor the value of which lies between 1 and 10 multiplied by the square root of the squared ratio of the length of the required path of motion to the distance from the vehicle to the point of destination diminished by unity, to provide a first output signal, means for subtracting from said first output signal a signal proportional to said second signal to provide a second output signal, means for multiplying the quantity representing the second output signal by a preset quantity determining the character of said path of motion to produce a third output signal, and means for inverting said third output signal according to the inverse tangent law to obtain said required angle of motion of said vehicle.

65. In combination, means for providing a first signal which varies proportionately to the time required for a vehicle to reach a preset point of destination, means for generating a second signal proportional to the angle between the line of sight from the instantaneous position of said vehicle to said point of destination and the required direction of motion of said vehicle at said point of destination, means for generating a third signal proportional to the instantaneous distance from the vehicle to the point of destination, means for providing a fourth signal proportional to the velocity of motion of said vehicle, function generating means fed by said recited signals to provide continuously an output signal the value of which is proportional to the angle between the required direction of motion at any instant of time and said line of sight, and switching means for reversing the sign of output signal at the instant of time when said latter-recited said angle becomes zero.

66. A guidance system for a moving vehicle which system at any instant of time provides the angle between the required direction of motion of the vehicle and a line of sight from the vehicle to the point of destination so that said vehicle reaches the point of destination at a preset time and is moving upon reaching said point of destination in a prescribed direction, including means for providing a first signal which varies proportionately to the time remaining to reach said point of destination, means for generating a second signal proportional to the angle between the line of sight from the instantaneous position of said vehicle to said point of destination and the required direction of motion of said vehicle at said point of destination, means for generating a third signal proportional to the instantaneous distance from the vehicle to the point of destination, means for providing a fourth signal proportional to the velocity of motion of said vehicle, function-generating means for combining said signals to provide an output signal, and means for reversing the polarity of said output signal at the instant time when the angle of motion with respect to said line of sight becomes zero; said latter means comprising switching means for reversing the polarity of said output signal representing said angle of motion.

67. A guidance system for controlling the motion of vehicle on which is imposed the condition so as to reach a preset point of destination after a preset length of travel and to be moving, upon reaching said point of destination along a preset direction, comprising computing means for deriving a signal representing the values of a function of a plurality of variables, measuring means for supplying signals into said computing means having values representing the initially imposed distance along the path of travel of the craft from its intended point of destination, the respective instantaneous angle of the line of sight from said craft to a preset direction at said point of destination and the required direction of motion upon reaching said point of destination, and the length of the path intended to reach said point of destination, said computing means including vector solver means for correcting continuously said initially imposed distance by the distance already travelled up to a given instant of time, means for generating values of said latter function, and means for combining said generated values to provide an output signal proportional to the required direction of motion of said craft.

68. In a guide system for controlling the motion of a vehicle, a computing device for deriving the values of signals proportional to a particular function of a plurality of variables including variables representing the distance of the vehicle from its intended point of destination, the respective instantaneous angle defining the position of said vehicle with respect to a predetermined direction at said point of destination, function generator means for combining said signals to provide a signal representing the value of a predetermined function which function consists of values which vary as the inversion of the complete elliptic integral $$K=\int_0^1\{1+(1-p)^2[\theta_R+(\tan\zeta-\theta_R)(1-2p)]^2\}^{1/2}dp$$

with respect to the tangent of the angle $\zeta$ between the required direction of motion of said vehicle and the direction of the line of sight from the instantaneous position of said vehicle to said point of destination, in which K is ratio between the length of the intended path of travel to the distance between the instantaneous position of the vehicle and said point of destination, $\theta_R$ is the angle between said line of sight and the intended direction of motion of said vehicle at said point of destination, and $p$ is an integration variable.

69. In a guidance system for a moving vehicle which system at any instant of time provides the curvature of the path of motion of said vehicle such that said vehicle reaches a preset point of destination at a preset time and is moving upon reaching said point of destination in a prescribed direction, including means for providing a first signal which varies proportionately to the time required by said vehicle to reach said point of destination, means for generating a signal proportional to the angle between the line of sight from the instantaneous position of said vehicle to the said point of destination and the required direction of motion of said vehicle at said point of destination, means for generating a second signal proportional to the instantaneous distance from the vehicle to the point of destination, means for providing a third signal porportional to the velocity of motion of said vehicle, means for generating a fourth signal proportional to the intended length of path of travel of said vehicle and function generating means fed by each of said signals for providing a first intermediate signal the value of which is proportional to the sine and cosine, respectively, of the angle between the line of sight from the instantaneous position of the vehicle to the point of destination and the required direction of motion at the point of destination, computer means for determining the entire length of travel of said vehicle, measuring means for determining the distance between the vehicle and the point of destination, means for dividing said sine and cosine of said angle by the ratio between the required length of travel path of said vehicle to the distance between the vehicle and the point of destination, thereby to produce a second intermediate signal proportional to said ratios, and means for combining said first and second intermediate signals to provide an output signal proportional to curvature of the path of motion of said vehicle.

70. In a navigation system, a function generator for obtaining the angle between the direction of the required motion and the line of sight from the instantaneous position of a moving vehicle to the point of intended destination of said vehicle comprising means for generating signals representing a specific function of the maximum allowable curvature of the path of travel of said vehicle, said function generating means being fed by signals the value of which represents the present position and direction of motion of said vehicle, latter said means including signal means for imposing upon said system information to control the intended time of arrival of said vehicle, and vector solver means fed by said signals for generating a control signal representing the value of the required angle for said motion.

71. A guidance system for a moving vehicle which system at any instant of time provides the angle between the required direction of motion of the vehicle and a line of sight from the vehicle to a point of destination so that said vehicle reaches the point of destination at a preset time and is moving upon reaching said point of destination in a prescribed direction, comprising means for providing a first signal which varies proportionately to the distance along the path of travel to reach said point of destination, means for generating a second signal proportional to the angle between the line of sight from the instantaneous position of said vehicle to the said point of destination and the required direction of motion of said vehicle at said point of destination, means for generating a third signal proportional to the instantaneous distance from the vehicle to the point of destination, means for combining first three said signals to produce a fourth signal, function generator means including a linear voltage divider, means for introducing said fourth signal into said function generator means, means for obtaining a specific voltage from said voltage divider in response to said fourth signal, an electron device having a cathode, an anode and a control element, said specific voltage being applied across the anode and cathode of said electron device by way of a measuring resistor, in the main current path of said electron device, means for applying a constant bias voltage to the control electrode of said electron device, and means for extracting an output signal developed across said measuring resistor for changing the direction of motion of said vehicle.

72. A guidance system for a moving vehicle which system at any instant of time provides the curvature of the path of motion of the vehicle such that said vehicle reaches a preset point of destination at a preset time and is moving upon reaching said point of destination in a prescribed direction, comprising means for providing a first signal which varies proportionately to the time required to reach said point of destination, means for generating a second signal proportional to the angle between the line of sight from the instantaneous position of said vehicle to said point of destination and the preset direction of motion of said vehicle at said point of destination, means for generating a third signal proportional to the instantaneous distance from the vehicle to the point of destination, means for providing a fourth signal proportional to the velocity of motion of said vehicle, and function generating means fed by each of said signals for deriving an output signal proportional to the curvature of said path of travel of said vehicle, latter said means combining in a linear manner the angles $\theta_P$, $\theta_T$ and the quantity N and dividing the latter combination by the length of path of travel remaining to the point of destination of said vehicle, where the angle $\theta_P$ is the bearing of motion of said vehicle, $\theta_T$ is the bearing of the intended direction of motion at said preset point of destination, and the value of the quantity N is a linear combination of two additional signals which vary according to predetermined functions of $\theta_P$ and $\theta_T$ including measuring means feeding said function generating means for providing signals the values of which represent latter-recited said angles.

73. A guidance system for a moving vehicle which system at any instant of time provides the curvature of the path of motion of the vehicle such that said vehicle reaches a preset point of destination at a preset time and is moving upon reaching said point of destination in a prescribed direction, comprising means for providing a first signal which varies proportionately to the time required to reach said point of destination, means for generating a second signal proportional to the angle between the line of sight from the instantaneous position of said vehicle to said point of destination and the required direction of motion of said vehicle at said point of destination, means for generating a third signal proportional to the instantaneous distance from the vehicle to the point of destination, means for providing a fourth signal proportional to the velocity of motion of said vehicle, and function generating means fed by each of said signals for deriving an output signal proportional to the curvature of said path of travel of said vehicle by generating from said signals a quantity proportional to $$\frac{3}{s}(\theta_P-\theta_T-N)$$

in which $s$ is the length of the intended path between the position of the vehicle and the point of destination, $\theta_P$ is the bearing angle of the direction of motion of the vehicle, $\theta_T$ is the bearing of the intended direction of motion at said point of destination, and N is equal to $2b+c$ in which $b$ and $c$ are the solutions of the following two equations, $$\frac{1}{K}\sin(\theta_R-\theta_T=\int_0^1 \sin Idu$$

$$\frac{1}{K}\cos(\theta_R-\theta_T)=\int_0^1 \cos Idu$$

where $\theta_R$ is the bearing of the line of sight from said vehicle to said point of destination, and I is equal to $$bu+cu^2+[(\theta_P-\theta_T)-(b+c)]u^3$$

where $u$ is the integration variable, and means for solving said two equations to obtain $b$ and $c$.

74. A guidance system for controlling the motion of a vehicle comprising measuring means for generating a first signal the value of which is proportional to the angle between a preset plane on which said vehicle is to alight and the line of sight from said vehicle to the point on said plane at which said vehicle is to alight, measuring means for generating a second signal proportional to the normal distance between said vehicle and said plane, measuring means for generating a third signal proportional to the slant range from said vehicle to the point where said vehicle is to alight, and means for providing a fourth signal proportional to the angle at which said vehicle is required to alight on said plane and passive circuit means for combining all of said signals to provide a signal proportional to the required angle of approach of said vehicle to said plane, latter said means including means for multiplying the tangent of the angle provided by said first signal by a predetermined constant value exceeding unity to provide a first intermediate signal, means for subtracting from said first intermediate signal a second intermediate signal comprising the product of the tangent of the angle corresponding to said fourth signal by the excess over unity of the aforesaid constant value to provide an output signal proportional to the required angle of approach of the vehicle to said preset plane.

75. A guidance system comprising means for generating a first signal proportional to the angle between the line of sight from the instantaneous position of a vehicle to a preset point of destination and the required direction of motion of said vehicle at said point of destination, means for generating a second signal proportional to the instantaneous distance from the vehicle to the point of destination, means for providing a third signal proportional to the length of path of motion of said vehicle, and function generating means fed by each of said signals for deriving an output signal proportional to the curvature of said path including means for providing a signal proportional to the sine and cosine, respectively of the angle between the line of sight from the instantaneous position of the vehicle to the point of destination and the required direction of motion at the point of destination, means for dividing said sine and cosine of said angle by the ratio between the required length of travel path of said vehicle to the distance between the vehicle and the point of destination, thereby to produce intermediate signals proportional to said ratios, and means for combining said intermediate signals with said signal proportional to the length of path of motion to provide said output signal proportional to the curvature of said path of motion.

76. A guidance system for a moving vehicle which system at any instant of time provides an angle so that said vehicle reaches a preset point of destination a preset time and is moving upon reaching said point of destination in a prescribed direction, comprising means for providing a first signal which varies proportionately to the time required to reach said point of destination, means for generating a second signal proportional to the angle between the line of sight from the instantaneous position of said vehicle to said point of destination and the required direction of motion of said vehicle at said point of destination, means for generating a signal proportional to the instantaneous distance from the vehicle to the point of destination, means for providing an input signal proportional to the velocity of motion of said vehicle, and function generating means cooperating with each of said inputs and including a servo, a non-linear potentiometer having an output arm positioned by said servo, a source of electrical potential connected in series with said potentiometer, and means for extracting from said output arm an electrical signal proportional to the required angle of motion between the required direction of motion of said vehicle and said line of sight, said function being the inversion in respect to said angle of flight of an elliptic integral, the integrand of which includes the required angle of motion and above-recited inputs.

77. A guidance system for a moving vehicle which system at any instant of time provides the angle between the required direction of motion of the vehicle and a line of sight from the vehicle to the point of destination so that said vehicle reaches the point of destination a preset time and is moving upon reaching said point of destination in a prescribed direction, comprising measuring means for providing an input which varies proportionately to the time required to reach said point of destination, measuring means for generating a signal proportional to the angle between the line of sight from the instantaneous position of said vehicle to said point of destination and the required direction of motion of said vehicle at said point of destination, measuring means for generating a signal proportional to the instantaneous distance from the vehicle to the point of destination, measuring means for providing an input signal proportional to the velocity of motion of said vehicle, and function generating means fed by each of said inputs and including an adjustable constant multiplier position servo, a nonlinear potentiometer having an output arm positioned by said servo, a source of electrical potential connected in series with said potentiometer, and means for extracting from said output arm an electrical signal proportional to the required angle of motion between the required direction of motion of said vehicle and said line of sight.

78. A guidance system for a moving vehicle which system at any instant of time provides the angle between the required direction of motion of the vehicle and a line of sight from the vehicle to the point of destination so that said vehicle reaches the point of destination at a preset time and is moving upon reaching said point of destination in a prescribed direction, including measuring means for providing an input which varies proportionately to the time required to reach said point of destination, measuring means for generating a first signal proportional to the angle between the line of sight from the instantaneous position of said vehicle to the said point of destination and the required direction of motion of said vehicle at said point of destination, measuring means for generating a second signal proportional to the instantaneous distance from the vehicle to the point of destination, measuring means for providing a third signal proportional to the velocity of motion of said vehicle, computer means for combining said signals to provide a single input signal, and function generating means fed by said single input signal, a velocity servo, said input signal adapted to drive said velocity servo, a linear potentiometer connected to said velocity servo adapted to extract a signal proportional to said required angle of motion.

79. In a guidance system, a function generator for obtaining the angle between the direction of the required motion and the line of sight from the instantaneous position of a moving vehicle to the point of intended destination of said vehicle comprising, first function—generator means for generating signals proportional to the value of a specific function, second function-generator means for generating a length signal proportional to the length of the path of said moving vehicle, measuring means for generating a distance signal proportional to the distance to the point of intended destination, ratio means for generating a ratio signal proportional to the ratio of said length signal to said distance signal, said first function-generator means being fed by said ratio signal, and means for obtaining a signal proportional to the value of the angle of motion of said vehicle.

References Cited by the Examiner

UNITED STATES PATENTS

| | | | |
|---|---|---|---|
| 2,682,366 | 6/54 | Burgett | 235—193 |
| 2,825,054 | 2/58 | Ernst | 235—151 XR |
| 2,844,817 | 7/58 | Green. | |
| 2,878,469 | 3/59 | Casabona. | |
| 2,927,751 | 3/60 | Daspit. | |
| 2,996,706 | 8/61 | Newell et al. | 244—77 XR |
| 3,031,658 | 4/62 | Green et al. | 235—187 XR |
| 3,096,433 | 7/63 | Daspit | 235—151 |

MALCOLM A. MORRISON, *Primary Examiner.*

WALTER W. BURNS, Jr., DARYL W. COOK, *Examiners.*